(12) United States Patent
Arao et al.

(10) Patent No.: US 12,411,516 B2
(45) Date of Patent: Sep. 9, 2025

(54) PEDAL DEVICE

(71) Applicant: DENSO CORPORATION, Kariya (JP)

(72) Inventors: Masashi Arao, Kariya (JP); Etsugo Yanagida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/500,944

(22) Filed: Nov. 2, 2023

(65) Prior Publication Data
US 2024/0069588 A1 Feb. 29, 2024

Related U.S. Application Data

(63) Continuation of application No. PCT/JP2022/013792, filed on Mar. 24, 2022.

(30) Foreign Application Priority Data

May 14, 2021 (JP) .................................. 2021-082794

(51) Int. Cl.
*G05G 5/03* (2008.04)
*B60T 7/04* (2006.01)
(Continued)

(52) U.S. Cl.
CPC ................ *G05G 5/03* (2013.01); *B60T 7/042* (2013.01); *G05G 1/44* (2013.01); *G05G 25/04* (2013.01);
(Continued)

(58) Field of Classification Search
CPC .. G05G 1/44; G05G 5/03; G05G 5/05; G05G 25/04; G05G 2505/00; B60T 7/042; B60K 26/021
See application file for complete search history.

(56) References Cited

U.S. PATENT DOCUMENTS 2,779,209 A * 1/1957 Estes .......................... B60T 7/06
74/519
2,818,710 A * 1/1958 Price ......................... G05G 5/03
60/554
(Continued)

FOREIGN PATENT DOCUMENTS

DE 29613006 U1 * 9/1996 ................ B60T 7/06
JP S49139733 U 12/1974
(Continued)

OTHER PUBLICATIONS

Machine translation of DE29613006 U1 obtained from fit database (Year: 1996).*

(Continued)

*Primary Examiner* — Thomas C Diaz
(74) *Attorney, Agent, or Firm* — Nixon & Vanderhye P.C.

(57) ABSTRACT

A pedal device includes a pedal, a connecting rod, a reaction force generating mechanism, a housing having a housing hole for allowing the connecting rod to pass therethrough when the pedal is stepped on by an operator, and a cover member. The cover member includes a first connecting portion and a covering portion. The first connecting portion is connected to a housing end portion of the housing forming a housing hole. The covering portion is arranged at a position between the first connecting portion and a back surface of the pedal and is connected to the first connecting portion to cover the housing hole.

16 Claims, 33 Drawing Sheets

(51) Int. Cl.
*G05G 1/44* (2008.04)
*G05G 25/04* (2006.01)
*B60K 26/02* (2006.01)
*G05G 5/05* (2006.01)

(52) U.S. Cl.
CPC .............. *B60K 26/021* (2013.01); *G05G 5/05* (2013.01); *G05G 2505/00* (2013.01)

(56) References Cited

U.S. PATENT DOCUMENTS

| | | | | |
|---|---|---|---|---|
| 3,048,980 | A | * | 8/1962 | Cousino .................. B60T 7/04 60/590 |
| 3,857,304 | A | * | 12/1974 | Berndt .................... G05G 5/03 74/513 |
| 4,182,198 | A | * | 1/1980 | Dartnell ................ B60K 26/02 74/513 |
| 9,829,114 | B2 | * | 11/2017 | Isono .................. F16K 17/0473 |
| 2017/0240044 | A1 | * | 8/2017 | Tabata .................... G05G 1/44 |
| 2019/0160943 | A1 | | 5/2019 | Kadoi |
| 2021/0294371 | A1 | | 9/2021 | Kihara |

FOREIGN PATENT DOCUMENTS

| | | |
|---|---|---|
| JP | S5410631 U | 1/1979 |
| JP | S58147027 U | 10/1983 |
| JP | S58192759 U | 12/1983 |
| JP | S58196256 U | 12/1983 |
| JP | S6450131 U | 3/1989 |
| JP | 2018075912 A | 5/2018 |
| JP | 2020055327 | 4/2020 |
| JP | 2021035791 A | 3/2021 |
| KR | 20150005237 A | 1/2015 |

OTHER PUBLICATIONS

U.S. Appl. No. 18/500,853 to Yasuhisa Fukuda et al., filed Nov. 2, 2023 (117 pages).
U.S. Appl. No. 18/501,607 to Daisuke Hokuto et al., filed Nov. 3, 2023 (75 pages).
U.S. Appl. No. 18/500,775 to Daisuke Hokuto, filed Nov. 2, 2023 (73 pages).
U.S. Appl. No. 18/501,718 to Yasuhisa Fukuda, filed Nov. 3, 2023 (58 pages).
U.S. Appl. No. 18/500,599 to Kengo Ito et al., filed Nov. 2, 2023 (49 pages).
U.S. Appl. No. 18/500,573 to Kengo Ito et al., filed Nov. 2, 2023 (51 pages).
U.S. Appl. No. 18/500,962 to Atsushi Nishimura et al., filed Nov. 2, 2023 (43 pages).
U.S. Appl. No. 18/500,853, filed Nov. 2, 2023, Pedal Device.
U.S. Appl. No. 18/501,607, filed Nov. 3, 2023, Pedal Device.
U.S. Appl. No. 18/500,775, filed Nov. 2, 2023, Pedal Device.
U.S. Appl. No. 18/501,718, filed Nov. 3, 2023, Pedal Device.
U.S. Appl. No. 18/500,599, filed Nov. 2, 2023, Vehicle Pedal Module.
U.S. Appl. No. 18/500,573, filed Nov. 2, 2023, Brake Pedal Device.
U.S. Appl. No. 18/500,962, filed Nov. 2, 2023, Pedal Device.
U.S. Appl. No. 18/586,887 to Masashi Arao, filed Feb. 26, 2024 (61 pages).

* cited by examiner

PEDAL DEVICE

CROSS REFERENCE TO RELATED APPLICATION

The present application is a continuation application of International Patent Application No. PCT/JP2022/013792 filed on Mar. 24, 2022, which designated the U.S. and claims the benefit of priority from Japanese Patent Application No. 2021-082794 filed on May 14, 2021. The entire disclosures of all of the above applications are incorporated herein by reference.

TECHNICAL FIELD

The present disclosure relates to a pedal device.

BACKGROUND

Conventionally, an automobile pedal provided with a covering member that covers a pedal stepped on by a driver of the vehicle is known.

SUMMARY

According to an aspect of the present disclosure, a pedal device includes: a pedal configured to rotate about a rotation axis when being stepped on by an operator; a connecting rod connected to a back surface of the pedal, opposite to a stepping surface stepped on by the operator, to rotate with the pedal about the rotation axis; a reaction force generating mechanism configured to generate a reaction force against a stepping force of the operator applied to the pedal by receiving a force from the pedal through the connecting rod and by an elastic deformation when the pedal is stepped on by the operator; a housing having a housing hole through which the connecting rod passes when the pedal is stepped on by the operator, and accommodating the reaction force generating mechanism; and a cover member. The cover member includes a housing connection portion and a covering portion. The housing connection portion may be connected to a housing end portion which is an end portion defining the housing hole in the housing. The covering portion may be arranged at a position between the housing connection portion and the back surface of the pedal, and may be connected to the housing connection portion, to cover the housing hole.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
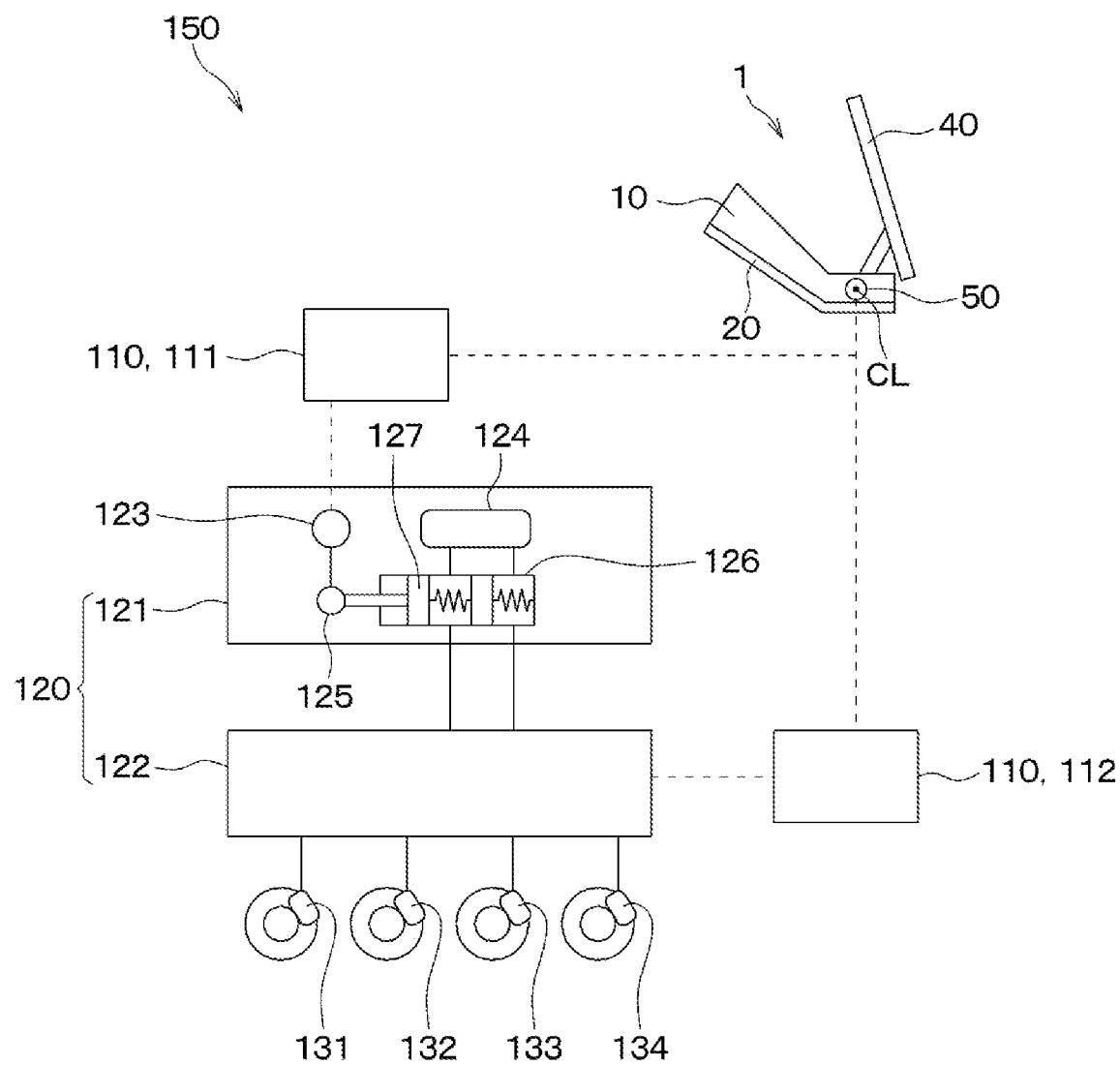
FIG. 1 is a configuration diagram of a brake-by-wire system using a pedal device of a first embodiment.

According to studies by the inventors, when a surface of a pedal that is stepped on by a driver is simply covered with a covering member, the covering member may be worn or damaged by being stepped on by the driver. For this reason, foreign matter such as dust, moisture, and abrasion powder of the covering member may enter into an interior of a housing that accommodates a reaction force generating mechanism such as a spring through the damaged portion of the covering member.

It is an object of the present disclosure to provide a pedal device that suppresses intrusion of foreign matter thereinto.

According to an aspect of the present disclosure, a covering portion is arranged at a position between a housing connection portion and a back surface of a pedal. Thus, the covering portion cannot be stepped on by an operator. Therefore, the cover member is prevented from being worn and damaged. Further, since the covering portion covers a housing hole, foreign matter cannot enter into a housing through the housing hole from the outside of the housing. Thus, intrusion of foreign matter can be effectively restricted.

Hereinafter, embodiments will be described with reference to the drawings. In the following embodiments, the same or equivalent portions are denoted by the same reference numerals, and the description thereof will be omitted.

First Embodiment

A pedal device 1 of the present embodiment is used, for example, as a brake pedal in a brake-by-wire system 150 that controls the brakes of a vehicle. First, this brake-by-wire system 150 will be described.

The brake-by-wire system 150 includes wheel cylinders 131 to 134, an ECU 110, a brake circuit 120 and a pedal device 1, as shown in FIG. 1.

The wheel cylinders 131 to 134 are arranged for each wheel of the vehicle. A brake pad (not shown) is attached to each of the wheel cylinders 131 to 134.

The ECU 110 has a first ECU 111 and a second ECU 112. The first ECU 111 has a microcomputer, a drive circuit, or the like (not shown). The first ECU 111 controls a first brake circuit 121 of the brake circuit 120, which will be described later, based on a signal from the pedal device 1, which will be described later. The second ECU 112 has a microcomputer, a drive circuit, or the like (not shown). Further, the second ECU 112 controls a second brake circuit 122 of the brake circuit 120 described later based on a signal from the pedal device 1 described later.

The brake circuit 120 includes the first brake circuit 121 and the second brake circuit 122. The first brake circuit 121 includes a reservoir 124, a motor 123, a gear mechanism 125 and a master cylinder 126. The reservoir 124 stores brake fluid. The motor 123 drives the gear mechanism 125. The gear mechanism 125 reciprocates a master piston 127 of the master cylinder 126 in an axial direction of the master cylinder 126. The second brake circuit 122 includes an electromagnetic valve (not shown) or the like. Further, the second brake circuit 122 controls the hydraulic pressure of each of the wheel cylinders 131 to 134 by opening and closing electromagnetic valves according to control signals from the second ECU 112.

Here, in order to describe the pedal device 1 below, the front-rear direction of the vehicle is defined as a front-rear direction Da of the vehicle. The vertical direction of the vehicle is defined as a vertical direction db of the vehicle. The left-right direction of the vehicle is defined as a left-right direction Dc of the vehicle. Further, the front of the vehicle in the front-rear direction Da may be referred to as a front part. The rear of the vehicle in the front-rear direction Da may be referred to as a rear part. The upper side of the vehicle in the vertical direction db may be referred to as an upper part. The lower side of the vehicle in the vertical direction db may be referred to as a lower part. The left side of the vehicle in the left-right direction Dc may be referred to as a left part. The right side of the vehicle in the left-right direction Dc may be referred to as a right part.

The pedal device 1 is an organ-type pedal device 1. Therefore, in the pedal device 1, a portion of the pedal 40 that is in front of the vehicle relative to a rotation axis CL rotates toward a floor 2 or toward a dash panel in a vehicle interior in response to an increase in a stepping force of a driver applied to the pedal 40, which will be described later. The dash panel is a partition wall that separates the vehicle interior from the vehicle exterior such as an engine room of the vehicle, and is sometimes called a bulkhead.

Specifically, the pedal device 1 includes a housing 5, a housing bolt 22, a reaction force generating mechanism 30, a pedal 40, a pad 402, a shaft 41, a rotating plate 43, and a sensor unit 50, as shown in FIGS. 2 to 7. Further, the pedal device 1 also includes a connecting rod 60, a rod connecting screw 65, a first stopper 70, a second stopper 75 and a cover member 80.

The housing 5 includes a first housing 10, a second housing 20 and a breathing hole 25.

The first housing 10 is made of resin in a box shape. The first housing 10 includes a top wall 11, a left side wall 12, a right side wall 13, a front wall 14, a housing space 15, a housing opening 16 and a bearing hole 17.

Figure 2:
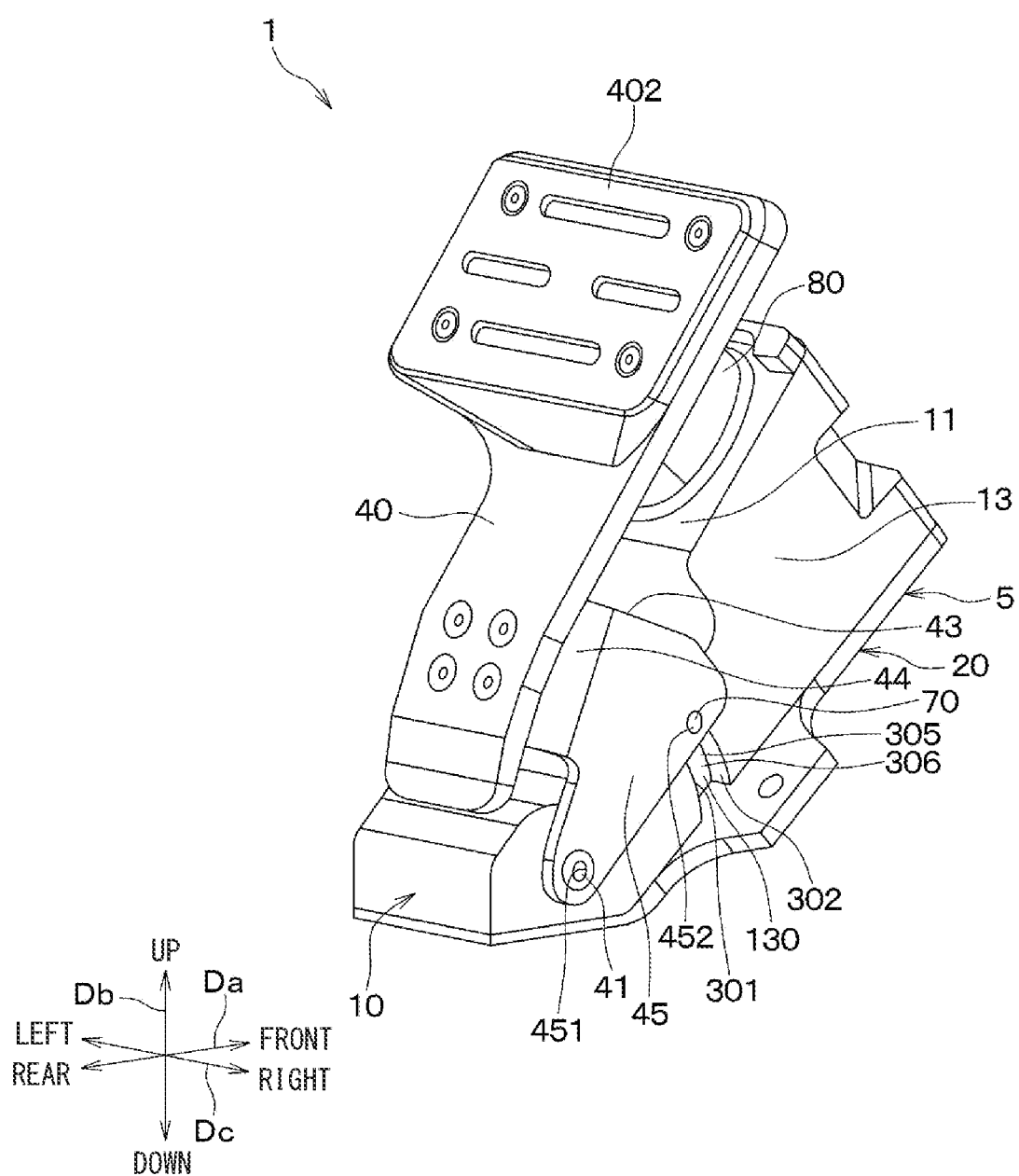
FIG. 2 is a perspective view of the pedal device.
Figure 3:
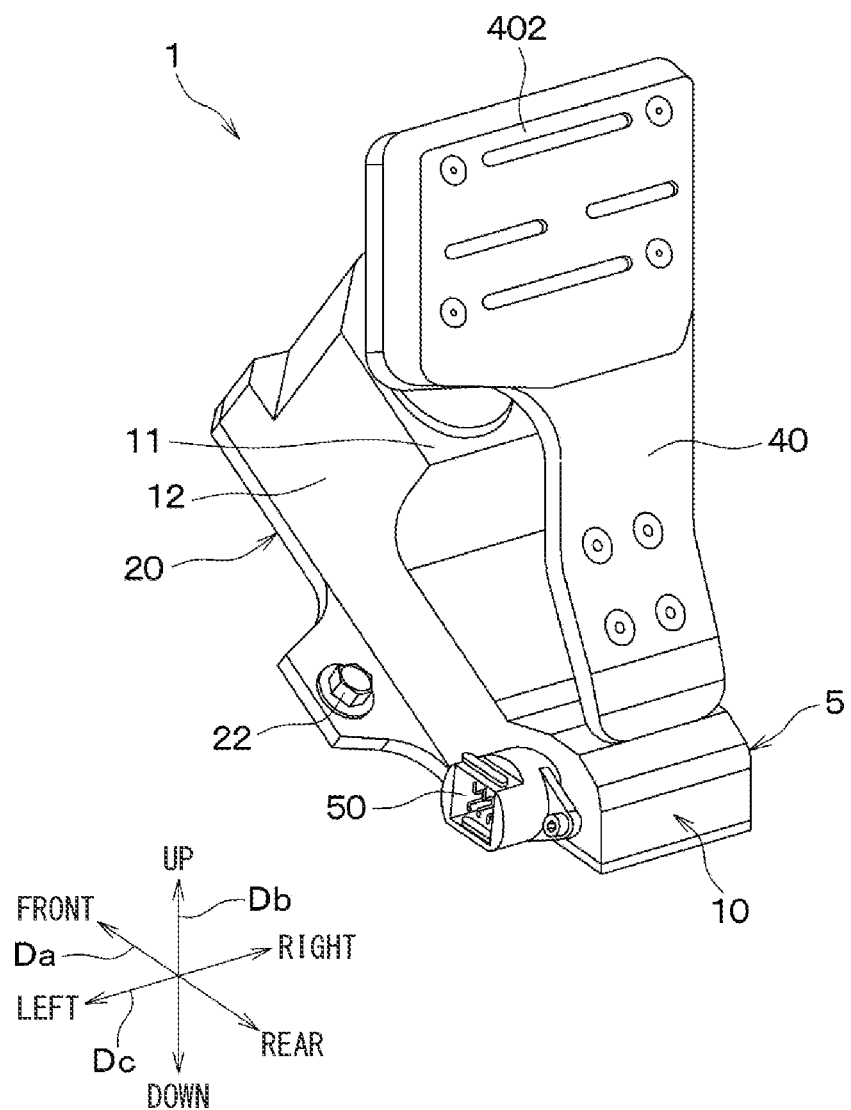
FIG. 3 is another perspective view of the pedal device.
Figure 4:
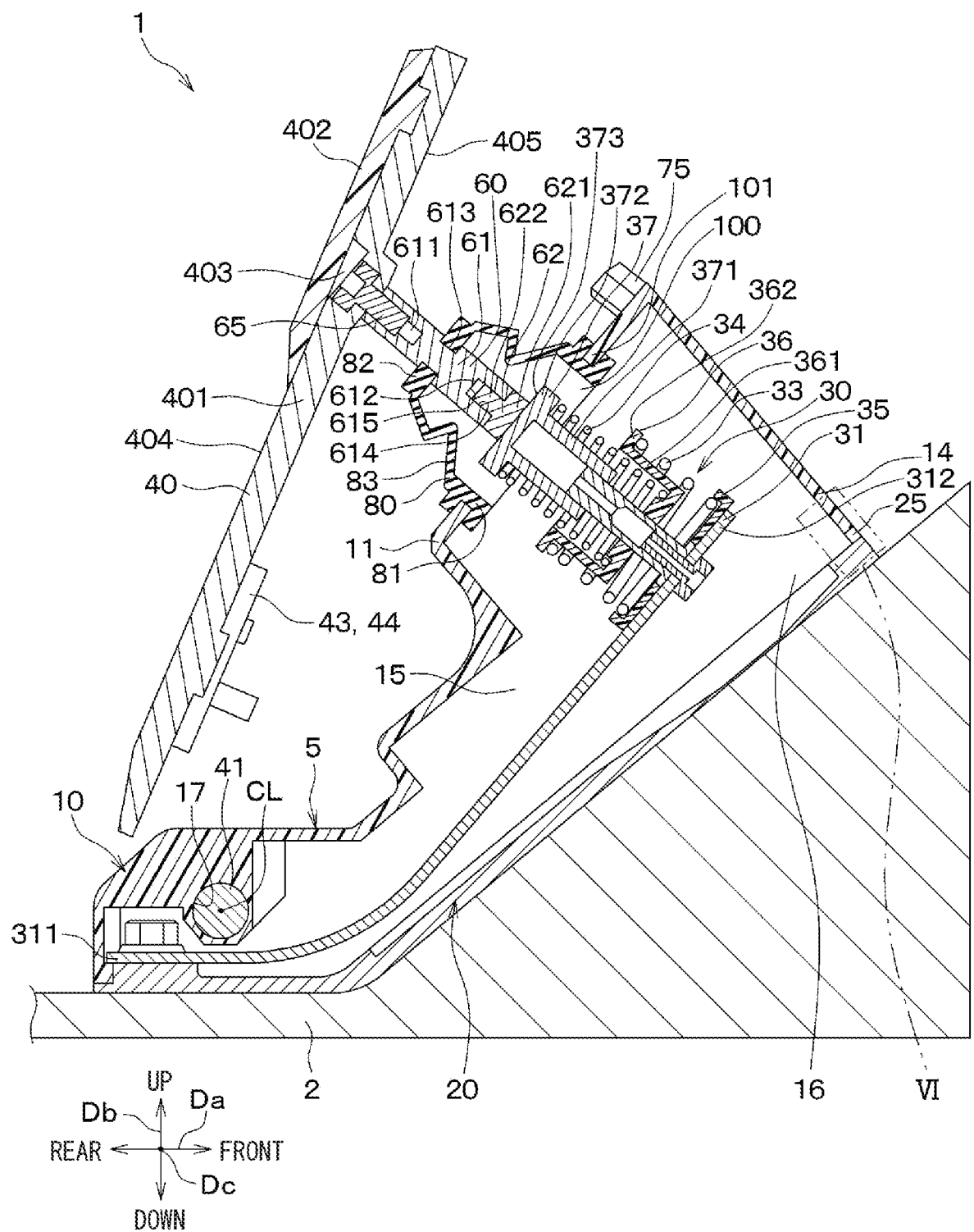
FIG. 4 is a cross-sectional view of the pedal device.

The top wall 11 is a wall of the first housing 10 on the upper side of the vehicle, as shown in FIGS. 2 to 7. Further, the top wall 11 includes a housing hole 100 and a housing end 101, as shown in FIG. 4. Most part of the reaction force generating mechanism 30 described later is inserted into the housing hole 100. The housing end 101 defines the housing hole 100. The left side wall 12 is a wall of the first housing 10 on the left side of the vehicle, as shown in FIG. 3.

Figure 5:
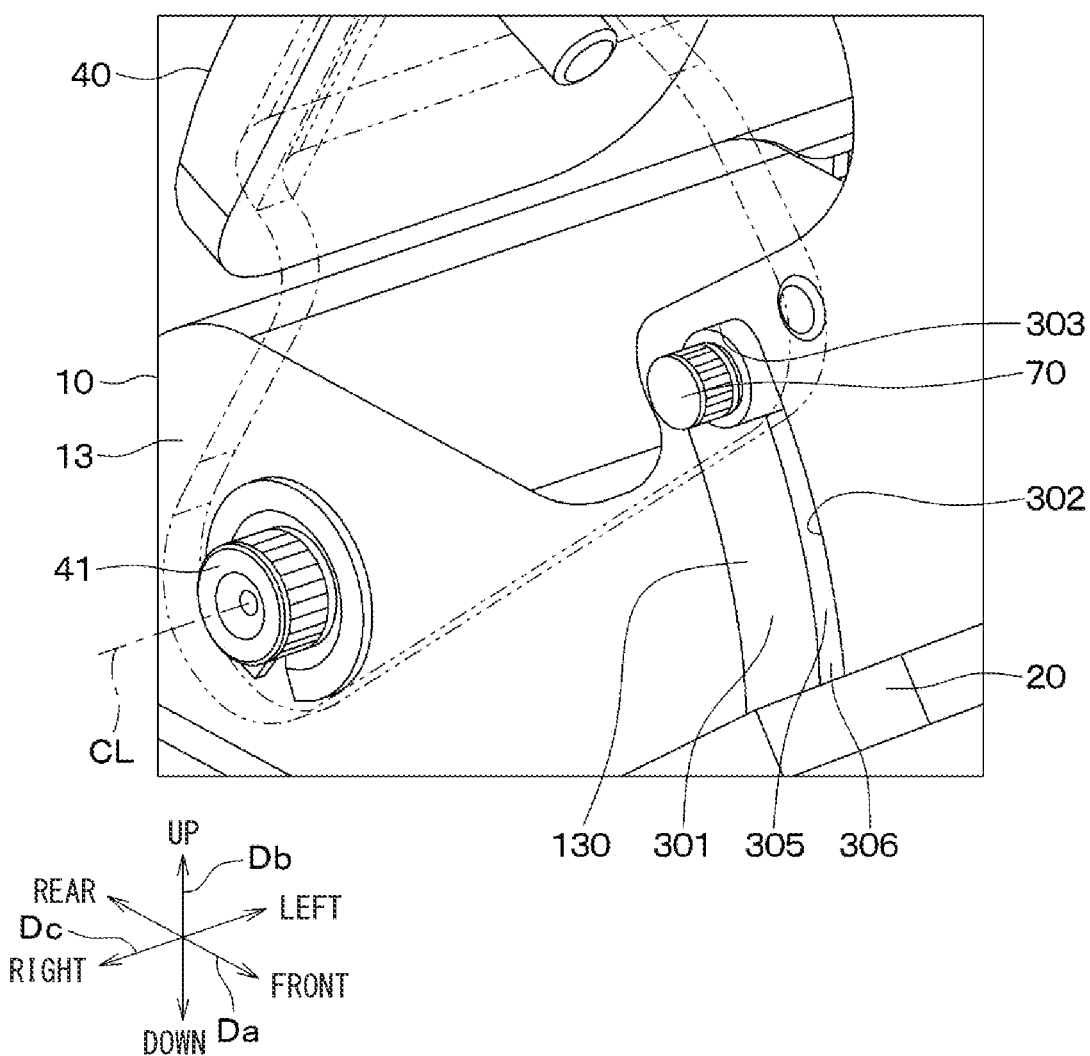
FIG. 5 is a perspective view of a portion of the pedal device.

The right side wall 13 is, as shown in FIGS. 2 and 5, a wall of the first housing 10 on the right side of the vehicle. The right side wall 13 also includes a housing recess 130.

The housing recess 130 is recessed from an outer surface of the right side wall 13 in the left direction of the vehicle. Further, the housing recess 130 includes a housing recess bottom surface 305, a housing recess first side surface 301, a housing recess second side surface 302, a housing recess third side surface 303 and a housing recess space 306.

The housing recess bottom surface 305 is a surface facing the right side of the vehicle. Further, the housing recess bottom surface 305 is formed in an arc shape centered on the rotation axis CL of the pedal 40, which will be described later.

The housing recess first side surface 301 is connected to a vehicle rear side of the housing recess bottom surface 305. Further, the housing recess first side surface 301 is formed in a shape of a side surface of an arc column centered on the rotation axis CL of the pedal 40, which will be described later.

The housing recess second side surface 302 is connected to a vehicle front side of the housing recess bottom surface 305. Further, the housing recess second side surface 302 is formed in a shape of a side surface of an arc column centered on the rotation axis CL of the pedal 40, which will be described later.

The housing recess third side surface 303 is connected to a vehicle upper side of the following three surfaces, i.e., the housing recess bottom surface 305, the housing recess first side surface 301, and the housing recess second side surface 302.

The housing recess space 306 is a space formed by the housing recess bottom surface 305, the housing recess first side surface 301, the housing recess second side surface 302 and the housing recess third side surface 303. Further, the housing recess space 306 is formed in an arc shape centered on the rotation axis CL of the pedal 40 described later, due to the shapes of the housing recess bottom surface 305, the housing recess first side surface 301, and the housing recess second side surface 302.

The front wall 14 is a wall of the first housing 10 on the front side of the vehicle, as shown in FIG. 4. The housing space 15 is a space formed by the top wall 11, the left side wall 12, the right side wall 13 and the front wall 14. The housing opening 16 is an open space formed by an end of the top wall 11, an end of the left side wall 12, an end of the right side wall 13 and an end of the front wall 14 in the housing space 15. The bearing hole 17 is a cylindrical space extending in the vehicle left-right direction Dc.

The second housing 20 is formed in a plate shape, and is connected to the respective ends of the top wall 11, the left side wall 12, the right side wall 13 and the front wall 14 of the first housing 10. Also, for example, a hole (not shown) at the end of the top wall 11 of the first housing 10, a hole (not shown) at the end of the left side wall 12, a hole (not shown) at the end of the right side wall 13, a hole (not shown) at the end of the front wall 14, and holes on the second housing 20 corresponding thereto each have a bolt (not shown) inserted thereinto. Thereby, the second housing 20 is fixed to the first housing 10 and closes the housing opening 16. Also, the second housing 20 is made of metal. Furthermore, as described above, the first housing 10 is made of resin. Therefore, the Young's modulus of the second housing 20 is higher than that of the first housing 10. Thus, the rigidity of the housing 5 is higher than when both the first housing 10 and the second housing 20 are made of resin. Furthermore, as shown in FIG. 3, housing bolts 22 are inserted into (i) the holes of the second housing 20 and (ii) the holes of the floor 2 corresponding to the holes of the second housing 20, thereby fixing the second housing 20 and the floor 2. In such manner, the pedal device 1 is fixed to the floor 2.

Figure 6:
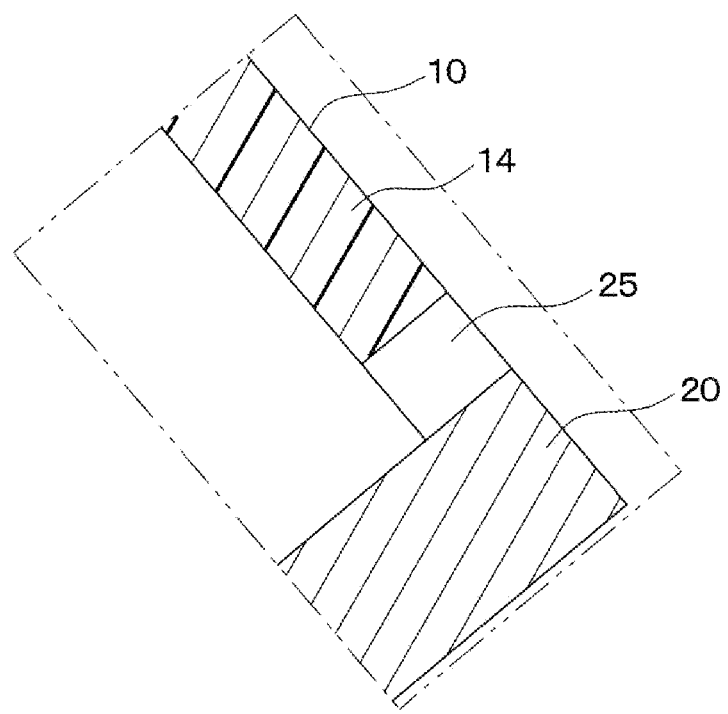
FIG. 6 is an enlarged view of a VI portion in FIG. 4.

The breathing hole 25 is a space formed at a position between the first housing 10 and the second housing 20, as shown in FIG. 6. Therefore, the breathing hole 25 communicates with the housing space 15 and a space outside the housing 5. Further, the breathing hole 25 is formed at a certain position, e.g., either in an end of the front wall 14 of the first housing 10 or in the second housing 20 on a vehicle front side and on a vehicle upper side. Furthermore, the distance from the first housing 10 to the second housing 20 in the breathing hole 25 is approximately 0.05 mm to 1.0 mm.

The reaction force generating mechanism 30 generates a reaction force against the driver's stepping force applied to the pedal 40. For example, the reaction force generating mechanism 30 includes a leaf spring 31, a lower holder 35, a large-diameter coil spring 33, a small-diameter coil spring 34, a spring seat 36 and an upper holder 37, as shown in FIG. 4.

The leaf spring 31 is curved so as to form a convex curved surface toward the floor 2 when not receiving a load. Further, one end 311 of the leaf spring 31 is connected to a vehicle rear side of the second housing 20. The lower holder 35 is connected to an other end 312 of the leaf spring 31. The large-diameter coil spring 33 is connected to one side of the lower holder 35 opposite to the leaf spring 31. The spring seat 36 includes a spring seat small-diameter portion 361 and a spring seat large-diameter portion 362. The spring seat small-diameter portion 361 is formed in a cylindrical shape with a bottom. Further, the spring seat small-diameter portion 361 is arranged in a space inside the large-diameter coil spring 33. The spring seat large-diameter portion 362 is connected to one side of the spring seat small-diameter portion 361 opposite to the bottom. Also, a diameter of the spring seat large-diameter portion 362 is larger than a diameter of the spring seat small-diameter portion 361. Thereby, the spring seat large-diameter portion 362 and the large-diameter coil spring 33 are connected. Further, a small-diameter coil spring 34 is accommodated in the spring seat small-diameter portion 361, and is connected to the bottom of the spring seat small-diameter portion 361.

The upper holder 37 has a holder small-diameter portion 371 and a holder large-diameter portion 372. The holder small-diameter portion 371 is formed in a tubular shape. Further, the holder small-diameter portion 371 is arranged in a space inside the small-diameter coil spring 34. Further, a pin is inserted into each of a hole of the leaf spring 31, a hole of the lower holder 35, a hole of the spring seat small-diameter portion 361, and a hole of the holder small-diameter portion 371, so that the leaf spring 31, the lower holder 35, the spring seat 36 and the upper holders 37 are connected to each other. In addition, the pin slides on an inner surface of the small-diameter portion 371 of the holder and also on an inner surface of the spring seat small-diameter portion 361. The holder large-diameter portion 372 is connected to the holder small-diameter portion 371 on one side opposite to the spring seat 36. Further, a diameter of the holder large-diameter portion 372 is larger than a diameter of the holder small-diameter portion 371. Thereby, the holder large-diameter portion 372 and the small-diameter coil spring 34 are connected. Further, the holder large-diameter portion 372 includes a contact surface 373 that is in contact with the connecting rod 60, which will be described later. The contact surface 373 is a surface of the holder large-diameter portion 372 opposite to the holder small-diameter portion 371, and is flat.

The pedal 40 is formed in a plate shape. The pedal 40 includes a pedal plate portion 401 and a rod fixing hole 403.

The pedal plate portion 401 is made of metal. The pedal plate portion 401 includes a pedal surface 404 and a pedal back surface 405. The pedal surface 404 is one side facing the driver of the vehicle. The pedal back surface 405 is a surface of the pedal plate portion 401 opposite to the pedal surface 404.

The rod fixing hole 403 is a hole penetrating through the pedal surface 404 and the slope 407 of the pedal back surface 405.

The pad 402 is made of rubber or the like. Further, the pad 402 is connected to the vehicle upper side of the pedal surface 404. Additionally, the pad 402 is stepped on by the driver of the vehicle. Further, the pad 402 covers a pedal surface 404 side of the rod fixing hole 403. In such manner, the rod fixing hole 403 is not visible to the driver of the vehicle.

The shaft 41 is made of metal, and has a cylindrical shape. Further, the shaft 41 is inserted into the bearing hole 17 of the first housing 10, and is rotatably supported by the first housing 10.

The rotating plate 43 is formed in an L shape. Further, as shown in FIGS. 2 and 4, the rotating plate 43 includes a back plate portion 44 and a side plate portion 45. As shown in FIG. 4, the back plate portion 44 is fixed to the pedal back surface 405 by inserting screws into a hole of the back plate portion 44 and into a corresponding hole of the pedal plate portion 401. The side plate portion 45 is vertically connected to a vehicle right side of the back plate portion 44. Further, the side plate portion 45 also includes a shaft hole 451 and a stopper hole 452, as shown in FIG. 2.

The shaft 41 is inserted into the shaft hole 451. The pedal 40 are thus connected to the shaft 41 via the rotating plate 43. Thereby, the pedal 40 rotates together with the shaft 41 and the rotating plate 43, about the rotation axis CL, which is an axis of the shaft 41.

The stopper hole 452 is formed on a vehicle front side of the shaft hole 451. Further, the stopper hole 452 communicates with the housing recess space 306. Further, a part of the first stopper 70 described later is inserted into the stopper hole 452.

As shown in FIG. 3, the sensor unit 50 is arranged on one side of the shaft 41 opposite to the side plate portion 45, that is, on the left side of the vehicle. Further, the sensor unit 50 includes a magnet, a yoke, a Hall element, or the like. (not shown). The sensor unit 50 detects a rotation angle of the pedal 40 by detecting a rotation angle of the shaft 41 using the magnet, the yoke, the Hall element, or the like. Further, the sensor unit 50 outputs a signal corresponding to the detected rotation angle of the pedal 40 to the first ECU 111 and the second ECU 112. Note that the sensor unit 50 may include an MR element instead of the Hall element. MR is an abbreviation of Magneto Resistive. Further, the sensor unit 50 may be an inductive sensor that detects a rotation angle using a coil.

The connecting rod 60 is made of metal, and has a rod shape. As shown in FIG. 4, the connecting rod 60 includes an arm portion 61 and a push portion 62.

The arm portion 61 includes an arm hole 611, an arm recess 612, and a cover member recess 613. The arm hole 611 is a hole corresponding to the rod fixing hole 403. The arm portion 61 is fixed to the pedal back surface 405 by inserting the rod connecting screw 65 into the arm hole 611 and the rod fixing hole 403.

The arm recess 612 is recessed in the axial direction of the connecting rod 60 from an end surface of the arm portion 61 on a push portion 62 side (to be described later). The arm recess 612 includes an arm recess side surface 614 and an arm recess bottom surface 615. The arm recess side surface 614 is connected to an end surface of the arm portion 61 on a push portion 62 side, which will be described later. The arm recess bottom surface 615 is connected to the arm recess side surface 614. Further, a space is formed by the arm recess side surface 614 and the arm recess bottom surface 615.

Figure 7:
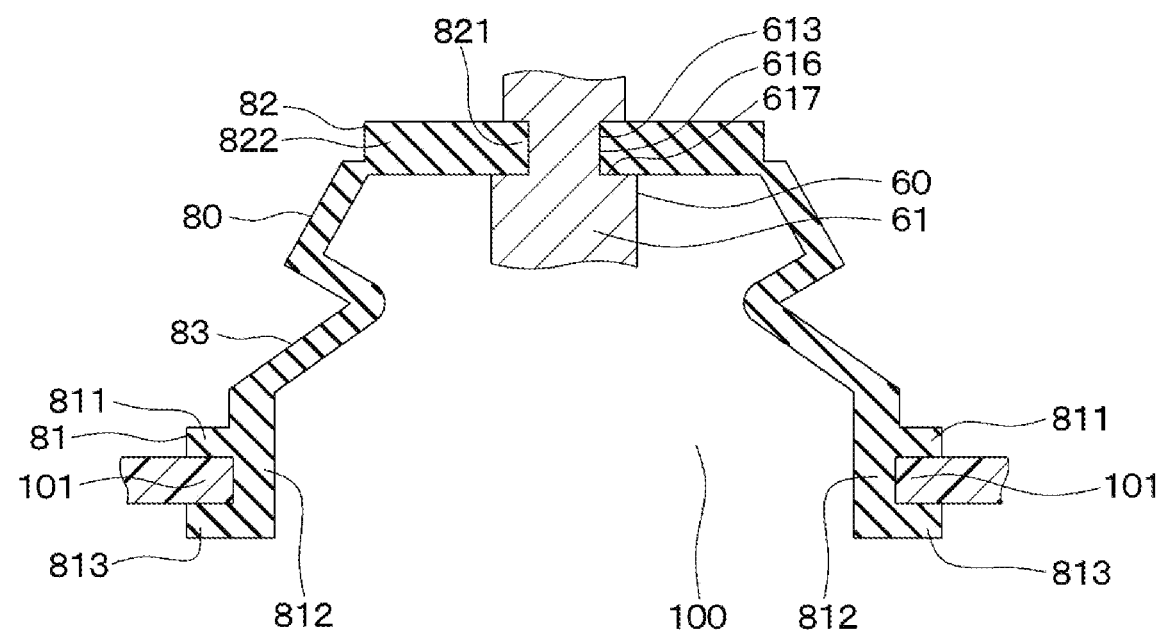
FIG. 7 is a cross-sectional view of a connecting rod, a cover member, and a housing end portion of the pedal device.

The cover member recess 613 is recessed from a side surface of the arm portion 61 in a direction orthogonal to the axial direction of the connecting rod 60. Further, as shown in FIG. 7, the cover member recess 613 includes a cover member recess side surface 617 and a cover member recess bottom surface 616. The cover member recess side surface 617 is connected to a side surface of the arm portion 61. Further, the cover member recess side surface 617 faces the axial direction of the connecting rod 60. The cover member recess bottom surface 616 is connected to the cover member recess side surface 617. Further, the cover member recess bottom surface 616 faces in a direction orthogonal to the axial direction of the connecting rod 60. Further, a space is formed by the cover member recess bottom surface 616 and the cover member recess side surface 617.

The push portion 62 includes a push contactor 621 and a push convex portion 622. The push contactor 621 is in contact with the mechanism-side contact surface 373 of the upper holder 37 in the reaction force generating mechanism 30. The push convex portion 622 protrudes in the axial direction of the connecting rod 60 from one side of the push contactor 621 opposite to the mechanism-side contact surface 373. Also, the push convex portion 622 is inserted into a space formed by the arm recess side surface 614 and the arm recess bottom surface 615. Thereby, the arm portion 61 and the push portion 62 are connected.

As shown in FIGS. 2 and 5, the first stopper 70 is shaped like a rod extending in the vehicle left-right direction Dc. A part of the first stopper 70 is inserted into the stopper hole 452 of the rotating plate 43. In such manner, the first stopper 70 rotates together with the rotating plate 43, the pedal 40 and the shaft 41 about the rotation axis CL, which is the axis of the shaft 41. Further, a part of the first stopper 70 is inserted into the housing recess space 306. The second stopper 75 protrudes from a vehicle upper side portion of the top wall 11 of the first housing 10 toward the pedal 40.

The cover member 80 is made of an elastic material such as rubber. Further, as shown in FIG. 4, the cover member 80 is arranged on the front side of the vehicle with respect to the pedal back surface 405. Further, the cover member 80 covers the housing hole 100. Specifically, the cover member 80 has a first connecting portion 81, a second connecting portion 82 and a covering portion 83.

The first connecting portion 81 is connected to the housing end portion 101 of the top wall 11 of the first housing 10. Further, the first connecting portion 81 includes a first extension portion 811, a second extension portion 812 and a third extension portion 813, as shown in FIG. 7.

The first extension portion 811 is connected to an outer surface of the housing end portion 101. Also, the first extension portion 811 extends in a direction orthogonal to the axial direction of the connecting rod 60.

The second extension portion 812 is connected to a side surface of the housing end portion 101 and the first extension portion 811. Also, the second extension portion 812 extends from the first extension portion 811 in the axial direction of the connecting rod 60. Further, the side surface of the housing end portion 101 is a surface connected to the outer surface and the inner surface of the housing end portion 101.

The third extension portion 813 is connected to the inner surface of the housing end portion 101 and the second extension portion 812. Further, the third extension portion 813 extends in a direction orthogonal to the axial direction of the connecting rod 60 from one side of the second extension portion 812 opposite to the first extension portion 811. Furthermore, here, the length of the third extension portion 813 in the direction orthogonal to the axial direction of the connecting rod 60 is the same as the length of the first extension portion 811. Further, a space that is recessed in a direction orthogonal to the axial direction of the connecting rod 60 is formed by the first extension portion 811, the second extension portion 812 and the third extension portion 813. The housing end portion 101 is inserted into the above-described space. In such manner, the first connecting portion 81 hardly comes off from the housing end portion 101.

The second connecting portion 82 is connected to the arm portion 61 of the connecting rod 60. Also, the second connecting portion 82 includes an insertion portion 821 and a protruding portion 822. The insertion portion 821 is inserted into a space formed by the cover member recess bottom surface 616 and the cover member recess side surface 617 of the arm portion 61. The protruding portion 822 protrudes from an entire circumference of the insertion portion 821 in a direction orthogonal to the axial direction of the connecting rod 60.

The covering portion 83 is formed in a bellows shape. Also, the covering portion 83 is connected to the first extension portion 811 and the second connecting portion 82 of the first connecting portion 81. Thereby, the covering portion 83 covers a portion of the arm portion 61 of the connecting rod 60, the push portion 62, a portion of the upper holder 37 and the housing hole 100.

The brake-by-wire system 150 is configured as described above. Next, operation of the pedal device 1 will be described.

When the driver of the vehicle does not step on the pad 402 of the pedal 40, the large-diameter coil spring 33 and the small-diameter coil spring 34 of the reaction force generating mechanism 30 are compressed. At this time, restoring forces of the large-diameter coil spring 33 and the small-diameter coil spring 34 are transmitted to the pedal 40 via the connecting rod 60 connected to the upper holder 37 of the reaction force generating mechanism 30. This restoring force causes the pedal 40 to rotate in a direction away from the first housing 10. Also, at this time, the first stopper 70 connected to the pedal 40 via the rotating plate 43 contacts the housing recess third side surface 303 of the right side wall 13 of the first housing 10. In such manner, a position of the pedal 40 when the driver of the vehicle is not stepping on the pad 402 of the pedal 40 is fixed.

When the driver of the vehicle steps on the pad 402 of the pedal 40, the pedal 40 rotates together with the shaft 41 and the rotating plate 43 about the rotation axis CL, which is the axis of the shaft 41. Such a rotation causes the pedal 40 to rotate in a direction toward the first housing 10.

At this time, the sensor unit 50 detects the rotation angle of the pedal 40 by detecting the rotation angle of the shaft 41. Further, the sensor unit 50 outputs a signal corresponding to the detected rotation angle of the pedal 40 to the first ECU 111 and the second ECU 112.

At this time, the first ECU 111 rotates the motor 123 by supplying electric power to the motor 123, for example. In such manner, the gear mechanism 125 is driven and the master piston 127 is moved. Therefore, the hydraulic pressure of the brake fluid supplied from the reservoir 124 to the master cylinder 126 increases. This increased hydraulic pressure is supplied to the second brake circuit 122.

Also, the second ECU 112 supplies electric power to an electromagnetic valve (not shown) of the second brake circuit 122, for example. In such manner, a solenoid valve of the second brake circuit 122 opens. Therefore, the brake fluid supplied to the second brake circuit 122 is supplied to each of the wheel cylinders 131 to 134. Thus, the brake pads attached to the wheel cylinders 131 to 134 rub against their corresponding brake discs. Therefore, each wheel is braked and the vehicle is decelerated. At this time, the second ECU 112 may perform ABS control, VSC control, collision avoidance control, regenerative cooperative control, or the like, based on signals from the sensor unit 50 and signals from other electronic control devices (not shown). ABS is an abbreviation of Anti-lock Braking System. VSC is an abbreviation of Vehicle Stability Control.

Further, at this time, since the connecting rod 60 connected to the pedal 40 rotates together with the pedal 40 about the rotation axis CL, the connecting rod 60 passes through the housing hole 100. Furthermore, since the second connecting portion 82 of the cover member 80 rotates together with the connecting rod 60, the bellows-shaped covering portion 83 is compressed. Due to the restoring force of the covering portion 83 at this time, the covering portion 83 generates a reaction force against the driver's stepping force applied to the pedal 40.

Further, force from the pedal 40 is transmitted to the upper holder 37 by the push portion 62 of the connecting rod 60 coming into contact with the upper holder 37 of the reaction force generating mechanism 30. In such manner, an inner surface of the holder small-diameter portion 371 of the upper holder 37 and the pin slide, and the small-diameter coil spring 34 is compressed by the upper holder 37. Further, force from the pedal 40 is transmitted to the spring seat 36 via the small-diameter coil spring 34. Also, the contact of the upper holder 37 with the spring seat 36 causes force from the pedal 40 to be transmitted to the spring seat 36 via the upper holder 37. Therefore, an inner surface of the spring seat small-diameter portion 361 of the spring seat 36 and the pin slide, and the large-diameter coil spring 33 is compressed by the spring seat 36. Further, force from the pedal 40 is transmitted to the leaf spring 31 via the large-diameter coil spring 33. Therefore, the leaf spring 31 bends. Further, when an inner surface of the holder small-diameter portion 371 of the upper holder 37 and the pin slide and the holder large-diameter portion 372 of the upper holder 37 comes into contact with the pin, force from the pedal 40 is transmitted to the leaf spring 31 via the pin. In such manner, the leaf spring 31 bends. At this time, the reaction force generating mechanism 30 generates a reaction force against the driver's stepping force applied to the pedal 40 by the restoring force of the plate spring 31, the large-diameter coil spring 33 and the small-diameter coil spring 34. Therefore, even if the pedal 40 and the master cylinder 126 are not mechanically connected to each other, the pedal device 1 produces the corresponding reaction force as when the pedal 40 are connected to the master cylinder 126, i.e., when the hydraulic reaction force is obtainable.

Also, at this time, air in the housing space 15 is compressed by receiving force from the pedal 40. Therefore, the air in the housing space 15 flows out to the space outside the housing 5 through the breathing hole 25.

Also, at this time, the first stopper 70 connected to the pedal 40 via the rotating plate 43 rotates with the axis of the shaft 41 as the rotation axis CL. Further, the housing recess space 306 into which a portion of the first stopper 70 is inserted is formed in an arc shape about the rotation axis CL of the pedal 40. Therefore, the first stopper 70 moves within the housing recess space 306. Also, the second stopper 75 contacts the pedal back surface 405. Thus, at this time, even if the driver's stepping force applied to the pedals 40 is increased, the rotation of the pedals 40 is stopped. Further, at this time, the rotation angle of the pedal 40 is maximized.

Further, when the driver of the vehicle stops stepping on the pad 402 of the pedal 40, the reaction force of the reaction force generating mechanism 30 and the covering portion 83 cause the pedal 40 to rotate away from the first housing 10. At this time, the first stopper 70 rotates together with the pedal 40. In such manner, the first stopper 70 contacts the housing recess third side surface 303 of the right side wall 13 of the first housing 10 after moving within the housing recess space 306. Therefore, the pedal 40 stops rotating. In such manner, the position of the pedal 40 returns to an initial position, i.e., to a position when the driver of the vehicle does not step on the pad 402 of the pedal 40.

Further, when the driver of the vehicle stops stepping on the pad 402 of the pedal 40, the air in the housing space 15 expands due to the release of the stepping force applied by the driver of the vehicle. Therefore, the air outside the housing 5 flows into the housing space 15 through the breathing hole 25.

Thus, the pedal device 1 operates in the above-described manner. Next, how the pedal device 1 suppresses foreign matter from entering into the housing 5 will be described.

The pedal device 1 includes the pedal 40, the connecting rod 60, the reaction force generating mechanism 30, the housing 5 and the cover member 80. The pedal 40 rotates about the rotation axis CL by being stepped on by the driver of the vehicle. The connecting rod 60 rotates together with the pedal 40 about the rotation axis CL by being connected to the pedal back surface 405. The pedal back surface 405 is the surface of the pedal 40 opposite to the surface that is stepped on by the driver of the vehicle. The reaction force generating mechanism 30 is elastically deformed by receiving force from the pedal 40 through the connecting rod 60 when the pedal 40 is stepped on by the driver of the vehicle, and generates a reaction force against the stepping force of the driver of the vehicle applied to the pedal 40. The housing 5 has the housing hole 100, and accommodates the reaction force generating mechanism 30. The housing hole 100 is a hole through which the connecting rod 60 passes when the pedal 40 is stepped on by the driver of the vehicle. The cover member 80 has the first connecting portion 81 and the covering portion 83. The first connecting portion 81 is connected to the housing end portion 101. The housing end portion 101 forms the housing hole 100 in the housing 5. The covering portion 83 is arranged at a position between the first connecting portion 81 and the pedal back surface 405, and is connected to the first connecting portion 81 to cover the housing hole 100. Note that the driver of the vehicle corresponds to an operator. The first connecting portion 81 corresponds to a housing connection portion.

Since the covering portion 83 is arranged at a position between the first connecting portion 81 and the pedal back surface 405, the cover member 80 is not stepped on by the driver of the vehicle. Therefore, the cover member 80 will not be worn or damaged. Moreover, since the covering portion 83 covers the housing hole 100, foreign matter cannot enter into the housing 5 through the housing hole 100 from the outside of the housing 5. Thus, foreign matter is suppressed from entering into the housing 5.

Further, the pedal device 1 also has the following effects.

[1-1] The covering portion 83 is formed in a bellows shape. Therefore, when the pedal 40 is stepped on by the driver of the vehicle, the covering portion 83 is elastically deformed by receiving force from the pedal 40 via the connecting rod 60, thereby generating a reaction force against the stepping force of the driver applied to the pedal 40.

Thereby, when the connecting rod 60 or the reaction force generating mechanism 30 is damaged, the covering portion 83 can generate a reaction force even when the reaction force of the reaction force generating mechanism 30 is not generated. Therefore, even if the connecting rod 60 or the reaction force generating mechanism 30 is damaged, the position of the pedal 40 can be returned to an initial position when the pad 402 of the pedal 40 is not stepped on by the driver of the vehicle.

[1-2] The cover member 80 further includes the second connecting portion 82. The second connecting portion 82 is connected to the covering portion 83 and the connecting rod 60. The second connecting portion 82 corresponds to a rod connecting portion.

In such manner, since the second connecting portion 82 is connected to the connecting rod 60, the cover member 80 can be fixed to the connecting rod 60.

[1-3] The connecting rod 60 includes a cover member recess 613. The second connecting portion 82 includes an inserting portion 821 and a protruding portion 822. The insertion portion 821 is inserted into a space formed by the cover member recess bottom surface 616 and the cover member recess side surface 617 of the cover member recess 613. The protruding portion 822 protrudes from the insertion portion 821 in a direction orthogonal to the axial direction of the connecting rod 60. Note that the cover member recess 613 corresponds to a rod concave portion. The cover member recess side surface 617 corresponds to a rod side surface. The cover member recess bottom surface 616 corresponds to a rod bottom surface.

In such manner, the second connecting portion 82 hardly comes off from the connecting rod 60. Moreover, the second connecting portion 82 and the connecting rod 60 can be easily connected without providing an additional member. Therefore, the cost of the pedal device 1 is reducible by an amount of the cost of the additional member.

[1-4] The first connecting portion 81 includes the first extension portion 811, the second extension portion 812 and the third extension portion 813. The first extension portion 811 extends in a direction orthogonal to the axial direction of the connecting rod 60. The second extension portion 812 is connected to the first extension portion 811, and extends in the axial direction of the connecting rod 60. The third extension portion 813 is connected to the second extension portion 812 on one side opposite to the first extension portion 811, and extends in a direction orthogonal to the axial direction of the connecting rod 60. Also, the housing end portion 101 is inserted into the space formed by the first extension portion 811, the second extension portion 812 and the third extension portion 813. The direction orthogonal to the axial direction of the connecting rod 60 corresponds to one direction, or the extending direction of the first extension portion 811, or the direction crossing the extending direction of the second extension portion 812. Also, the axial direction of the connecting rod 60 corresponds to the direction crossing the extending direction of the first extension portion 811.

In such manner, the first connecting portion 81 hardly comes off from the housing end portion 101. Further, the first connecting portion 81 and the housing end portion 101 can be easily connected without providing an additional member. Therefore, the cost of the pedal device 1 is reducible by an amount of the cost of the additional member.

[1-5] The housing 5 has the first housing 10 and the second housing 20. The first housing 10 includes the housing end portion 101. The first housing 10 also forms the housing opening 16 and the housing space 15. The housing opening 16 is provided on an opposite side of the housing hole 100. The housing space 15 communicates with the housing hole 100 and the housing opening 16. The second housing 20 closes the housing opening 16. Further, the breathing hole 25, which is a space between the end of the first housing 10 on a housing opening 16 side and the second housing 20, is formed.

Further, when the pedal 40 is stepped on by the driver of the vehicle and the air in the housing space 15 is compressed by receiving the force from the pedal 40, the air in the housing space 15 passes through the breathing hole 25 and flows out to the outside of the housing 5. Further, when the driver of the vehicle stops to step on the pedals 40 after stepping on the pedal 40, the air in the housing space 15 expands as the force from the pedals 40 is released. At this time, air outside the housing 5 flows into the housing space 15 through the breathing holes 25.

The breathing hole 25 alleviates a volume change of the air in the housing space 15 caused by the rotation of the pedal 40. Further, the change in volume of the air in the housing space 15 caused by the temperature change in the housing space 15 is alleviated. Therefore, when the pedal 40 rotates, resistance to compression and expansion of the air in the housing space 15 is reducible, thereby the pedal 40 rotates smoothly. Furthermore, since the breathing hole 25 is formed at a position between the first housing 10 and the second housing 20, there is no need to separately provide an additional hole and a dedicated hole drilling process is not required, which facilitates the manufacturing of the pedal device 1.

Second Embodiment

Figure 8:
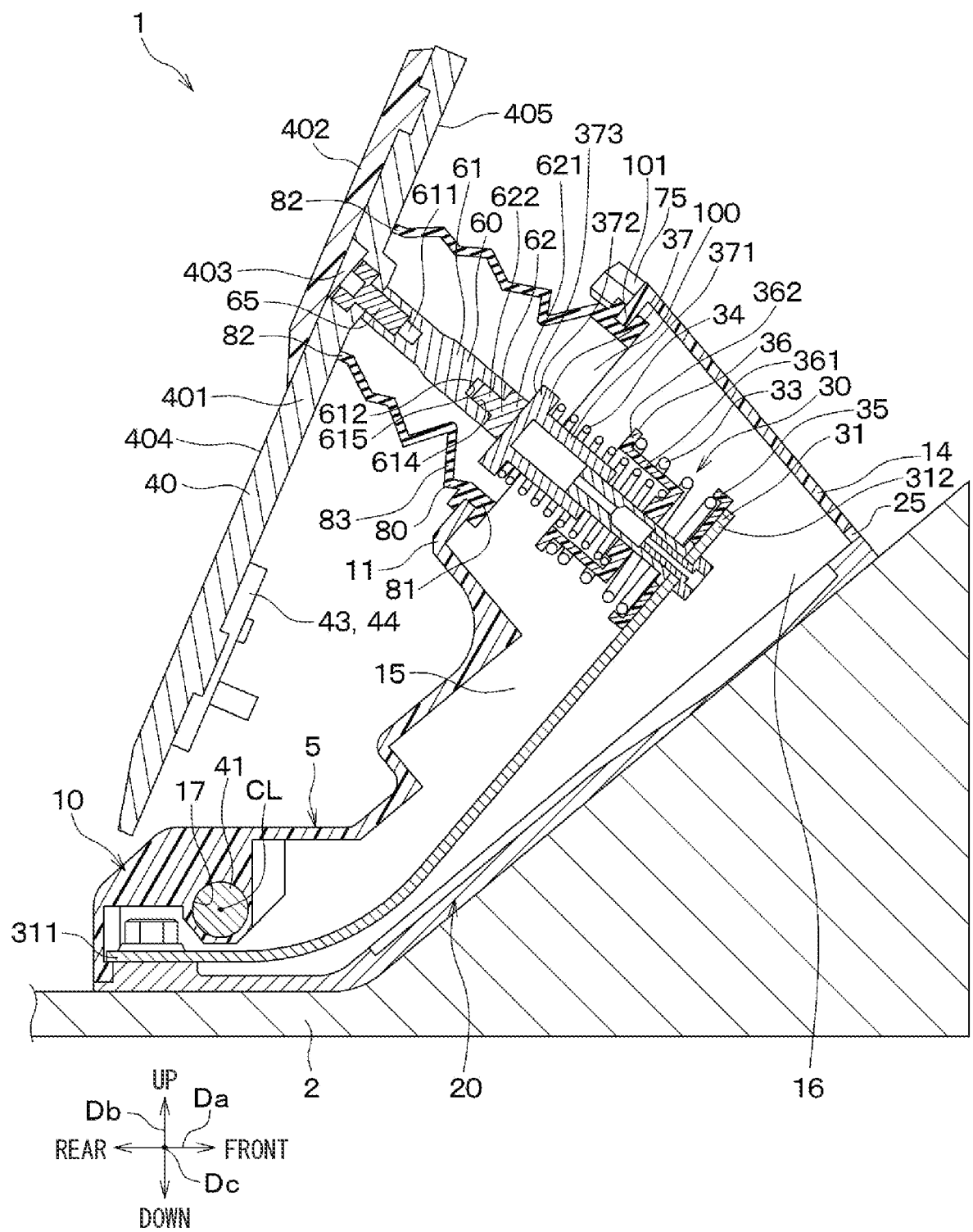
FIG. 8 is a cross-sectional view of a pedal device of a second embodiment.

In the first embodiment described above, the second connecting portion 82 of the cover member 80 is connected to the connecting rod 60. In contrast, in the second embodiment, as shown in FIG. 8, a second connecting portion 82 is connected to a pedal back surface 405 by welding, adhesion, two-color molding, or the like. In such case, an arm portion 61 of a connecting rod 60 is not provided with a cover member recess 613.

The second embodiment is configured in the above-described manner. Also in the second embodiment, the same or corresponding effects as in the first embodiment can be obtained except for the above-described item [1-2]. Moreover, in the second embodiment, the following effects [2] can be obtained.

[2] In the present embodiment, the second connecting portion 82 is connected to a covering portion 83 and to the pedal back surface 405. The second connecting portion 82 corresponds to a pedal connecting portion.

Thereby, a cover member 80 can be fixed to a pedal 40. Further, even when it is difficult to fix the cover member 80 to the connecting rod 60 due to the connecting rod 60 being short, the cover member 80 can still be fixed.

Third Embodiment

Figure 9:
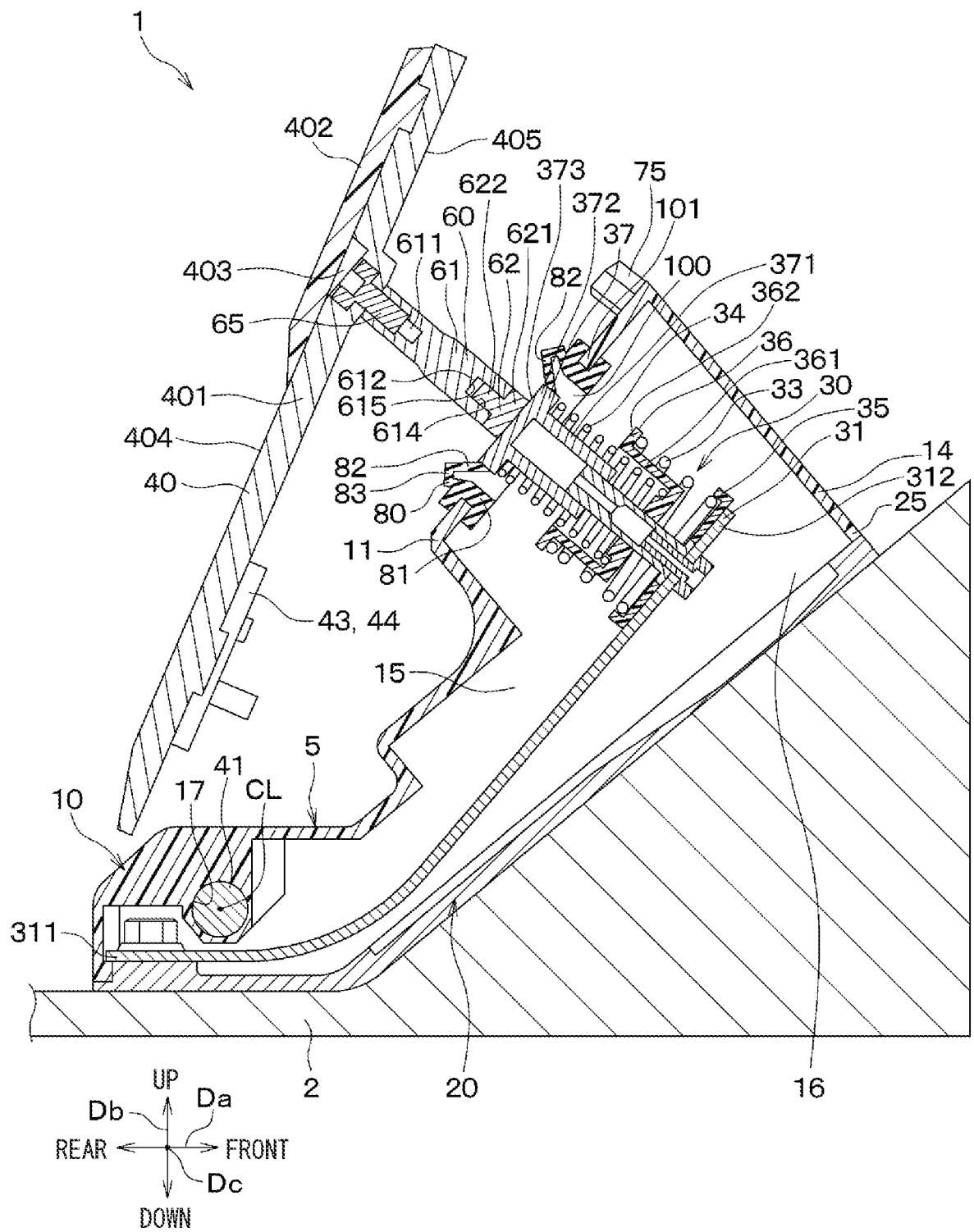
FIG. 9 is a cross-sectional view of a pedal device of a third embodiment.

In the first embodiment described above, the second connecting portion 82 of the cover member 80 is connected to the connecting rod 60. In contrast, in the third embodiment, as shown in FIG. 9, a second connecting portion 82 is connected by welding, bonding, two-color molding, or the like, to a side surface of a holder large-diameter portion 372 of an upper holder 37 in a reaction force generating mechanism 30. The side surface of the holder large-diameter portion 372 is a surface connected to a contact surface 373 of the upper holder 37 that is in contact with a connecting rod 60.

The third embodiment is configured in the above-described manner. Also in the third embodiment, the same or corresponding effects as in the first embodiment can be obtained except for the above-described item [1-2]. Moreover, in the third embodiment, the effects [3] described below can be also obtained.

[3] The second connecting portion 82 is connected to a covering portion 83 and to the side surface of the holder large-diameter portion 372 of the upper holder 37 in the reaction force generating mechanism 30. The second connecting portion 82 corresponds to a mechanism connecting portion.

Thereby, a cover member 80 can be fixed to the reaction force generating mechanism 30. Further, even when it is difficult to fix the cover member 80 to a connecting rod 60 or a pedal back surface 405, the cover member 80 can still be fixed.

Fourth Embodiment

Figure 10:
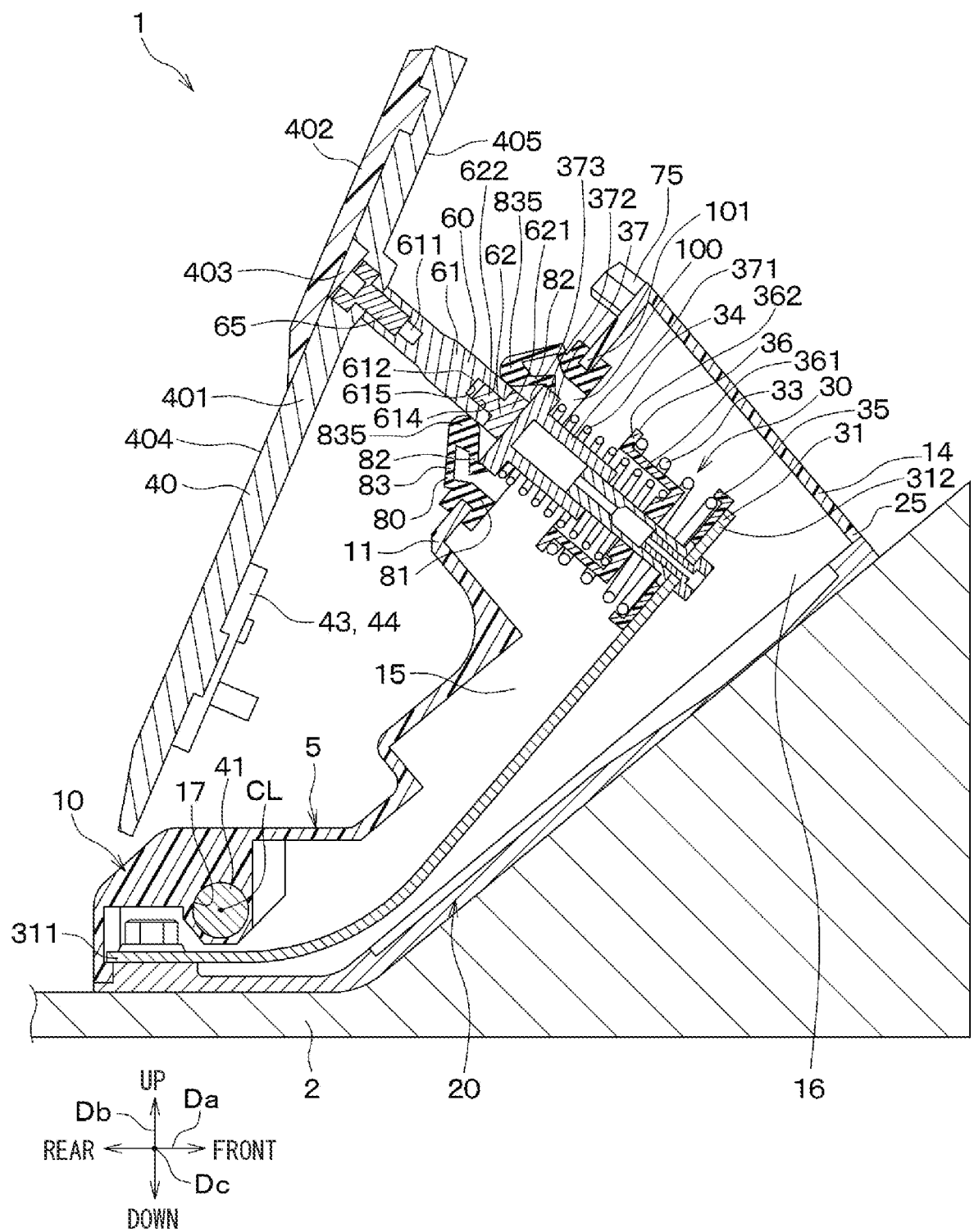
FIG. 10 is a cross-sectional view of a pedal device of a fourth embodiment.

In the fourth embodiment, a covering portion 83 of a cover member 80 has a sliding portion 835 as shown in FIG. 10. The other configurations correspond to those of the third embodiment. A sliding portion 835 slides on a side surface of a connecting rod 60 when a pedal 40 rotates by a stepping of a driver of a vehicle.

The fourth embodiment is configured in the above-described manner. The fourth embodiment achieves effects similar to the effects achieved by the first embodiment. Moreover, in the fourth embodiment, the following effects [4] can be obtained.

[4] The sliding portion 835 of the covering portion 83 slides on the side surface of the connecting rod 60 when the driver of the vehicle steps on the pedal 40 to rotate.

Here, when a pedal body is covered with a member such as rubber as in the automobile pedal disclosed in Patent Document 1, a footwear of the driver of the vehicle rubs, i.e., causes friction, against such a member. However, since such a friction varies depending on the footwear worn by the driver, it becomes difficult to design the life of the member that covers the pedal.

On the other hand, since the covering portion 83 is arranged on a side of the pedal back surface 405, it does not rub against the footwear of the driver of the vehicle. Further, if the sliding portion 835 of the covering portion 83 slides against the side surface of the connecting rod 60, the covering portion 83 suppresses the intrusion of abrasion powder into a housing 5, and an optimum material for such sliding can be selected. Therefore, it is possible to easily design the life of the covering portion 83 at a low cost.

Further, friction between the sliding portion 835 of the covering portion 83 and the side surface of the connecting rod 60 causes a resistance corresponding to the rotation speed of the pedal 40 to occur in the pedal 40 via the connecting rod 60. Therefore, the force acting on the pedal 40 becomes hysteresis. Further, when the driver of the vehicle slightly steps on the pedal 40, the pedal 40 does not rotate due to this resistance force. Thus, the behavior of the vehicle becomes less prone to hunting.

Fifth Embodiment

Figure 11:
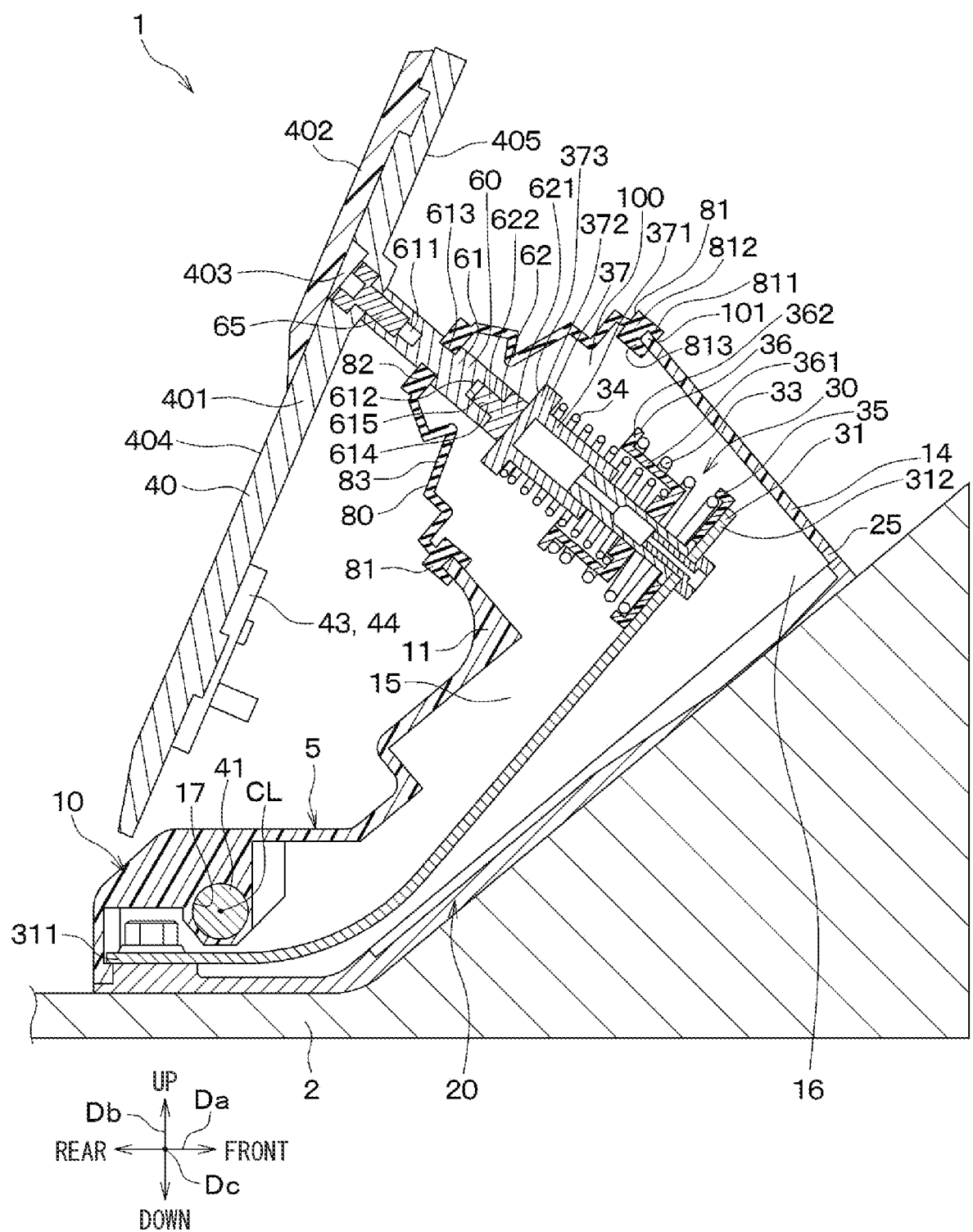
FIG. 11 is a cross-sectional view of a pedal device of a fifth embodiment.

The fifth embodiment is different from the first embodiment in the form of a housing end portion 101 and the form of a first connecting portion 81 of a cover member 80. The housing end portion 101 faces upward and rearward of the vehicle, as shown in FIG. 11. Also, the size of a housing hole 100 of the fifth embodiment is larger than the size of the housing hole 100 of the first embodiment. In such case, a pedal device 1 does not have a second stopper 75. However, when a pedal 40 rotates, for example, a first stopper 70 of the pedal device 1 contacts a surface of a second housing 20 on one side of a first housing 10. Therefore, at this time, even if the driver's stepping force applied to the pedal 40 is increased, the rotation of the pedal 40 is stopped. Thus, at this time, the rotation angle of the pedal 40 is maximized.

A first extension portion 811 of the first connecting portion 81 is connected to an outer surface of the housing end portion 101. Further, the first extension portion 811 extends in the vehicle upward direction and the vehicle rearward direction. The vehicle upward direction and the vehicle rearward direction correspond to one direction and the extending direction of the first extension portion 811.

A second extension portion 812 is connected to a covering portion 83 of the cover member 80, the side surface of the housing end portion 101 and the first extension portion 811. Further, the second extension portion 812 extends in a direction crossing the extending direction of the first extension portion 811.

A third extension portion 813 is connected to the inner surface of the housing end portion 101 and the second extension portion 812. The third extension portion 813 extends in the vehicle front direction and the vehicle lower direction from one side of the second extension portion 812 opposite to the first extension portion 811. Further, a space is formed by the first extension portion 811, the second extension portion 812 and the third extension portion 813. The housing end portion 101 is inserted into the above-described space. In such manner, the first connecting portion 81 hardly comes off from the housing end portion 101. The vehicle front direction and the vehicle lower direction correspond to directions crossing the extending direction of the second extension portion 812.

The fifth embodiment is configured in the above-described manner. The fifth embodiment achieves effects similar to the effects achieved by the first embodiment.

Sixth Embodiment

In the sixth embodiment, the shapes of a housing hole 100 of a first housing 10 and a first connecting portion 81 of a cover member 80 are different from those of the first embodiment.

Figure 12:
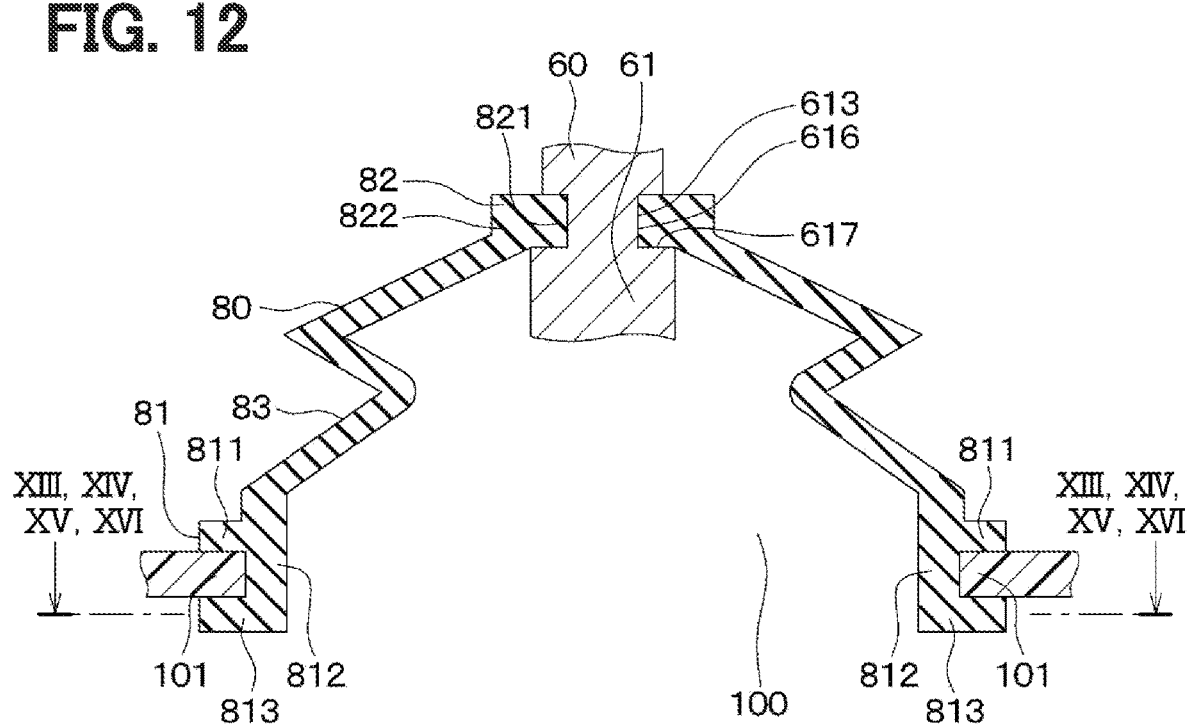
FIG. 12 is a cross-sectional view of a connecting rod, a cover member, and a housing end of a pedal device of a sixth embodiment.
Figure 13:
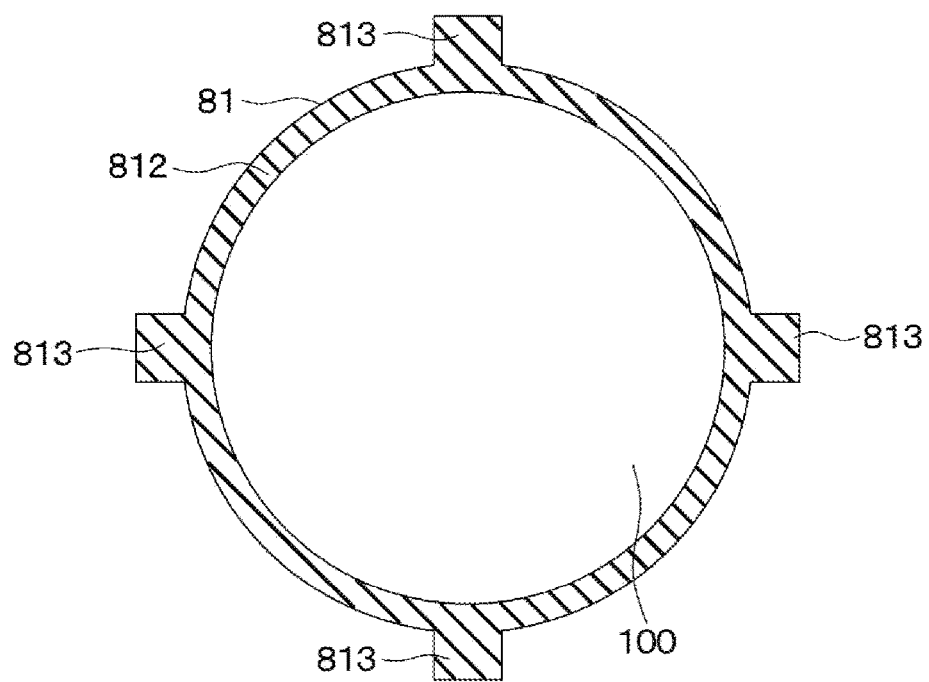
FIG. 13 is a cross-sectional view of a semiconductor device taken along a line XIII-XIII of FIG. 12.

As shown in FIGS. 12 and 13, the housing hole 100 is circular in the direction orthogonal to the axial direction of a connecting rod 60. Further, a second extension portion 812 of the first connecting portion 81 is formed in an annular shape in the direction orthogonal to the axial direction of the connecting rod 60. Further, a plurality of third extension portions 813 of the first connecting portion 81 are formed. Each of the third extension portions 813 extends in a direction crossing the extending direction of the second extension portion 812 from a first extension portion 811.

The sixth embodiment is configured in the above-described manner. Also in the sixth embodiment, corresponding effects as in the first embodiment can be obtained.

Seventh Embodiment

The seventh embodiment is different from the sixth embodiment in the form of a third extension portion 813 of a first connecting portion 81 of a cover member 80.

Figure 14:
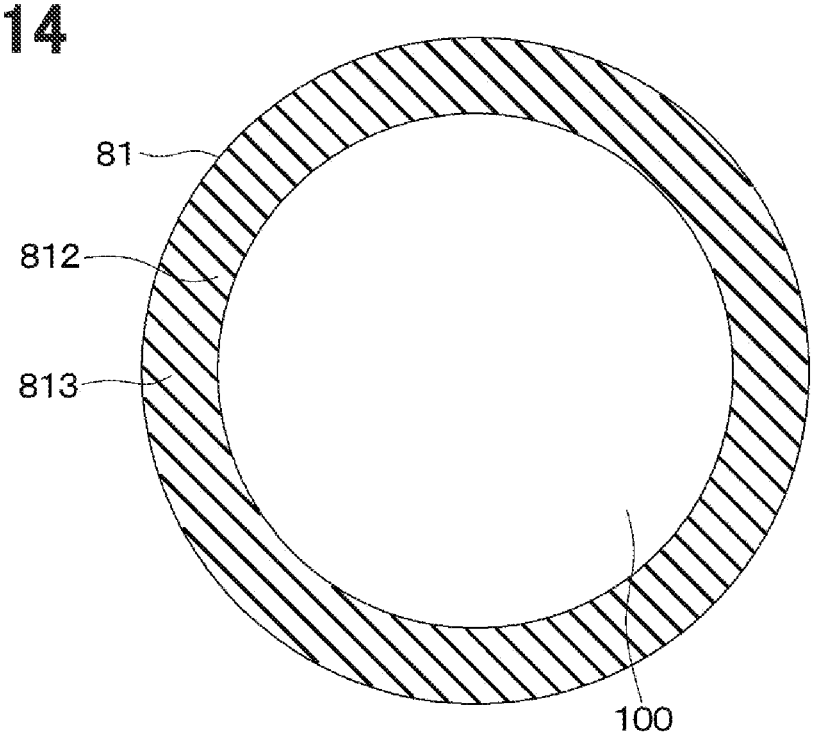
FIG. 14 is a cross-sectional view of a housing and a cover member of a pedal device of a seventh embodiment.

As shown in FIG. 14, the third extension portion 813 is formed in an annular shape by protruding from the entire circumference of a second extension portion 812 in a direction orthogonal to the axial direction of a connecting rod 60.

The seventh embodiment is configured in the above-described manner. Also in the seventh embodiment, corresponding effects as in the sixth embodiment can be obtained.

Eighth Embodiment

In the eighth embodiment, the shapes of a housing hole 100 of a first housing 10 and a first connecting portion 81 of a cover member 80 are different from those of the first embodiment.

Figure 15:
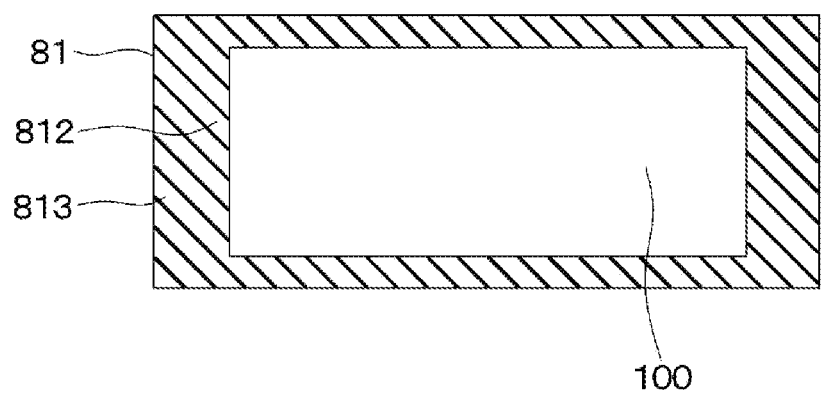
FIG. 15 is a cross-sectional view of a housing and a cover member of a pedal device of an eighth embodiment.

In the direction orthogonal to the axial direction of a connecting rod 60, the housing hole 100 is formed in a square shape, as shown in FIG. 15. Further, in the direction orthogonal to the axial direction of the connecting rod 60, a second extension portion 812 of the first connecting portion 81 is formed in a square annular shape. Further, a third extension portion 813 of the first connecting portion 81 is formed in a square shape by protruding from the entire circumference of the second extension portion 812 in the direction orthogonal to the axial direction of the connecting rod 60.

The eighth embodiment is configured in the above-described manner. Also in the eighth embodiment, corresponding effects as in the first embodiment can be obtained. Further, the eighth embodiment also achieves the following effects (5).

[5] The housing hole 100 is formed in a square shape in a cross section taken along a direction orthogonal to the axial direction of the connecting rod 60. Note that the housing hole 100 is not limited to being formed in a square shape in a cross section taken along a direction orthogonal to the axial direction of the connecting rod 60. The housing hole 100 may be formed in a polygonal shape in a cross section taken along a direction orthogonal to the axial direction of the connecting rod 60.

As a result, the length of the second extension portion 812 of the housing hole 100 and the first connecting portion 81 in one of the directions orthogonal to the axial direction of the connecting rod 60 can be made shorter than when the second extension portion 812 is formed in an annular shape. Therefore, the size of the first housing 10 and the cover member 80 is reducible, thereby the size of a pedal device 1 is reducible.

Ninth Embodiment

The ninth embodiment is different from the first embodiment in the form of a connecting rod 60 and the form of a second connecting portion 82 of a cover member 80.

Figure 16:
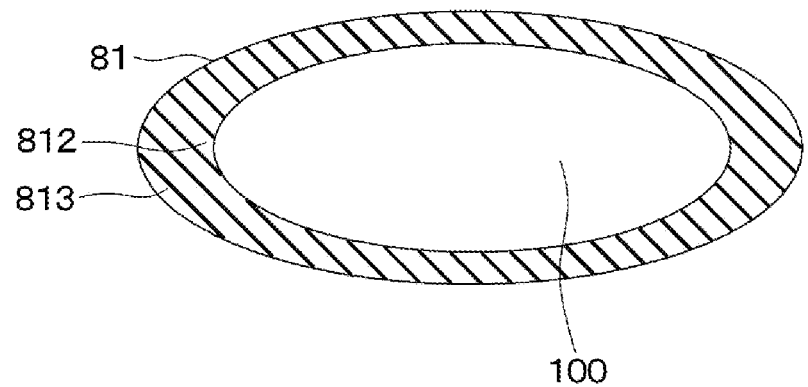
FIG. 16 is a cross-sectional view of a housing and a cover member of a pedal device of a ninth embodiment.

In the direction orthogonal to the axial direction of the connecting rod 60, a housing hole 100 is formed in an elliptical shape, as shown in FIG. 16. Further, in the direction orthogonal to the axial direction of the connecting rod 60, a second extension portion 812 of a first connecting portion 81 is formed in an elliptical ring shape. Further, a third extension portion 813 of the first connecting portion 81 is formed in an elliptical shape, by protruding from the entire circumference of the second extension portion 812 in a direction orthogonal to the axial direction of the connecting rod 60.

The ninth embodiment is configured in the above-described manner. Also in the ninth embodiment, corresponding effects as in the first embodiment can be obtained. Further, the ninth embodiment also achieves the following effects [6].

[6] The housing hole 100 is formed in an elliptical shape in a cross section taken along a direction orthogonal to the axial direction of the connecting rod 60.

As a result, the length of the second extension portion 812 of the housing hole 100 and the first connecting portion 81 in one of the directions orthogonal to the axial direction of the connecting rod 60 can be made shorter than when the second extension portion 812 is formed in an annular shape. Therefore, the size of the first housing 10 and the cover member 80 is reducible, thereby the size of a pedal device 1 is reducible.

Tenth Embodiment

The tenth embodiment is different from the first embodiment in the form of a first extension portion 811 and a third extension portion 813 in a first connecting portion 81 of a cover member 80.

Figure 17:
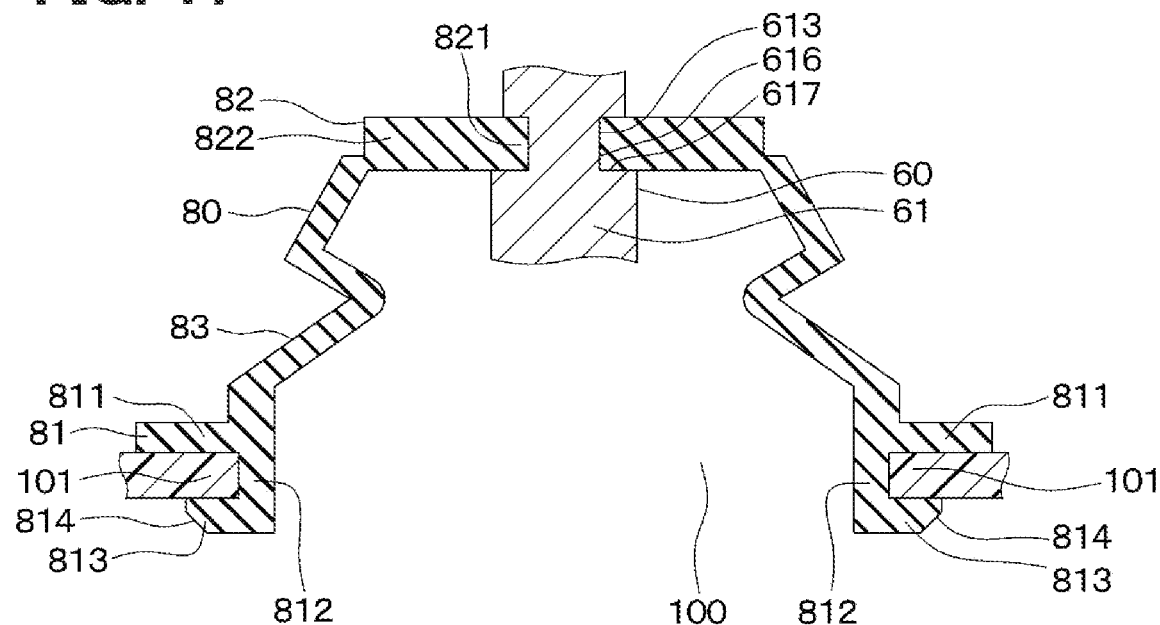
FIG. 17 is a cross-sectional view of a connecting rod, a cover member, and a housing end of a pedal device of a tenth embodiment.

As shown in FIG. 17, the length of the third extension portion 813 is shorter than the length of the first extension portion 811 in the direction orthogonal to the axial direction of a connecting rod 60. The third extension portion 813 also includes a third extension slope 814. The third extension slope 814 is formed on one side of the third extension portion 813 opposite to the portion on a side of a housing end portion 101.

The tenth embodiment is configured in the above-described manner. Also in the tenth embodiment, corresponding effects as in the first embodiment can be obtained. Further, the tenth embodiment also achieves the following effects (7).

[7] The length of the third extension portion 813 is made shorter than the length of the first extension portion 811. The third extension portion 813 also includes the third extension slope 814. The third extension slope 814 is formed on the opposite side of the portion of the third extension portion 813 that is connected to the housing end portion 101, and is inclined toward the extending direction of the third extension portion 813. Thereby, the third extension slope 814 guides the housing end portion 101 into the space formed by the first extension portion 811, the second extension portion 812 and the third extension portion 813. Further, the third extension slope 814 corresponds to a housing slope.

Since the length of the third extension portion 813 is shorter than the length of the first extension portion 811, the housing end portion 101 is easily insertable from a side of the third extension portion 813 into the space formed by the first extension portion 811, the second extension portion 812 and the third extension portion 813. Further, when the housing end portion 101 is inserted into such space, the housing end portion 101 is guided into such space by the third extension slope 814, thereby the housing end portion 101 can be easily inserted into such space.

Eleventh Embodiment

The eleventh embodiment is different from the first embodiment in the form of a first extension portion 811 and a third extension portion 813 of a first connecting portion 81 of a cover member 80.

Figure 18:
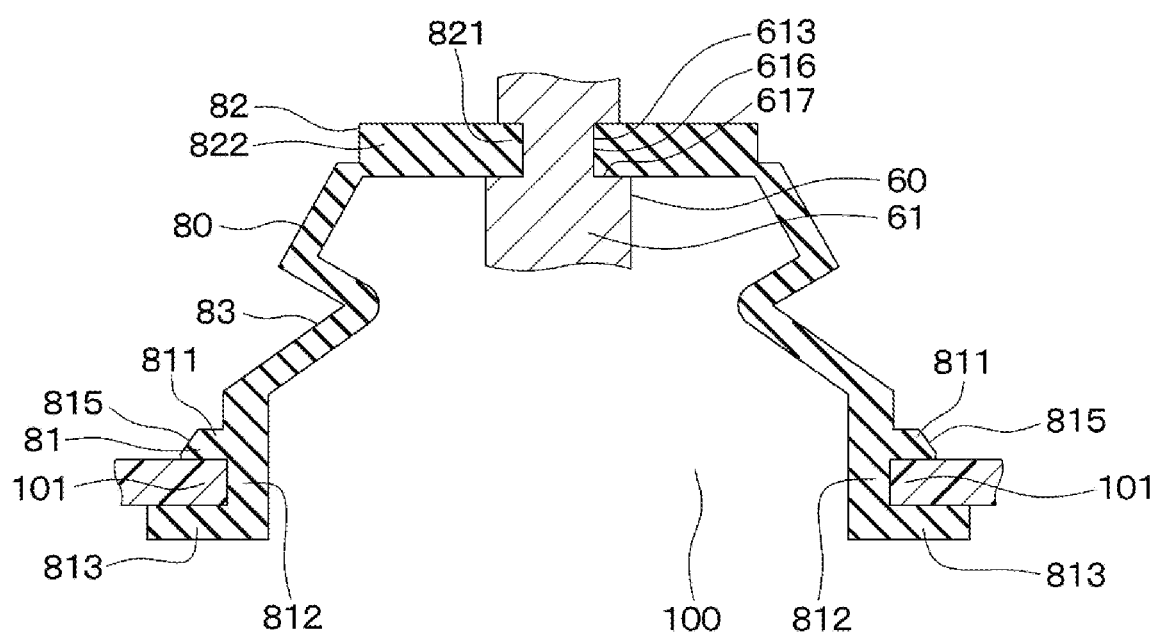
FIG. 18 is a cross-sectional view of a connecting rod, a cover member, and a housing end of a pedal device of an eleventh embodiment.

As shown in FIG. 18, the length of the first extension portion 811 is shorter than the length of the third extension portion 813 in the direction orthogonal to the axial direction of a connecting rod 60. The first extension portion 811 also includes a first extension slope 815. The first extension slope 815 is formed on one side of the first extension portion 811 opposite to the outer surface of a housing end portion 101.

The eleventh embodiment is configured in the above-described manner. The eleventh embodiment also achieves corresponding effects as the first embodiment. Further, the eleventh embodiment also achieves the following effects (8).

[8] The length of the first extension portion 811 is shorter than the length of the third extension portion 813. The first extension portion 811 also includes the first extension slope 815. The first extension slope 815 is formed on one side opposite to the outer surface of the housing end portion 101 and is inclined with respect to the extending direction of the first extension portion 811. Thereby, the first extension slope 815 guides the housing end portion 101 into the space formed by the first extension portion 811, a second extension portion 812 and the third extension portion 813. Note that, in such case, the first extension portion 811 corresponds to the third extension portion 813. The first extension slope 815 corresponds to a third extension slope 814 and also to a housing slope.

Since the length of the first extension portion 811 is shorter than the length of the third extension portion 813, the housing end portion 101 is more easily insertable from a side of the first extension portion 811 into the space formed by the first extension portion 811, the second extension portion 812 and the third extension portion 813. Further, when the housing end portion 101 is inserted into such space, the housing end portion 101 is guided into such space by the first extension slope 815, thereby the housing end portion 101 can be easily insertable into such space.

Twelfth Embodiment

The twelfth embodiment is different from the first embodiment in the form of a housing end portion 101 of a first housing 10 of a housing 5 and the form of a first connecting portion 81 of a cover member 80.

Figure 19:
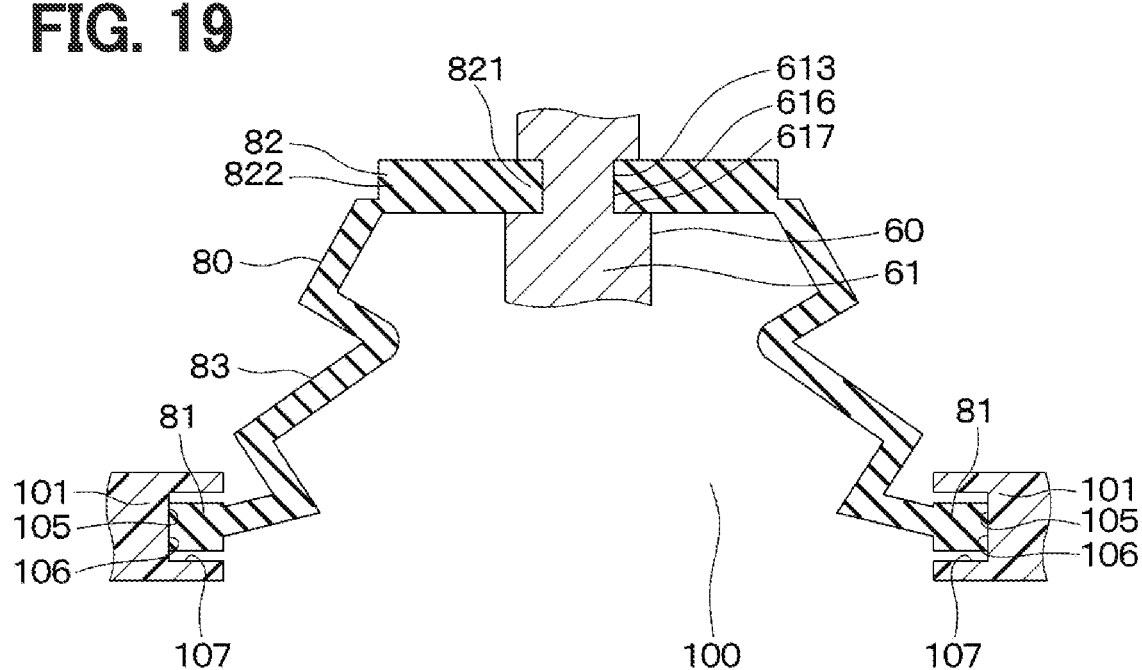
FIG. 19 is a cross-sectional view of a connecting rod, a cover member, and a housing end of a pedal device of a twelfth embodiment.

The housing end portion 101 includes an end recess 105, as shown in FIG. 19. The end recess 105 is recessed from a side surface of the housing end portion 101 in a direction orthogonal to the axial direction of a connecting rod 60. The end recess 105 also includes an end recess side surface 107 and an end recess bottom surface 106. Further, the side surface of the housing end portion 101 is a surface connected to the outer surface and the inner surface of the housing end portion 101.

The end recess side surface 107 is connected to the side surface of the housing end portion 101. The end recess bottom surface 106 is connected to the end recess side surface 107. The first connecting portion 81 is inserted into the space formed by the recess end side surface 107 and the end recess bottom surface 106. Thereby, the first connecting portion 81 and the housing end portion 101 are connected.

The twelfth embodiment is configured in the above-described manner. The twelfth embodiment also achieves corresponding effects as the first embodiment. Further, the twelfth embodiment also achieves the following effects [9].

[9] The housing end portion 101 includes the end recess 105 that is recessed from the surrounding. The end recess 105 includes the end recess side surface 107 and the end recess bottom surface 106. The first connecting portion 81 is inserted into the space formed by the end recess side surface 107 and the end recess bottom surface 106. Note that the end recess side surface 107 corresponds to an end side surface. The end recess bottom surface 106 corresponds to an end bottom surface.

In such manner, the first connecting portion 81 hardly comes off from the housing end portion 101. Further, the first connecting portion 81 and the housing end portion 101 can be easily connected without providing an additional member. Therefore, the cost of a pedal device 1 is reducible by an amount of the cost of the additional member.

Thirteenth Embodiment

In the thirteenth embodiment, an arm portion 61 of a connecting rod 60 does not have an arm recess 612. Also, the form of a cover member 80 is different from that of the first embodiment.

Figure 20:
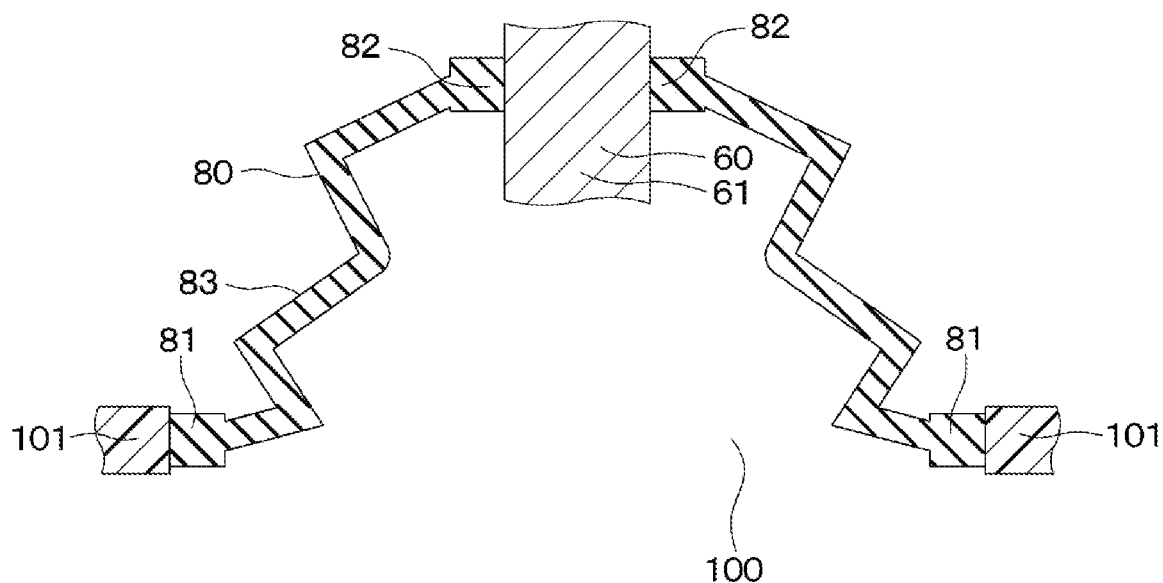
FIG. 20 is a cross-sectional view of a connecting rod, a cover member, and a housing end of a pedal device of a thirteenth embodiment.

A first connecting portion 81 of the cover member 80 is inserted into a housing hole 100 and connected to the side surface of a housing end portion 101, as shown in FIG. 20. Also, a second connecting portion 82 of the cover member 80 is connected to the side surface of the arm portion 61 of the connecting rod 60. Further, a covering portion 83 of the cover member 80 is connected to the first connecting portion 81 and the second connecting portion 82. Further, the covering portion 83 is formed in a bellows shape, and the covering portion 83 is elastically deformed by being compressed.

The thirteenth embodiment is configured in the above-described manner. The thirteenth embodiment also achieves corresponding effects as the first embodiment. Further, the thirteenth embodiment also achieves the following effects [10].

[10] The covering portion 83 is formed in a bellows shape. Moreover, the covering portion 83 is elastically deformed by being compressed, and thus generates a restoring force acting in the direction of pressing the first connecting portion 81 against the housing end portion 101. Further, the covering portion 83 is elastically deformed by being compressed, and thus generates a restoring force acting in the direction of pressing the second connecting portion 82 against the connecting rod 60.

Such a restoring force maintains the connection between the first connecting portion 81 and the housing end portion 101. Also, such a restoring force maintains the connection between the second connecting portion 82 and the connecting rod 60.

Fourteenth Embodiment

The fourteenth embodiment is different from the thirteenth embodiment in the form of a first connecting portion 81 and a second connecting portion 82 of a cover member 80.

Figure 21:
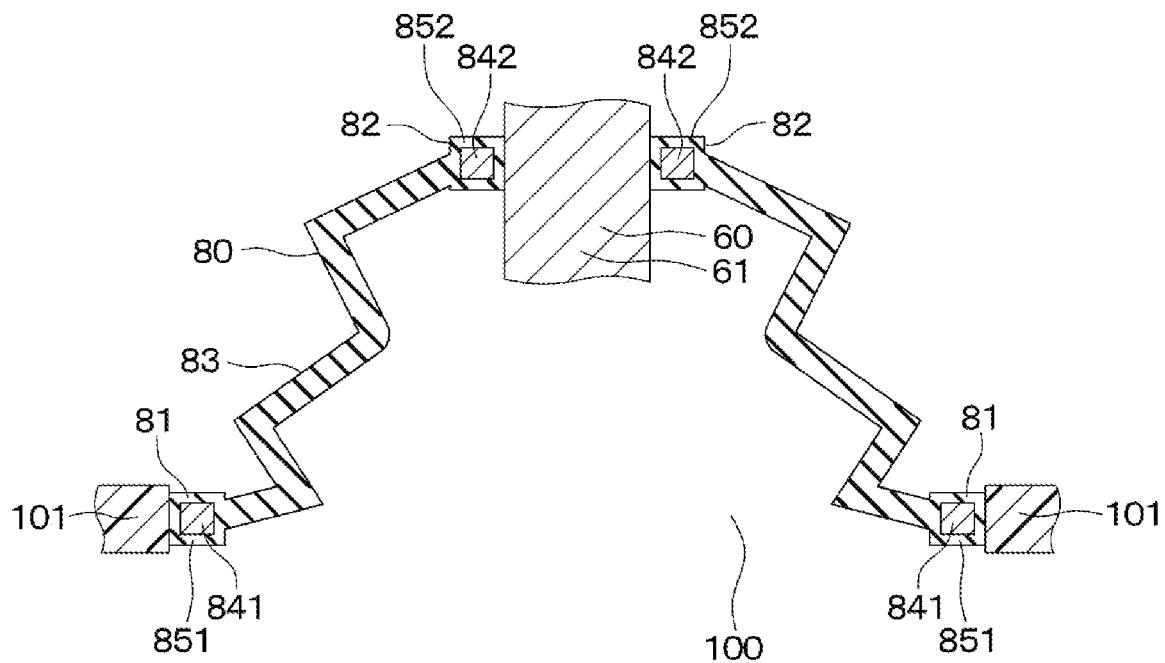
FIG. 21 is a cross-sectional view of a connecting rod, a cover member, and a housing end of a pedal device of a fourteenth embodiment.

The first connecting portion 81 includes a first high-strength portion 841 and a first low-strength portion 851, as shown in FIG. 21. The first high-strength portion 841 is made of metal. Also, the first high-strength portion 841 is formed in an annular shape. Note that the first high-strength portion 841 may be made of resin.

The first low-strength portion 851 is made of rubber or the like. Therefore, the Young's modulus of the first low-strength portion 851 is lower than that of the first high-strength portion 841. Also, the first low-strength portion 851 is formed in an annular shape. Further, the first low-strength portion 851 surrounds the first high-strength portion 841. The first low-strength portion 851 and a housing end portion 101 are connected by inserting the first low-strength portion 851 together with the first high-strength portion 841 into a housing hole 100.

The second connecting portion 82 includes a second high-strength portion 842 and a second low-strength portion 852. The second high-strength portion 842 is made of metal. Also, the second high-strength portion 842 is formed in an annular shape. Note that the second high-strength portion 842 may be made of resin.

The second low-strength portion 852 is made of rubber or the like. Therefore, the Young's modulus of the second low-strength portion 852 is lower than that of the second high-strength portion 842. Also, the second low-strength portion 852 is formed in an annular shape. Further, the second low-strength portion 852 surrounds the second high-strength portion 842. Also, an arm portion 61 of a connecting rod 60 is inserted into the space inside the second low-strength portion 852. The Young's modulus of the first high-strength portion 841, the first low-strength portion 851, the second high-strength portion 842, and the second low-strength portion 852 are measured by a tensile test or the like.

The fourteenth embodiment is configured in the above-described manner. The fourteenth embodiment also has corresponding effects as the thirteenth embodiment. Further, the fourteenth embodiment also achieves the following effects [11-1], [11-2].

[11-1] The first connecting portion 81 includes the first high-strength portion 841 and the first low-strength portion 851. The first high-strength portion 841 is surrounded by the first low-strength portion 851, and has a higher Young's modulus than the first low-strength portion 851. The first low-strength portion 851 is connected to the housing end portion 101 by being inserted into the housing hole 100.

The strength of the first connecting portion 81 is improved by the first high-strength portion 841. Therefore, the first low-strength portion 851 can be press-fitted into the housing hole 100. Thereby, the force for maintaining the connection between the first connecting portion 81 and the housing end portion 101 is improved.

[11-2] The second connecting portion 82 includes the second high-strength portion 842 and the second low-strength portion 852. The second high-strength portion 842 is surrounded by the second low-strength portion 852, and has a higher Young's modulus than the second low-strength portion 852. The second low-strength portion 852 is formed in an annular shape. Also, the second low-strength portion 852 is connected to the connecting rod 60 by inserting the connecting rod 60 into the second low-strength portion 852.

The strength of the second connecting portion 82 is improved by the second high-strength portion 842. Therefore, the connecting rod 60 can be press-fitted into the second low-strength portion 852. Thereby, the force for maintaining the connection between the second connecting portion 82 and the connecting rod 60 is improved.

Fifteenth Embodiment

The fifteenth embodiment is different from the thirteenth embodiment in the form of a housing end portion 101.

Figure 22:
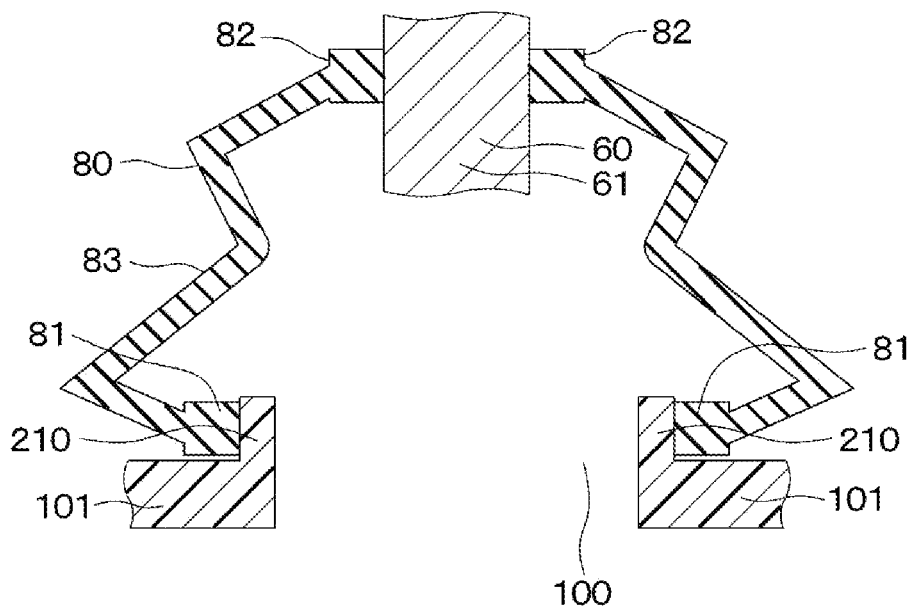
FIG. 22 is a cross-sectional view of a connecting rod, a cover member, and a housing end of a pedal device of a fifteenth embodiment.

The housing end portion 101 includes a housing extension portion 210, as shown in FIG. 22. The housing extension portion 210 extends in the axial direction of a connecting rod 60. Also, a first connecting portion 81 of a cover member 80 is connected to a surface of the housing extension portion 210 in a direction orthogonal to the axial direction of the connecting rod 60. In such case, a covering portion 83 is elastically deformed by being compressed, thereby generating a restoring force acting in the direction of pressing the first connecting portion 81 against the housing extension portion 210.

The fifteenth embodiment is configured in the above-described manner. The fifteenth embodiment also achieves the same or corresponding effects as the thirteenth embodiment.

Sixteenth Embodiment

The sixteenth embodiment is different from the twelfth embodiment in the shape of an end recess 105 of a housing end portion 101.

Figure 23:
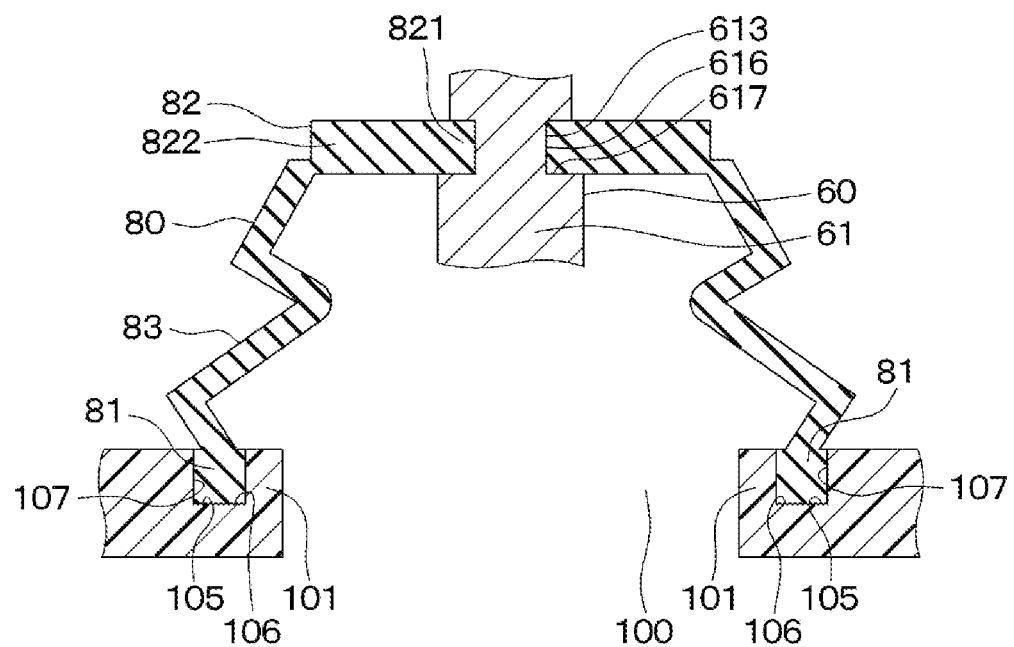
FIG. 23 is a cross-sectional view of a connecting rod, a cover member, and a housing end of a pedal device of a sixteenth embodiment.

The end recess 105 is recessed in the axial direction of a connecting rod 60 from the outer surface of the housing end portion 101, as shown in FIG. 23. Also, a first connecting portion 81 of a cover member 80 is inserted into the space formed by an end recess side surface 107 and an end recess bottom surface 106 of the end recess 105. Thereby, the first connecting portion 81 and the housing end portion 101 are connected.

Also, the first connecting portion 81 is formed of an elastic member. Further, the first connecting portion 81 is compressed. In such manner, the first connecting portion 81 generates a restoring force acting in the direction orthogonal to the axial direction of the connecting rod 60. Since such a restoring force acts in the direction of pressing the first connecting portion 81 against the end recess side surface 107, the connection between the first connecting portion 81 and the housing end portion 101 is maintained.

The sixteenth embodiment is configured in the above-described manner. The sixteenth embodiment also achieves corresponding effects as the twelfth embodiment.

Seventeenth Embodiment

The seventeenth embodiment is different from the first embodiment in the form of a housing end portion 101, the form of a connecting rod 60, and the forms of a first connecting portion 81 and a second connecting portion 82 of a cover member 80. Moreover, a pedal device 1 further includes a first fixing member 91 and a second fixing member 92.

Figure 24:
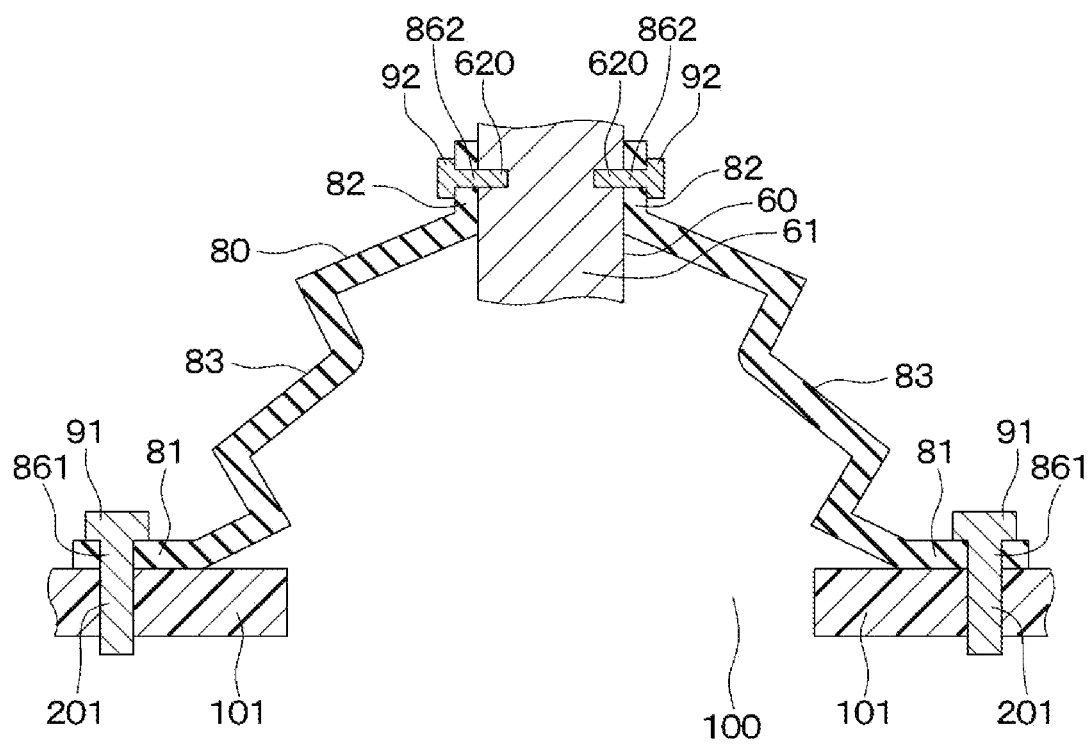
FIG. 24 is a cross-sectional view of a connecting rod, a cover member, and a housing end of a pedal device of a seventeenth embodiment.

The housing end portion 101 includes a fixing housing hole 201, as shown in FIG. 24. The fixing housing hole 201 is a space extending in the axial direction of the connecting rod 60. An arm portion 61 of the connecting rod 60 does not have a cover member recess 613, but has a fixing rod hole 620. The fixing rod hole 620 is a space extending in a direction orthogonal to the axial direction of the connecting rod 60. The first connecting portion 81 has a first connecting portion hole 861 corresponding to the fixing housing hole 201. The second connecting portion 82 has a second connecting portion hole 862 corresponding to the fixing rod hole 620.

The first fixing member 91 and the second fixing member 92 are screws, pins, snap-fits, or the like. A portion of the first fixing member 91 is inserted into the fixing housing hole 201 and the first connecting portion hole 861. Thereby, the first connecting portion 81 and the housing end portion 101 are connected. Further, a portion of the second fixing member 92 is inserted into the fixing rod hole 620 and the second connecting portion hole 862. Therefore, the second connecting portion 82 and the arm portion 61 of the connecting rod 60 are connected.

The seventeenth embodiment is configured in the above-described manner. The seventeenth embodiment also achieves corresponding effects as the first embodiment except for the above-described items [1-3] and [1-4]. Further, the seventeenth embodiment also achieves the following effects [12-1], [12-2].

[12-1] The fixing housing hole 201 is formed in the housing end portion 101. The first connecting portion hole 861 corresponding to the fixing housing hole 201 is formed in the first connecting portion 81 of the cover member 80. The pedal device 1 further includes the first fixing member 91. A portion of the first fixing member 91 is inserted into the fixing housing hole 201 and the first connecting portion hole 861, thereby connecting the first connecting portion 81 and the housing end portion 101.

This makes it easy to fix the first connecting portion 81 and the housing end portion 101. Also, the force for maintaining the connection between the first connecting portion 81 and the housing end portion 101 is improved.

[12-2] The connecting rod 60 is formed with the fixing rod hole 620 which is a space extending in a direction orthogonal to the axial direction of the connecting rod 60. The second connecting portion hole 862 corresponding to the fixing rod hole 620 is formed in the second connecting portion 82 of the cover member 80. The pedal device 1 further includes the second fixing member 92. A portion of the second fixing member 92 is inserted into the fixing rod hole 620 and the second connecting portion hole 862, thereby connecting the second connecting portion 82 and the connecting rod 60.

This makes it easy to fix the second connecting portion 82 and the connecting rod 60. Also, the force for maintaining the connection between the second connecting portion 82 and the connecting rod 60 is improved.

Eighteenth Embodiment

The eighteenth embodiment is different from the first embodiment in (i) the connection between a housing end portion 101 and a first connecting portion 81 of a cover member 80 and (ii) the connection between a connecting rod 60 and a second connecting portion 82 of the cover member 80.

Figure 25:
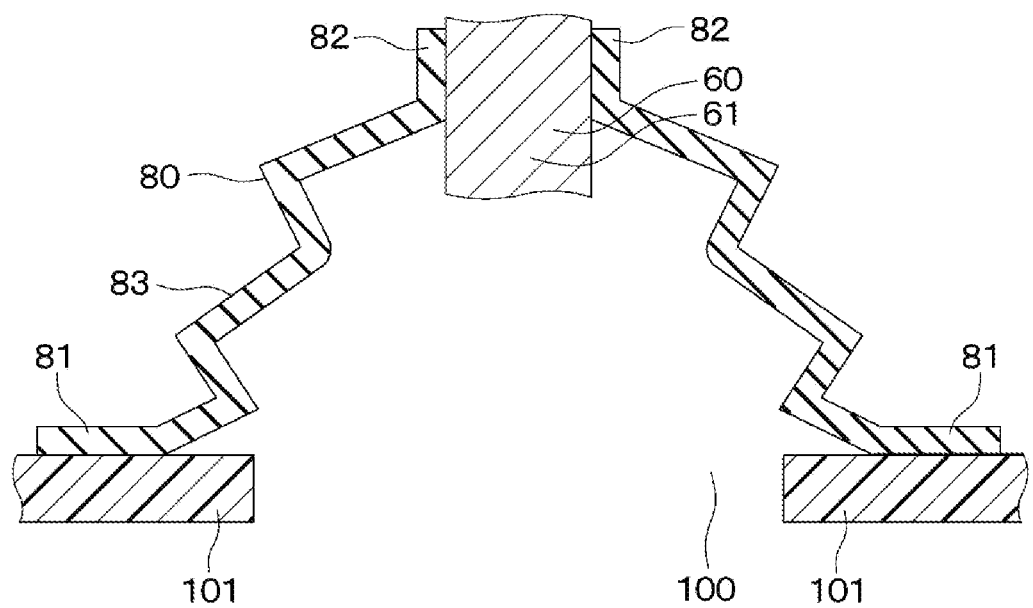
FIG. 25 is a cross-sectional view of a connecting rod, a cover member, and a housing end of a pedal device of an eighteenth embodiment.

As shown in FIG. 25, the first connecting portion 81 is connected to the outer surface of the housing end portion 101 by welding, adhesion, two-color molding, or the like. The second connecting portion 82 is connected to the side surface of an arm portion 61 of the connecting rod 60 by welding, adhesion, two-color molding, or the like. Note that the arm portion 61 does not have a cover member recess 613.

The eighteenth embodiment is configured in the above-described manner. The eighteenth embodiment also achieves corresponding effects as the first embodiment except for the above-described items [1-3] and [1-4]. Further, the eighteenth embodiment also achieves the following effects [13-1], [13-2].

[13-1] The first connecting portion 81 is connected to the housing end portion 101 by welding, adhesion or two-color molding. This makes it easy to fix the first connecting portion 81 and the housing end portion 101.

[13-2] The second connecting portion 82 is connected to the connecting rod 60 by welding, adhesion, two-color molding, or the like. This makes it easy to fix the second connecting portion 82 and the connecting rod 60.

Nineteenth Embodiment

The nineteenth embodiment is different from the first embodiment in (i) the connection between a housing end portion 101 and a first connecting portion 81 of a cover member 80 and (ii) the connection between a connecting rod 60 and a second connecting portion 82 of a cover member 80.

Figure 26:
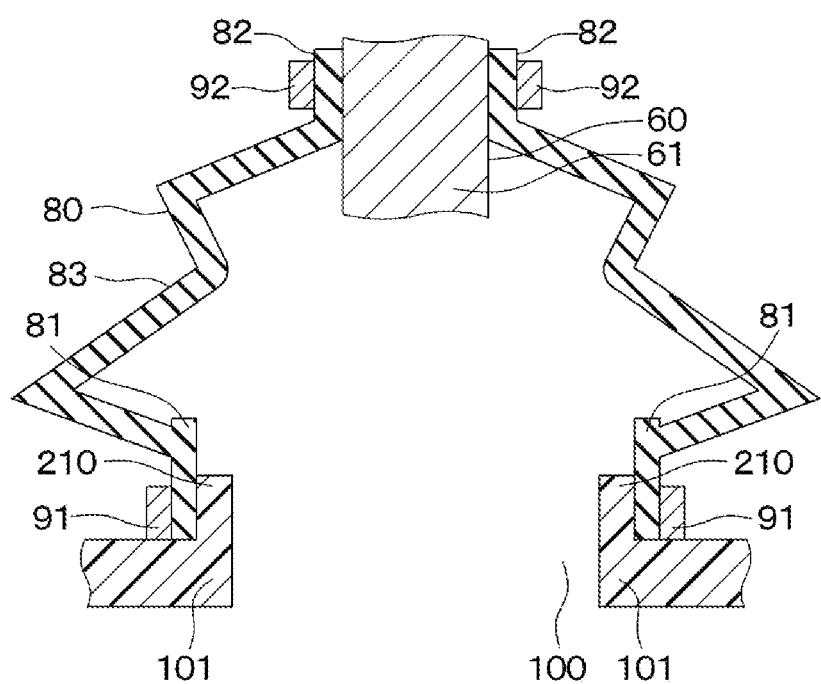
FIG. 26 is a cross-sectional view of a connecting rod, a cover member, and a housing end of a pedal device of a nineteenth embodiment.

The housing end portion 101 includes a housing extension portion 210, as shown in FIG. 26. The housing extension portion 210 extends in the axial direction of the connecting rod 60. The first connecting portion 81 of the cover member 80 is connected in the direction orthogonal to the axial direction of the connecting rod 60 to the outer surface of the housing extension portion 210 facing in the direction orthogonal to the axial direction of the connecting rod 60.

Moreover, a pedal device 1 further includes a first fixing member 91 and a second fixing member 92. The first fixing member 91 and the second fixing member 92 are binding bands, retaining rings, or the like. Therefore, the first fixing member 91 and the second fixing member 92 have an annular shape. Note that the first fixing member 91 and the second fixing member 92 are not limited to have the annular shape, and may be, for example, arc-shaped, elliptical arc-shaped, U-shaped, L-shaped, or the like.

Also, the first fixing member 91 and the housing extension portion 210 sandwich the first connecting portion 81. Further, the second fixing member 92 and the side surface of the arm portion 61 of the connecting rod 60 sandwich the second connecting portion 82.

The nineteenth embodiment is configured in the above-described manner. The nineteenth embodiment also achieves corresponding effects as the first embodiment except for the above-described items [1-3] and [1-4]. Further, the nineteenth embodiment also achieves the following effects [14-1], [14-2].

[14-1] The housing end portion 101 includes the housing extension portion 210. The housing extension portion 210 extends in the axial direction of the connecting rod 60. The housing extension portion 210 and the first connecting portion 81 are connected by sandwiching of the first connecting portion 81 with the first fixing member 91 and the housing extension portion 210. This makes it easy to fix the first connecting portion 81 and the housing end portion 101. Also, the force for maintaining the connection between the first connecting portion 81 and the housing end portion 101 is improved.

[14-2] The connecting rod 60 and the second connecting portion 82 are connected by sandwiching of the second connecting portion 82 with the second fixing member 92 and the side surface of the connecting rod 60. This makes it easy to fix the second connecting portion 82 and the connecting rod 60. Further, the force for maintaining the connection between the second connecting portion 82 and the connecting rod 60 is improved.

Twentieth Embodiment

The twentieth embodiment is different from the first embodiment in the form of a covering portion 83 of a cover member 80.

Figure 27:
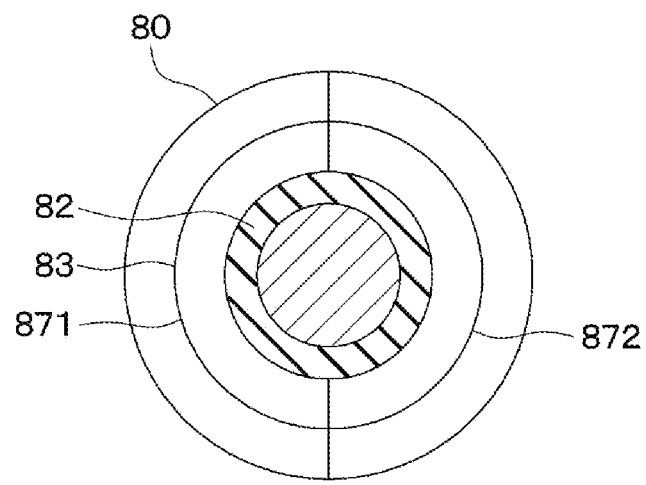
FIG. 27 is a cross-sectional view of a connecting rod and a cover member of a pedal device of a twentieth embodiment.

The covering portion 83 has a first covering portion 871 and a second covering portion 872, as shown in FIG. 27. Therefore, the covering portion 83 is divided into two. Also, the first covering portion 871 is connected to the second covering portion 872 in a direction orthogonal to the axial direction of a connecting rod 60 by welding, adhesion, two-color molding, or the like.

The twentieth embodiment is configured in the above-described manner. The twentieth embodiment also achieves corresponding effects as the first embodiment, except for the above-described item [1-3]. Further, the twentieth embodiment also achieves the following effects [15].

[15] The covering portion 83 has the first covering portion 871 and the second covering portion 872. The first covering portion 871 and the second covering portion 872 are connected to each other in a direction orthogonal to the axial direction of the connecting rod 60, and cover the housing hole 100.

Thus, by dividing the covering portion 83, it is easy to perform fixing between the first connecting portion 81 and a housing end portion 101, since the connection between the first connecting portion 81 and the housing end portion 101 can be separately performed. Further, since the connection between the second connecting portion 82 and the connecting rod 60 can also be separately performed, the second connecting portion 82 and the connecting rod 60 can be easily fixed.

Twenty-First Embodiment

Figure 28:
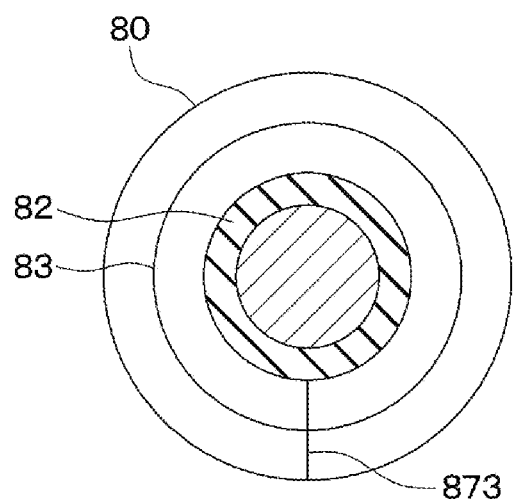
FIG. 28 is a cross-sectional view of a connecting rod and a cover member of a pedal device of a twenty-first embodiment.

The twenty-first embodiment is different from the first embodiment in the form of a covering portion 83 of a cover member 80. The covering portion 83 has a cut 873 as shown in FIG. 28. Also, a portion of the covering portion 83 at the cut 873 is connected by welding, adhesion, two-color molding, or the like.

The twenty-first embodiment is configured in the above-described manner. Also in the twenty-first embodiment, corresponding effects as in the twentieth embodiment can be obtained.

Twenty-Second Embodiment

In the twenty-second embodiment, the shape of a breathing hole 25 is different from that in the first embodiment.

Figure 29:
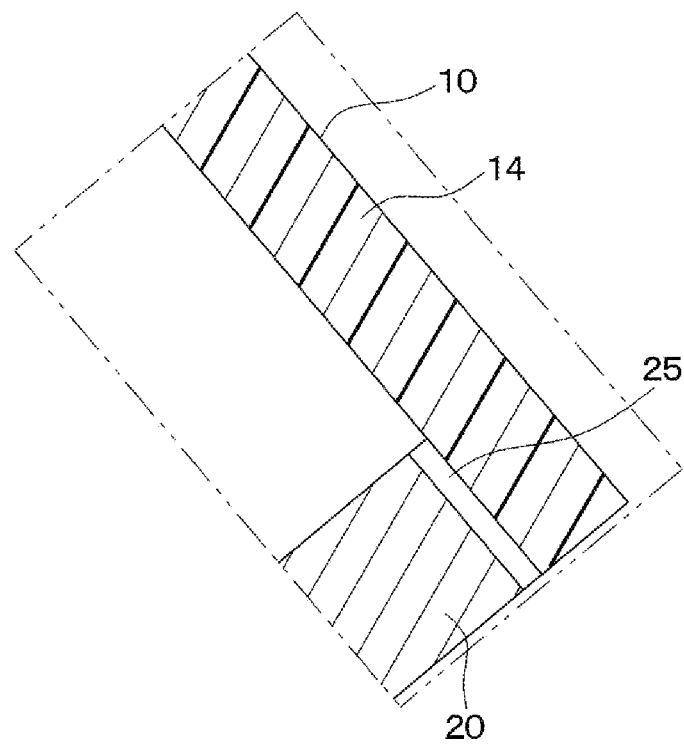
FIG. 29 is a cross-sectional view of a first housing and a second housing of a pedal device of a twenty-second embodiment.

The breathing hole 25 is formed between the inner surface of a front wall 14 of a first housing 10 and the side surface of a second housing 20, as shown in FIG. 29. The side surface of the second housing 20 is a surface connected to the outer surface and the inner surface of the second housing 20.

The twenty-second embodiment is configured in the above-described manner. Also in the twenty-second embodiment, corresponding effects as in the first embodiment can be obtained.

Twenty-Third Embodiment

In the twenty-third embodiment, the shapes of a first housing 10, a second housing 20 and a breathing hole 25 are different from those of the first embodiment.

Figure 30:
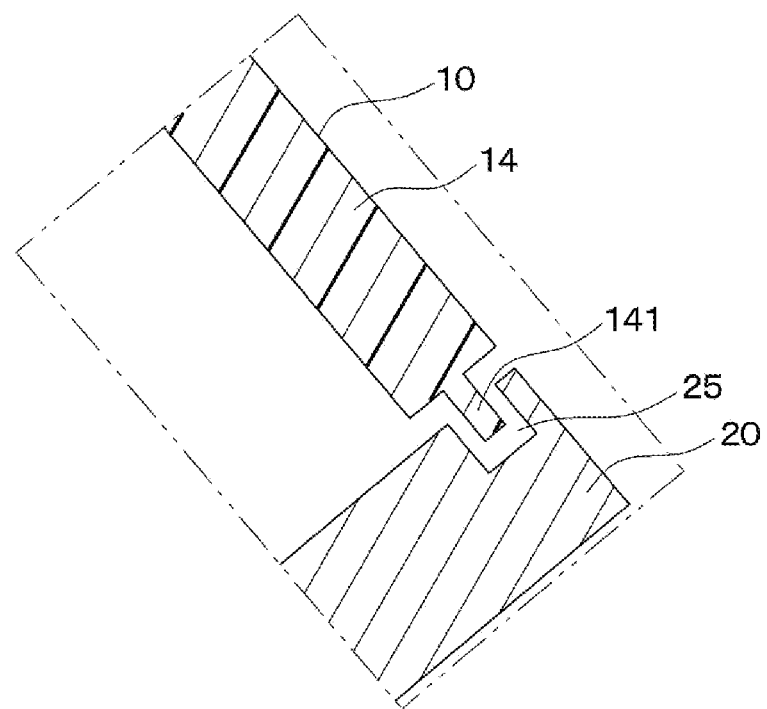
FIG. 30 is a cross-sectional view of a first housing and a second housing of a pedal device of a twenty-third embodiment.

The first housing 10 has a protrusion 141 as shown in FIG. 30. The protrusion 141 protrudes from the side surface of a front wall 14 of the first housing 10 toward the second housing 20. Further, a portion of the protrusion 141 is inserted into a recessed space formed in the second housing 20. Thereby, the breathing hole 25 is formed between the second housing 20 and the protrusion 141. Further, the protrusion 141 and the recessed space formed in the second housing 20 provide a labyrinthine shape for the breathing hole 25. Further, the side surface of the front wall 14 is a surface connected to the outer surface and the inner surface of the front wall 14.

The twenty-third embodiment is configured in the above-described manner. The twenty-third embodiment also achieves corresponding effects as the first embodiment. Further, the twenty-third embodiment also achieves the following effects [16].

[16] A portion of the protrusion 141 of the first housing 10 is inserted into the recessed space formed in the second housing 20, thereby providing a labyrinthine shape for the breathing hole 25.

In such manner, when foreign matter passes through the breathing hole 25 from the outside of a housing 5, the movement of foreign matter is prevented by the protrusion 141, thereby foreign matter is suppressed from passing through the breathing hole 25 from the outside of the housing 5 and intruding into a housing space 15. Also, when foreign matter passes through the breathing hole 25 from the outside of the housing 5, it accumulates in the recessed space of the second housing 20. Therefore, foreign matter is suppressed from intruding into the housing space 15 from the outside of the housing 5 through the breathing hole 25.

Twenty-Fourth Embodiment

The twenty-fourth embodiment is different from the first embodiment in the form of a breathing hole 25.

Figure 31:
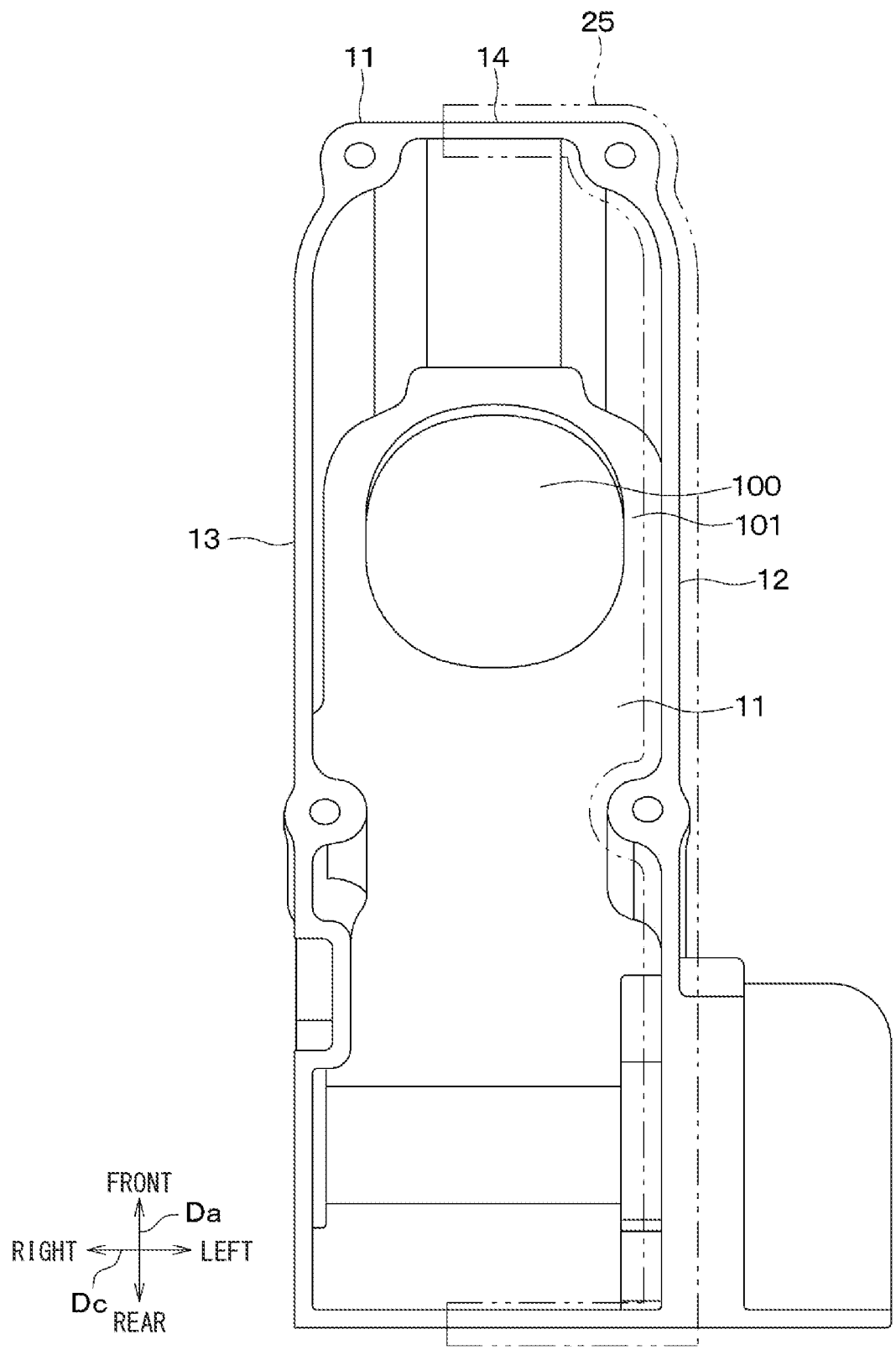
FIG. 31 is a perspective view of a first housing of a pedal device of a twenty-fourth embodiment.

As shown in FIG. 31, the breathing hole 25 is formed between (a) the left side of a front wall 14 of a first housing 10, the left side of a left side wall 12 and the left side of a first housing 10 on a rear side of the vehicle and (b) a second housing 20. Further, since a hole is formed at the end of the left side wall 12 of the first housing 10, a portion of the breathing hole 25 on the left side of the vehicle is branched. Therefore, such breathing hole 25 is larger than the one in the first embodiment. In such manner, it becomes easy for the air to flow in and out through the breathing hole 25, thereby the change in volume of the air in a housing space 15 caused by the rotation of a pedal 40 and the temperature change in the housing space 15 can easily be alleviated. Thus, when the pedal 40 rotates, resistance to compression and expansion of the air in the housing space 15 is reduced, for a smooth rotation of the pedal 40. Further, in FIG. 31, the range of the breathing hole 25 is indicated by a double-dot chain line.

The twenty-fourth embodiment is configured in the above-described manner. The twenty-fourth embodiment also achieves corresponding effects as the first embodiment.

Twenty-Fifth Embodiment

The twenty-fifth embodiment is different from the twenty-fourth embodiment in the form of a first housing 10.

Figure 32:
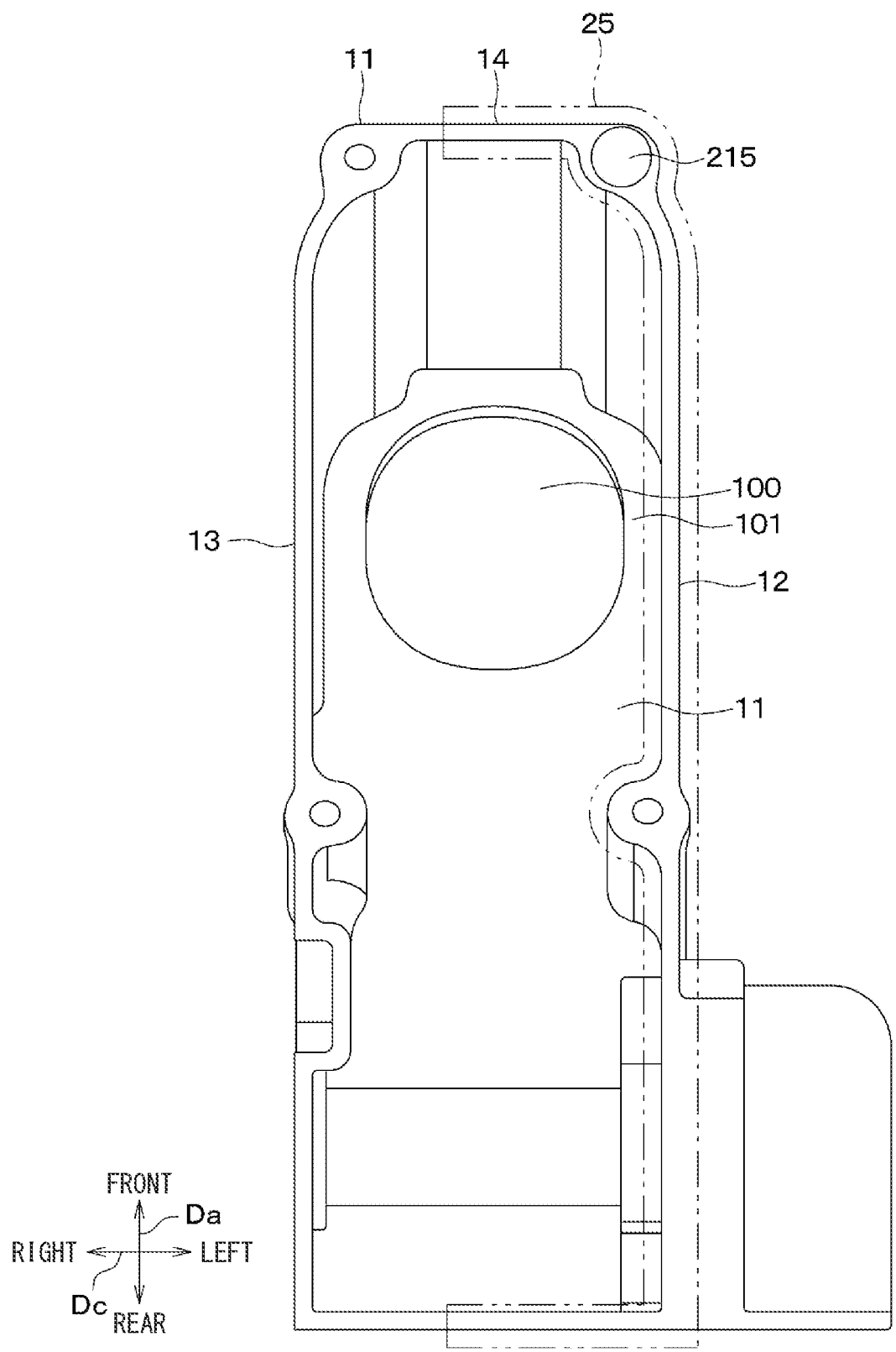
FIG. 32 is a perspective view of a first housing of a pedal device of a twenty-fifth embodiment.

The first housing 10 has an accumulation hole 215 communicating with a breathing hole 25, as shown in FIG. 32. Further, in FIG. 32, the range of the breathing hole 25 is indicated by a double-dot chain line. Also, a second housing 20 may have the accumulation hole 215.

The twenty-fifth embodiment is configured in the above-described manner. Also in the twenty-fifth embodiment, corresponding effects as the first embodiment can be obtained. Further, the twenty-fifth embodiment also achieves the following effects [17].

[17] A housing 5 has the accumulation hole 215 communicating with the breathing hole 25. Foreign matter intruding from the outside of the housing 5 is accumulated in the accumulation hole 215.

In such manner, when foreign matter passes through the breathing hole 25 from the outside of the housing 5, the foreign matter accumulates in the accumulation hole 215, thereby suppressing the foreign matter from intruding into a housing space 15 through the breathing hole 25 from the outside of the housing 5.

Twenty-Sixth Embodiment

The twenty-sixth embodiment is different from the twenty-fourth embodiment in the shape of a breathing hole 25.

Figure 33:
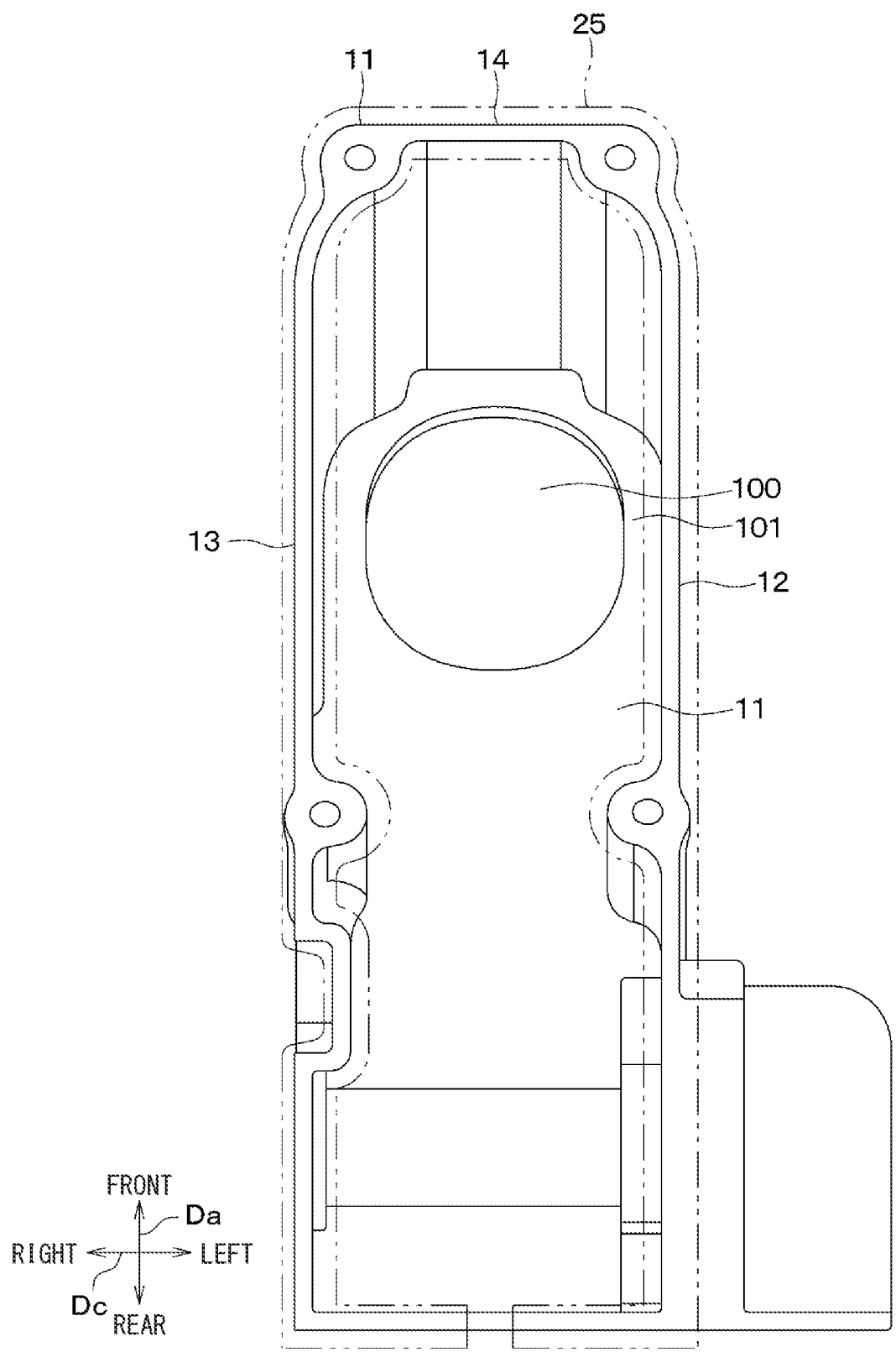
FIG. 33 is a perspective view of a first housing of a pedal device of a twenty-sixth embodiment.

The breathing hole 25 is formed substantially in the entire circumference between a first housing 10 and a second housing 20, as shown in FIG. 33. Further, in FIG. 33, the range of the breathing hole 25 is indicated by the double-dot chain line.

The twenty-sixth embodiment is configured in the above-described manner. The twenty-sixth embodiment also achieves corresponding effects as the twenty-fourth embodiment.

Twenty-Seventh Embodiment

In the twenty-seventh embodiment, a first housing 10 has a filter hole 220. A pedal device 1 also includes a filter 225. The other configurations are similar to those of the first embodiment.

Figure 34:
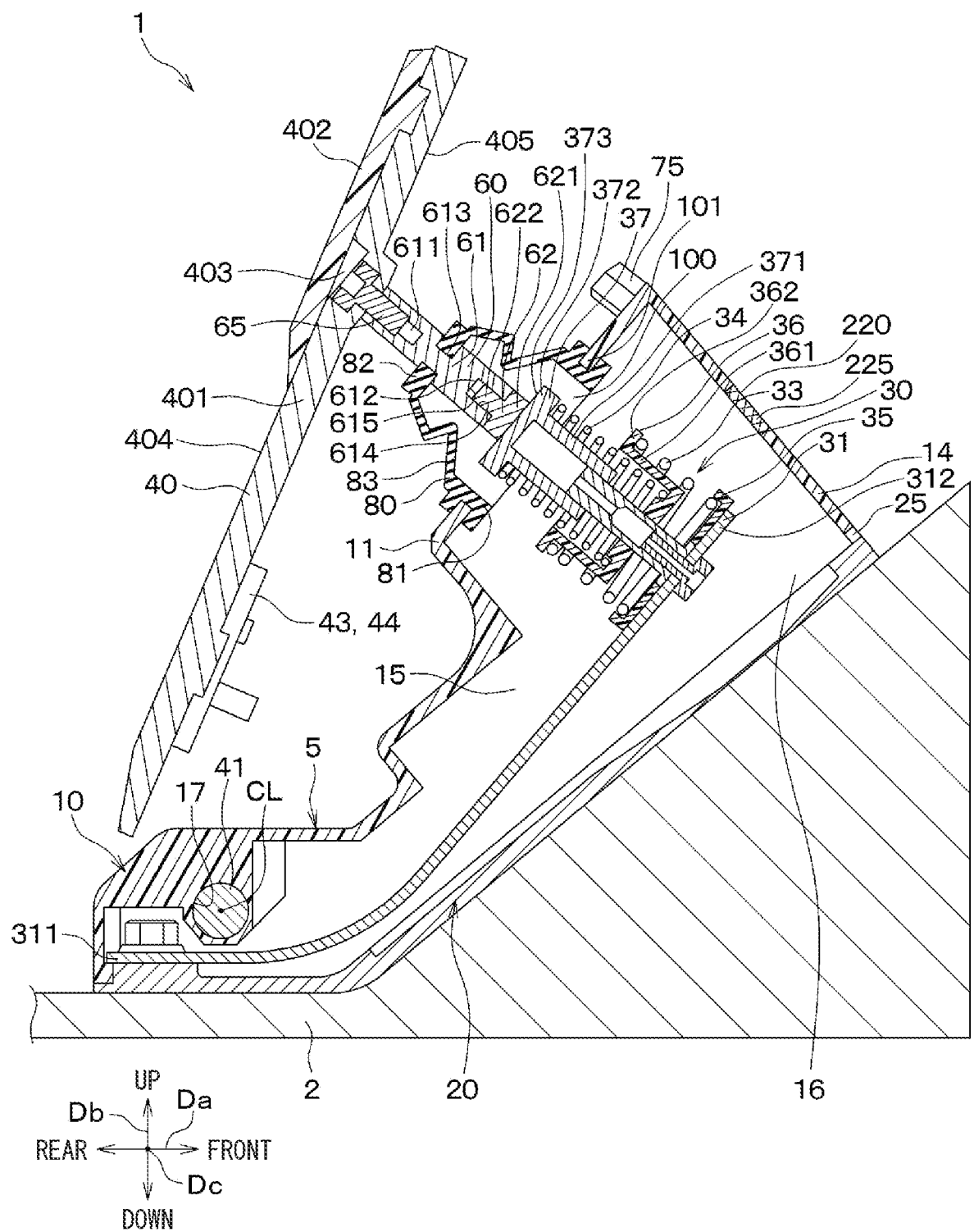
FIG. 34 is a cross-sectional view of a pedal device of a twenty-seventh embodiment.

The filter hole 220 is formed in a front wall 14 of the first housing 10, as shown in FIG. 34. Also, the filter hole 220 allows communication between the outside of the first housing 10 and a housing space 15. Note that the filter hole 220 is not limited to being formed in the front wall 14 of the first housing 10, and may also be formed in a left side wall 12, a right side wall 13, a rear side wall of the vehicle, and a second housing 20.

The filter 225 is inserted into the filter hole 220. The filter 225 is a vent filter. Therefore, the filter 225 does not allow water flowing from the outside of the first housing 10 into the housing space 15 through the filter hole 220, but allows air to pass therethrough.

The twenty-seventh embodiment is configured in the above-described manner. Also in the twenty-seventh embodiment, corresponding effects as the first embodiment can be obtained. The twenty-seventh embodiment also achieves the following effects [18].

[18] A housing 5 has the filter hole 220 formed thereon. The filter hole 220 allows communication between the outside of the housing 5 and the housing space 15. Moreover, the pedal device 1 further includes the filter 225. The filter 225 allows air to pass therethrough while preventing water to flow from the outside of the housing 5 into the housing space 15 through the filter hole 220. Note that water corresponds to foreign matter.

Further, when a pedal 40 is stepped on by the driver of the vehicle, the air in the housing space 15 is compressed by receiving force from the pedal 40, and the air in the housing space 15 passes through the filter hole 220 and the filter 225, and flows out of the housing 5. Further, when the driver of the vehicle stops to step on the pedals 40 after stepping on the pedal 40, the air in the housing space 15 expands as the force from the pedal 40 is released. At this time, the air outside the housing 5 passes through the filter hole 220 and the filter 225 and flows into the housing space 15.

The filter hole 220 and the filter 225 alleviate the volume change of the air in the housing space 15 caused by the rotation of the pedal 40. Further, the change in volume of the air in the housing space 15 caused by the temperature change in the housing space 15 is alleviated. Therefore, when the pedal 40 rotates, resistance to compression and expansion of the air in the housing space 15 is reduced, thereby the pedal 40 rotates smoothly. Further, the filter 225 suppresses foreign matter from intruding into the housing space 15 from the outside of the housing 5 through the filter hole 220.

Twenty-Eighth Embodiment

The twenty-eighth embodiment is different from the first embodiment in the form of a connecting rod 60 and a cover member 80.

Figure 35:
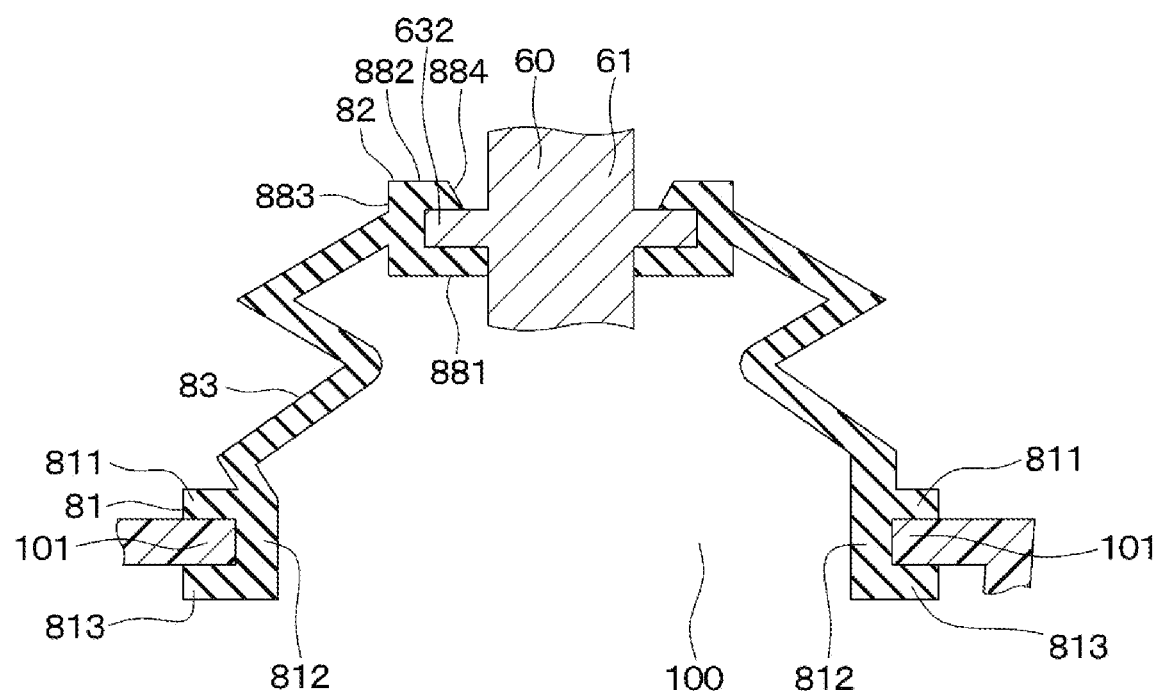
FIG. 35 is a cross-sectional view of a pedal device of a twenty-eighth embodiment.

An arm portion 61 of the connecting rod 60 does not have an arm recess 612, but has an arm protrusion 632 as shown in FIG. 35. The arm protrusion 632 protrudes from the side surface of the arm portion 61 in a direction orthogonal to the axial direction of the connecting rod 60.

A second connecting portion 82 of the cover member 80 has a bottom portion 883, a first side portion 881 and a second side portion 882. The bottom portion 883 extends in the axial direction of the connecting rod 60. The first side portion 881 extends from the bottom portion 883 in a direction orthogonal to the axial direction of the connecting rod 60. The second side portion 882 extends in a direction orthogonal to the axial direction of the connecting rod 60 from one side of the bottom portion 883 opposite to the first side portion 881. Also, the arm protrusion 632 is inserted into the space formed by the bottom portion 883, the first side portion 881 and the second side portion 882. Thereby, the second connecting portion 82 is connected to the arm portion 61.

Also, the length of the second side portion 882 is shorter than the length of the first side portion 881 in the direction orthogonal to the axial direction of the connecting rod 60. Additionally, the second side portion 882 includes a second side slope 884. The second side slope 884 is formed on one side of the second side portion 882 opposite to a portion on a side of the arm protrusion 632. Note that the length of the first side portion 881 may be shorter than the length of the second side portion 882 in the direction orthogonal to the axial direction of the connecting rod 60. Also, the first side portion 881 may include a slope similar to the second side slope 884.

The twenty-eighth embodiment is configured in the above-described manner. The twenty-eighth embodiment also achieves corresponding effects as the first embodiment. The twenty-eighth embodiment also achieves the following effects [19-1], [19-2].

[19-1] The second connecting portion 82 has the bottom portion 883, the first side portion 881 and the second side portion 882. The bottom portion 883 extends in the axial direction of the connecting rod 60. The first side portion 881 extends from the bottom portion 883 in the direction orthogonal to the axial direction of the connecting rod 60. The second side portion 882 extends in the direction orthogonal to the axial direction of the connecting rod 60 from one side of the bottom portion 883 opposite to the first side portion 881. Also, the arm protrusion 632 is inserted into the space formed by the bottom portion 883, the first side portion 881 and the second side portion 882. Note that the axial direction of the connecting rod 60 corresponds to one direction. The direction orthogonal to the axial direction of the connecting rod 60 corresponds to the direction crossing the extending direction of the bottom portion 883. The arm protrusion 632 corresponds to a rod protrusion.

In such manner, the second connecting portion 82 hardly comes off from the connecting rod 60. Moreover, the second connecting portion 82 and the connecting rod 60 can be easily connected without providing an additional member. Therefore, the cost of a pedal device 1 is reducible by an amount of the cost of the additional member.

[19-2] The length of the second side portion 882 is shorter than the length of the first side portion 881 in the direction orthogonal to the axial direction of the connecting rod 60. Additionally, the second side portion 882 includes the second side slope 884. The second side slope 884 is formed on one side of the second side 882 opposite to a side of the arm protrusion 632, and is inclined with respect to the extending direction of the second side 882. Thereby, the second side slope 884 guides the arm protrusion 632 into the space formed by the bottom portion 883, the first side portion 881 and the second side portion 882. The second side slope 884 corresponds to a rod slope.

Since the length of the second side portion 882 is shorter than the length of the first side portion 881, the arm protrusion 632 is easily insertable from a side of the second side portion 882 into the space formed by the bottom portion 883, the first side portion 881 and the second side portion 882. Further, since the arm protrusion 632 is guided into such space by the second side slope 884, it becomes easy to insert the arm protrusion 632 into such space.

Twenty-Ninth Embodiment

In the twenty-ninth embodiment, a housing 5 further has an inclined surface 500 and a wall portion 510. Further, the shape of a first stopper 70 is different from that of the first embodiment. Moreover, a pedal device 1 further includes a protection plate 515. The other configurations are similar to those of the first embodiment.

Figure 36:
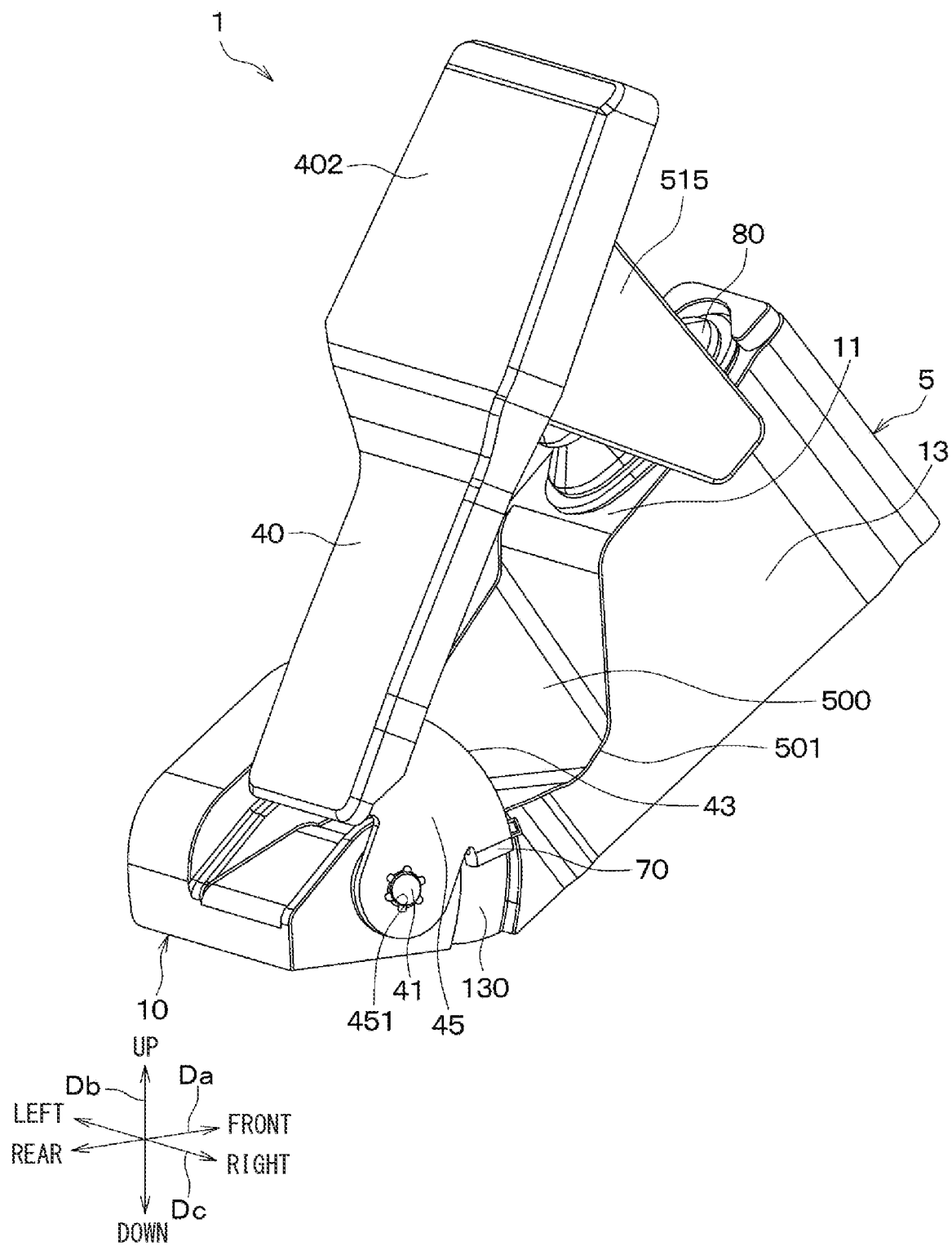
FIG. 36 is a perspective view of a pedal device of a twenty-ninth embodiment.
Figure 37:
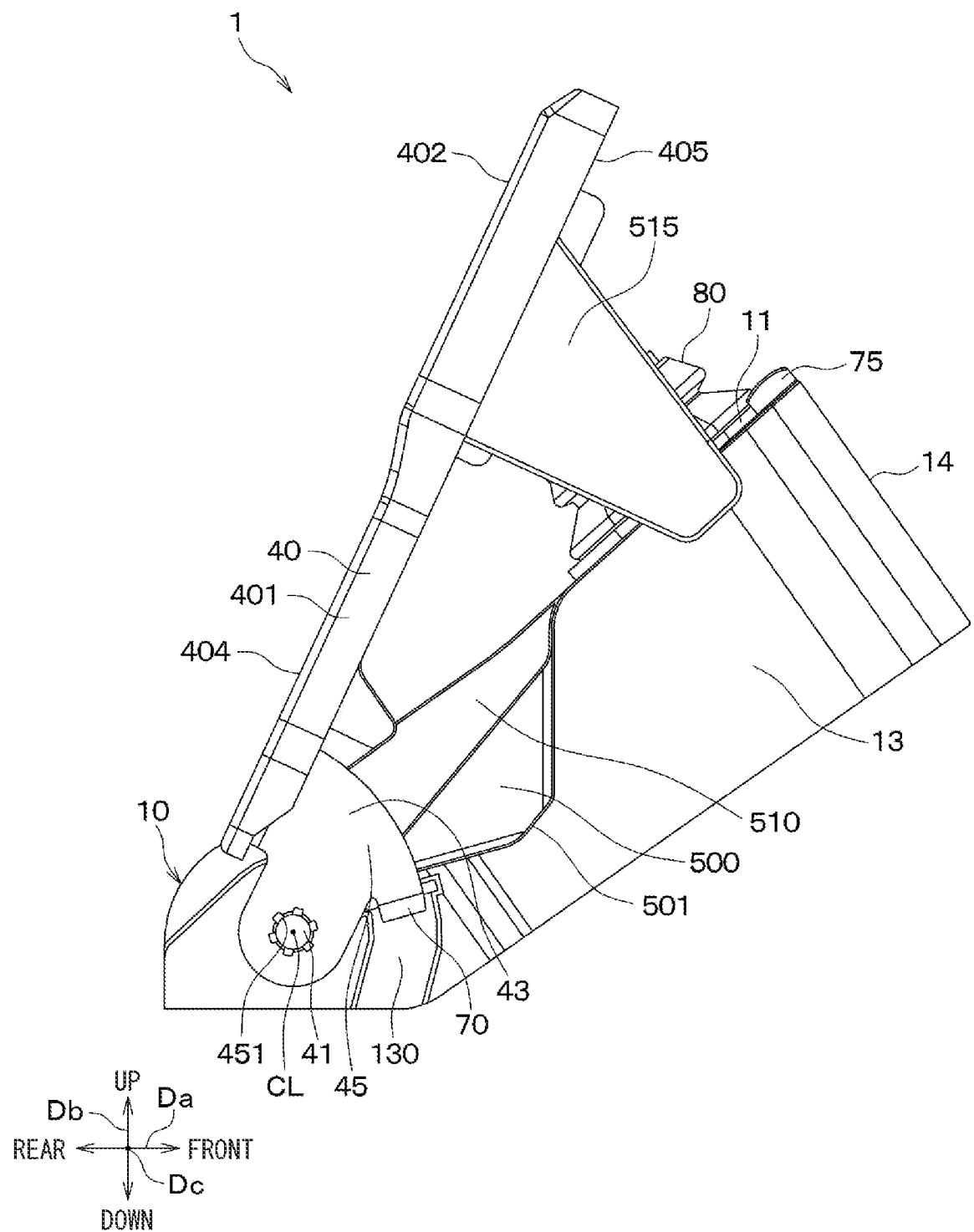
FIG. 37 is a side view of the pedal device.
Figure 38:
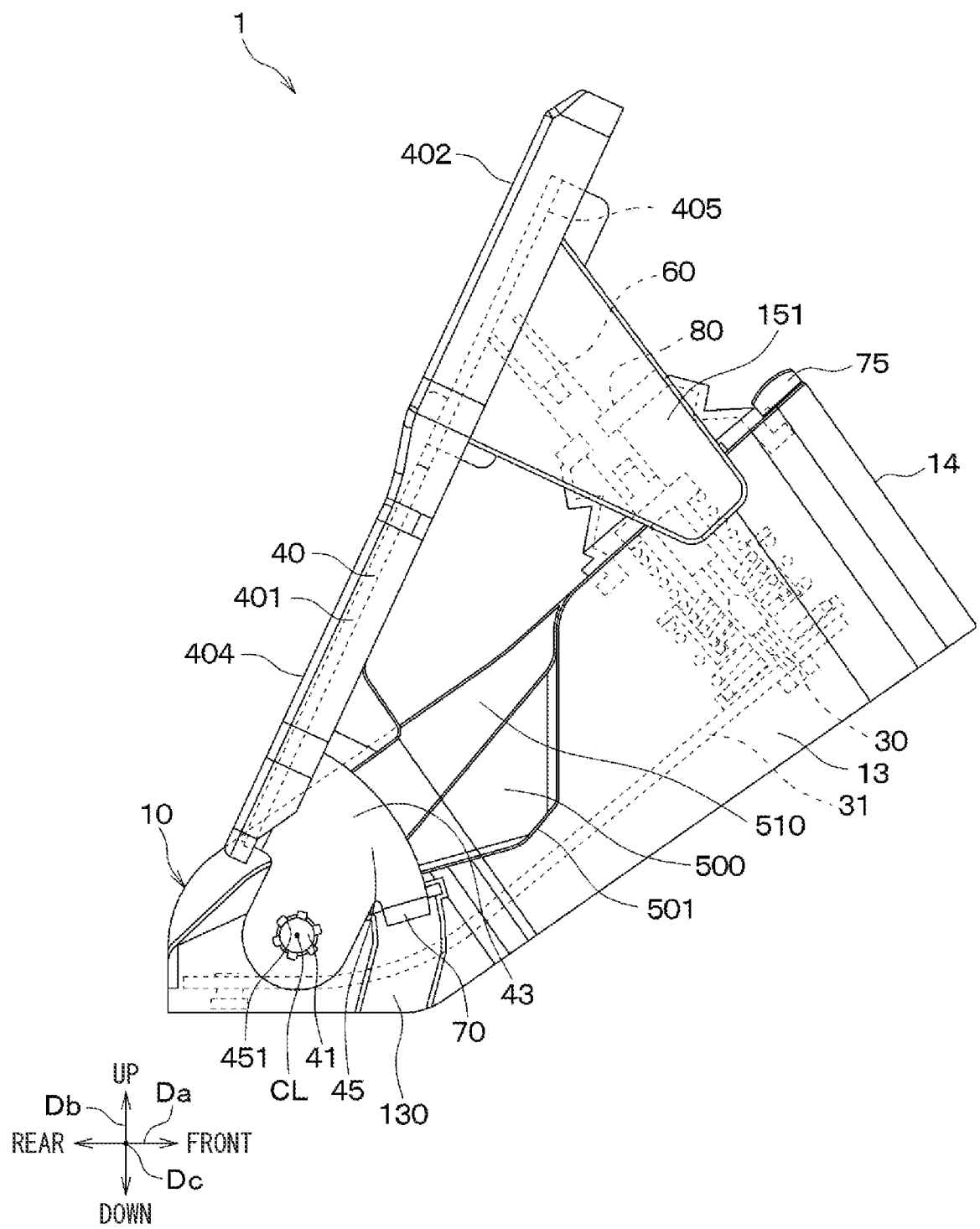
FIG. 38 is a side view of the pedal device.

As shown in FIGS. 36 to 38, the inclined surface 500 is inclined downward toward the lower side of the vehicle from a left side wall 12 to a right side wall 13. Further, a portion of the inclined surface 500 on the lower side of the vehicle is connected to the right side wall 13, and a connection point 502 between the inclined surface 500 and the right side wall 13 is shifted forward of the vehicle relative to a shaft 41 and a rotating plate 43. Also, the wall portion 510 is connected to the inclined surface 500. Further, the wall portion 510 extends upward toward the upper side of the vehicle from a boundary portion with the inclined surface 500. A first stopper 70 extends downward from a side plate portion 45. Note that, in FIGS. 36 to 38, illustration of a second housing 20 is omitted in order to avoid complication.

The protection plate 515 corresponds to a protection portion, and protects a connecting rod 60 and a cover member 80. Specifically, the protection plate 515, extending from a pedal back surface 405 to a side of the housing 5, at least partially overlaps with the connecting rod 60 and the cover member 80 in the extending direction of a rotation axis CL. Further, a part of the protection plate 515 and a part of the left side wall 12 of the housing 5 overlap in the extending direction of the rotation axis CL when a pedal 40 is not stepped on. Further, a part of the protection plate 515 and a part of the right side wall 13 of the housing 5 overlap in the extending direction of the rotation axis CL when the pedal 40 is not stepped on. Although the protection plate 515 is provided on both of the right side and the left side of the pedal back surface 405, the protection plate 515 is not limited to such configuration, i.e., may be provided only on one of the right side or the left side, for example. Moreover, although the protection plate 515 is mentioned as a protection portion, the shape of the protection portion is not limited to be formed in a plate shape, and may also have, for example, a bar shape.

Figure 39:
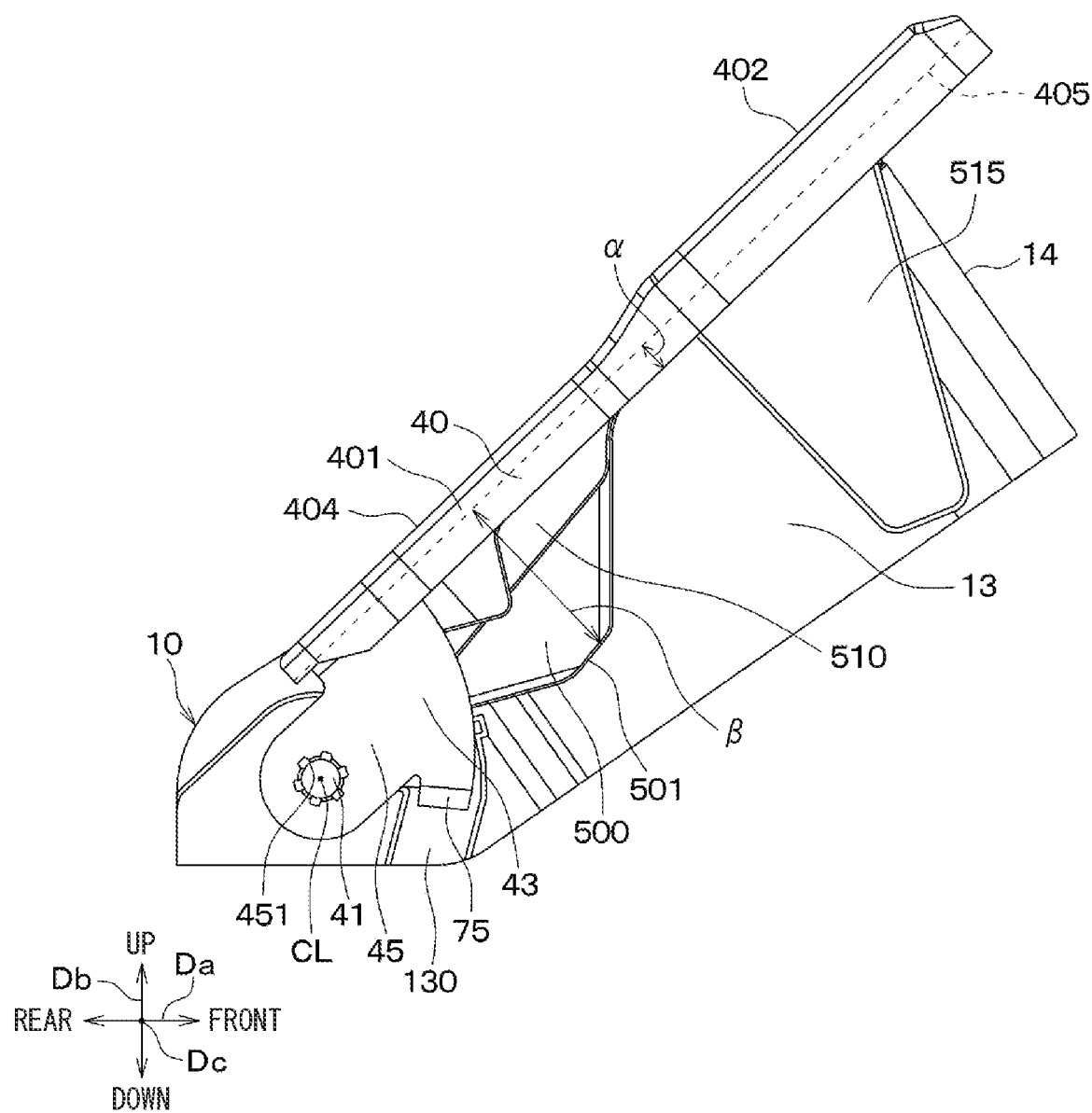
FIG. 39 is a side view showing a maximum depression state of the pedal device.

Here, FIG. 39 shows a fully stepped-on state in which the pedal 40 is rotated to the farthest by a step-on operation of the driver of the vehicle. As shown in FIG. 39, in the fully stepped-on state, a space between the pedal 40 and the housing 5 has a first region α and a second region β in a direction orthogonal to the pedal back surface 405. Further, in the direction orthogonal to the pedal back surface 405, a maximum distance from the pedal back surface 405 to the housing 5 in the second region β is longer than a maximum distance from the pedal back surface 405 to the housing 5 in the first region α. Also, the second region β is defined by the pedal back surface 405 and the inclined surface 500. Note that in FIG. 39, the first region α and the second region β are respectively indicated by arrows. Also, in FIG. 39, illustration of the second housing 20 is omitted in order to avoid complication.

Also, the protection plate 515 does not cover the second region β in the space between the pedal 40 and the housing 5. Therefore, the second region β is open on one side or the other side in the direction of the rotation axis CL. Thus, the inclined surface 500 of the housing 5 is not covered with the protection plate 515, and is open to one side of the rotational axis CL direction where the protection plate 515 is arranged. In such manner, even if foreign matter is caught between the pedal back surface 405 and the housing 5, when the driver of the vehicle steps on the pedal 40, foreign matter pushed out to the outside of the housing 5 along the inclined surface 500, without interfering with the protection plate 515.

The twenty-ninth embodiment is configured in the above-described manner. The twenty-ninth embodiment also achieves corresponding effects as the first embodiment. The twenty-ninth embodiment also achieves the following effects [20-1], [20-2].

[20-1] Here, as described in Japanese Patent No. 6881257, there is a known vehicle pedal device including a comparative pedal pad, a comparative housing, a comparative support, and a comparative protection plate. The comparative protection plate is provided on the pedal pad, and is arranged outside in the vehicle width direction with respect to a space defined by the comparative pedal pad in a fully stepped-on state where the pedal is fully stepped on, the comparative housing, and the comparative support. Further, the comparative protection plate overlaps with the space. In such configuration, foreign matter intruding into the vehicle pedal device accumulates between the comparative pedal pad and the comparative housing, and the accumulated foreign matter is hard to be discharged because the comparative protection plate covers the comparative housing.

On the other hand, the pedal device 1 further includes the protection plate 515. By extending from the pedal back surface 405 toward the housing 5, the protection plate 515 at least partially overlaps with the connecting rod 60 and the cover member 80 in the extending direction of the rotation axis CL. Further, the first region α and the second region β are formed at a position between the pedal back surface 405 and the housing 5 when the pedal 40 is rotated to the farthest by the step-on operation of the driver of the vehicle. Further, in the direction orthogonal to the pedal back surface 405, the distance from the pedal back surface 405 to the housing 5 in the second region β is longer than the distance from the pedal back surface 405 to the housing 5 in the first region α. Further, since the protection plate 515 does not cover the second region β, the second region β is at least open to one side or other side in the extending direction of the rotation axis CL, i.e., open to the side where the protection plate 515 is arranged. Therefore, even if foreign matter is caught between the pedal back surface 405 and the housing 5, the foreign matter is easily discharged to the outside of the pedal device 1 due to discharge from the second region β.

[20-2] When the pedal 40 is not stepped on by the driver of the vehicle, a part of the protection plate 515 overlaps with a part of the left side wall 12 and the right side wall 13 of the housing 5 in the extending direction of the rotation axis CL.

In such manner, even if a force acts on the protection plate 515 from the outside of the pedal device 1, such as a case when the protection plate 515 is kicked by the foot of the driver of the vehicle, such a load applied to the protection plate 515 is received by the left side wall 12 and the right side wall 13 of housing 5. Therefore, the connecting rod 60 and the cover member 80 are readily protected by the protection plate 515.

Thirtieth Embodiment

The thirtieth embodiment is different from the twenty-ninth embodiment in the form of a protection plate 515. Other than the above, the thirtieth embodiment corresponds to the twenty-ninth embodiment.

Figure 40:
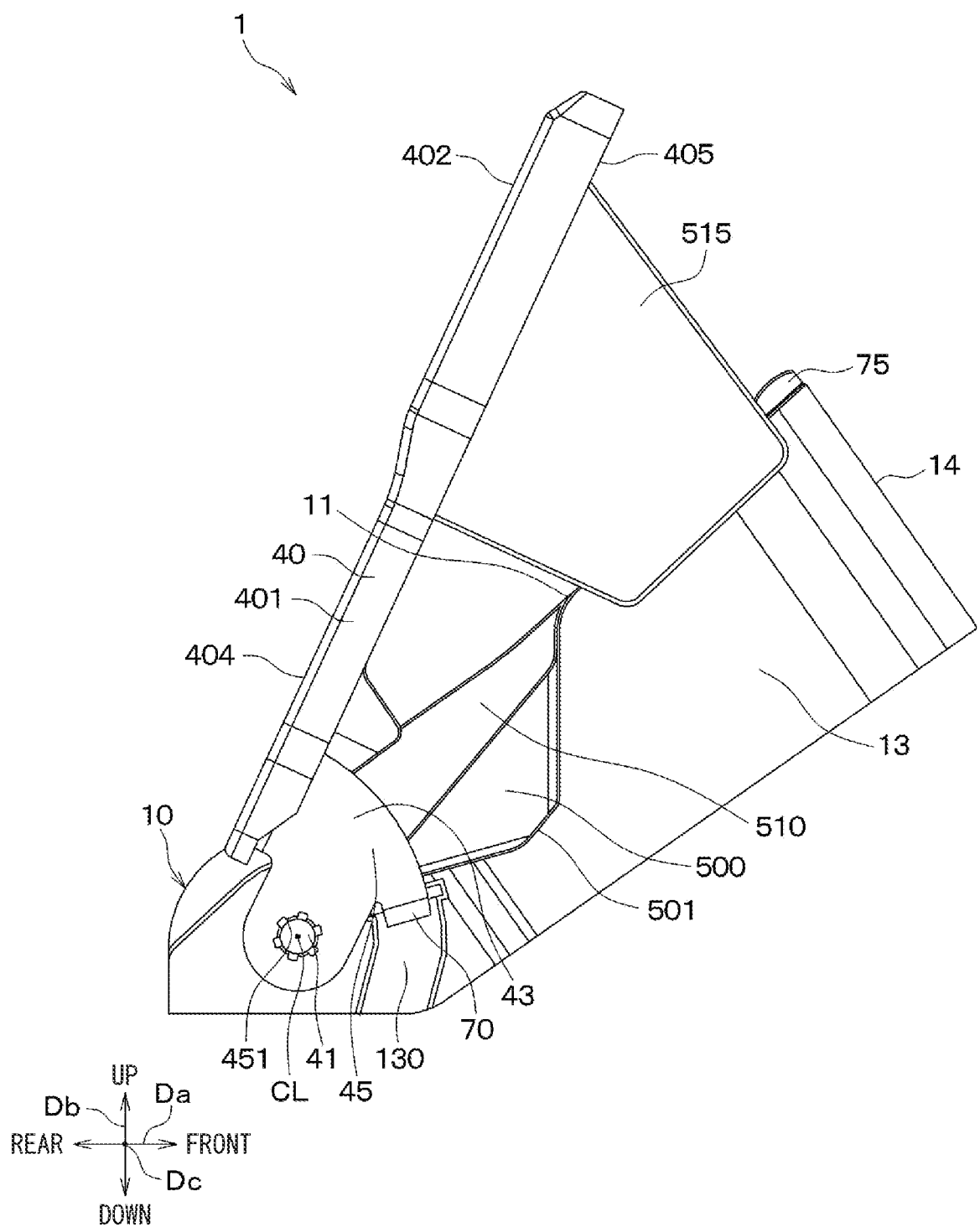
FIG. 40 is a side view of a pedal device of a thirtieth embodiment.

Specifically, as shown in FIG. 40, the width of a protection plate 515 is wider than that of the twenty-ninth embodiment. In such manner, when a connecting rod 60 and a cover member 80 are projected in the extending direction of a rotation axis CL, the projection of the connecting rod 60 and the cover member 80 entirely overlaps with the protection plate 515. Note that a second housing 20 is omitted in FIG. 40 in order to avoid complication.

Also in the thirtieth embodiment, since the protection plate 515 does not cover a second region β, the second region β is open to at least one of both (right and left) sides along the extending direction of the rotation axis CL, i.e., on one side in which the protection plate 515 is arranged. Therefore, even if foreign matter is caught between a pedal back surface 405 and a housing 5, the foreign matter is easily discharged to the outside of a pedal device 1 due to discharge from the second region β.

The thirtieth embodiment is configured in the above-described manner. Also in the thirtieth embodiment, corresponding effects as the twenty-ninth embodiment can be obtained.

Other Embodiments

The present disclosure is not limited to the above-described embodiments, and the above-described embodiments are appropriately modifiable. Further, individual elements or features of a particular embodiment are not necessarily essential unless it is specifically stated that the elements or the features are essential in the foregoing description, or unless the elements or the features are obviously essential in principle.

In the above-described embodiments, the pedal device 1 is used as a brake pedal in the brake-by-wire system 150 that controls the brakes of a vehicle. On the other hand, a pedal device 1 is not limited to be used as a brake pedal. The pedal device 1 may also be used, for example, as an accelerator pedal for accelerating a vehicle.

In the above-described embodiments, the pedal device 1 is an organ-type pedal device 1. On the other hand, a pedal device 1 is not limited to be the organ-type pedal device 1. For example, the pedal device 1 may also be a suspension-type pedal device 1. In the suspension-type pedal device 1, a portion of a pedal 40 in the rear of the vehicle relative to a rotation axis CL rotates toward a floor 2 or a dash panel in the vehicle compartment in response to an increase in the stepping force of the driver applied to the pedal 40.

In the above-described embodiments, the reaction force generating mechanism 30 uses the plate spring 31, the large-diameter coil spring 33, and the small-diameter coil spring 34 as elastic members. On the other hand, the number of elastic members of a reaction force generating mechanism 30 is not limited to three. The number of elastic members of the reaction force generating mechanism 30 may be one or more.

In the above-described embodiment, in the brake-by-wire system 150, hydraulic pressure is generated in the brake fluid flowing through the brake circuit 120 by the master cylinder 126. On the other hand, the hydraulic pressure is not limited to be generated in the brake fluid flowing through a brake circuit 120 by a master cylinder 126. For example, hydraulic pressure may be generated in the brake fluid flowing through the brake circuit 120 by a hydraulic pump.

Figure 41:
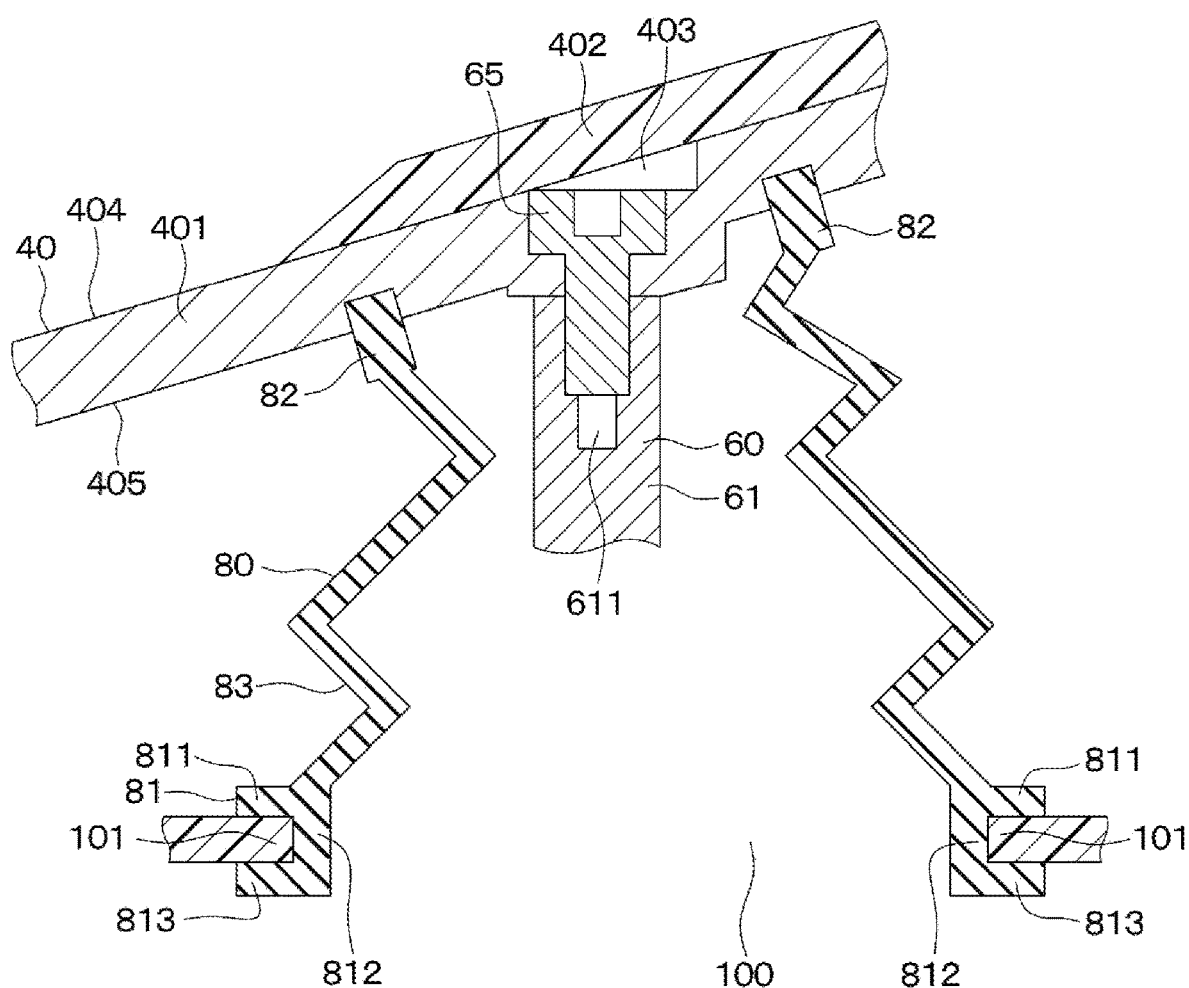
FIG. 41 is a cross-sectional view of a pedal, a connecting rod, a cover member, and a housing end portion of a pedal device of an another embodiment.
Figure 42:
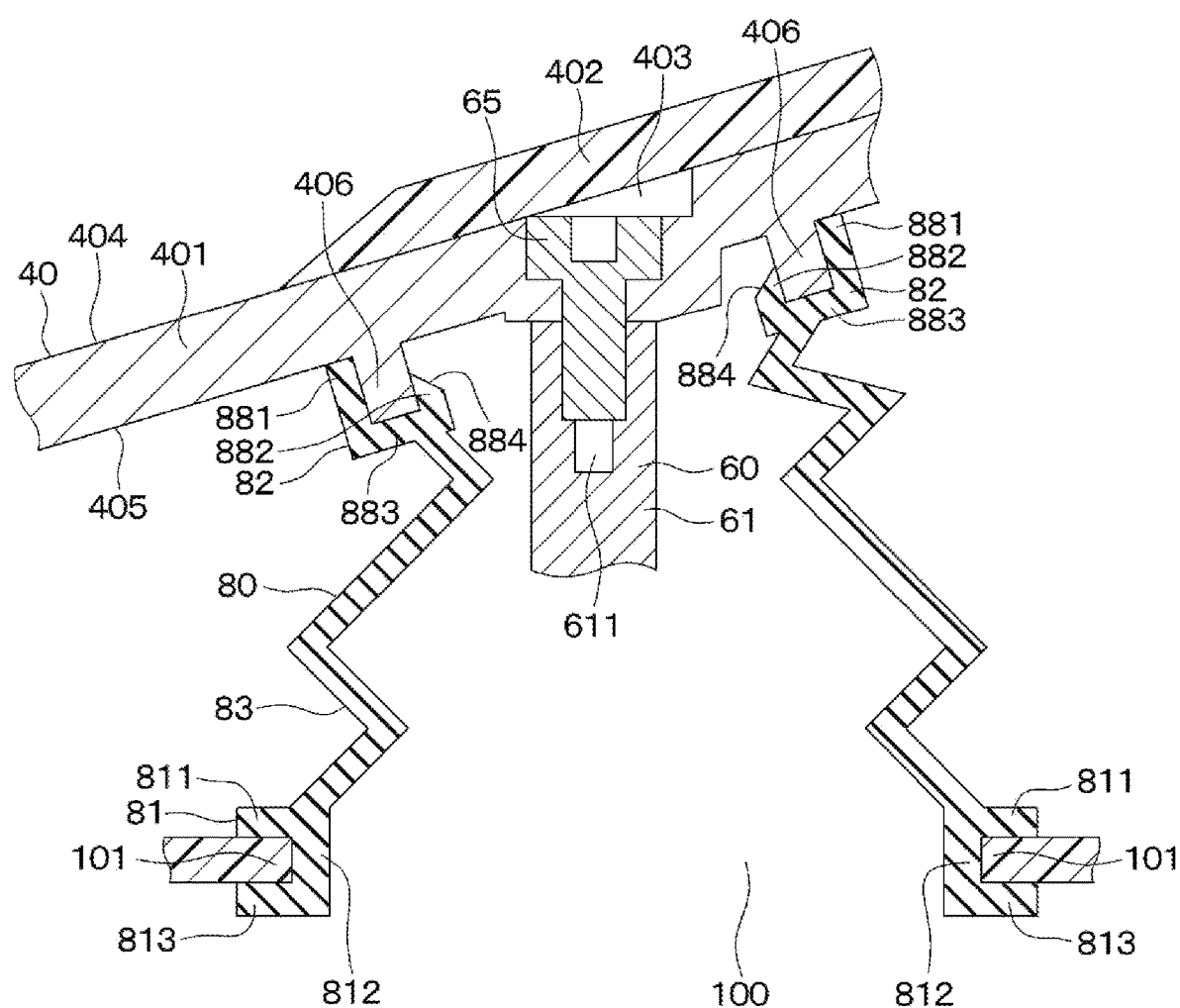
FIG. 42 is a cross-sectional view of a pedal, a connecting rod, a cover member, and a housing end portion of a pedal device of an another embodiment.
Figure 43:
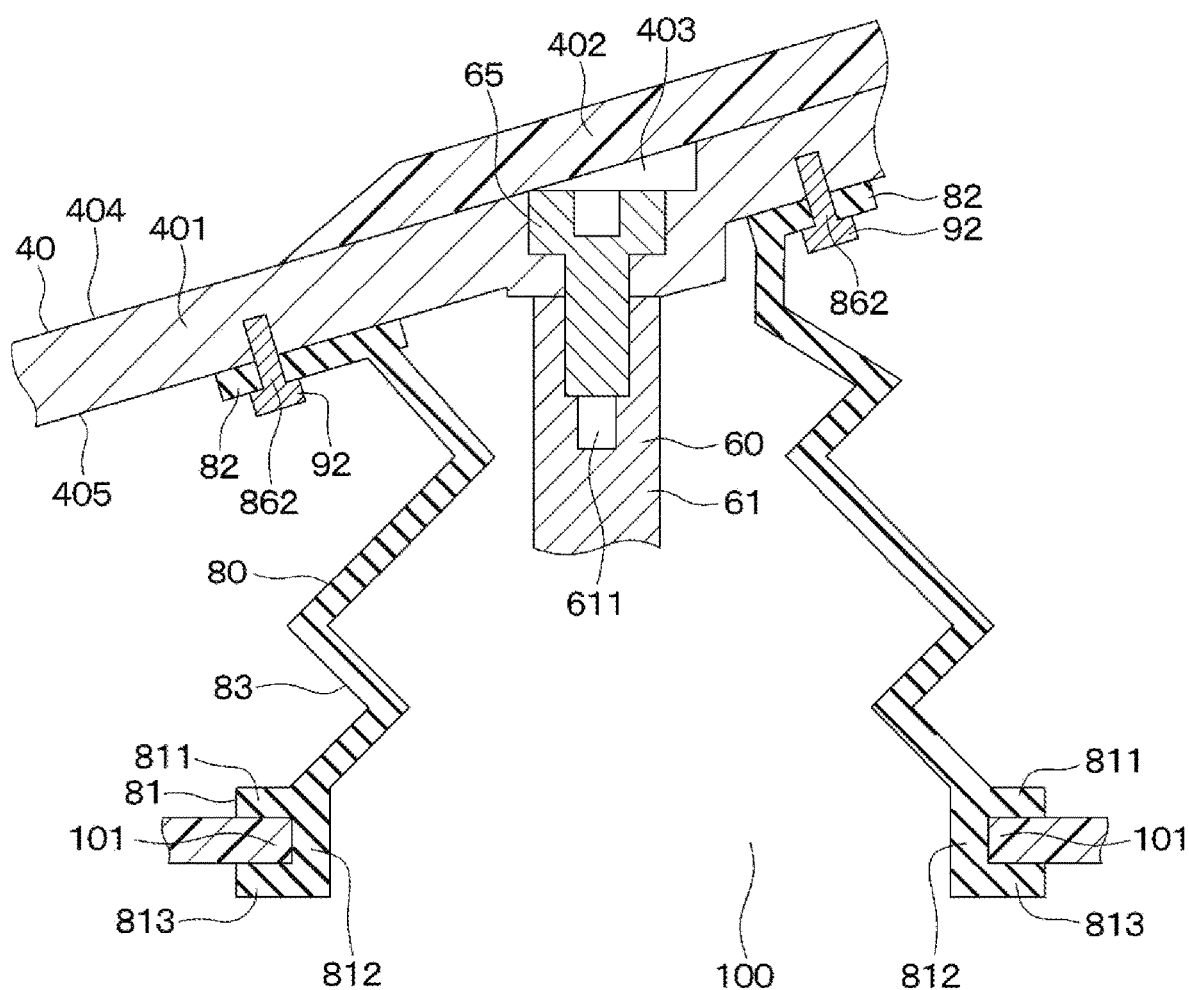
FIG. 43 is a cross-sectional view of a pedal, a connecting rod, a cover member, and a housing end portion of a pedal device of an another embodiment.
Figure 44:
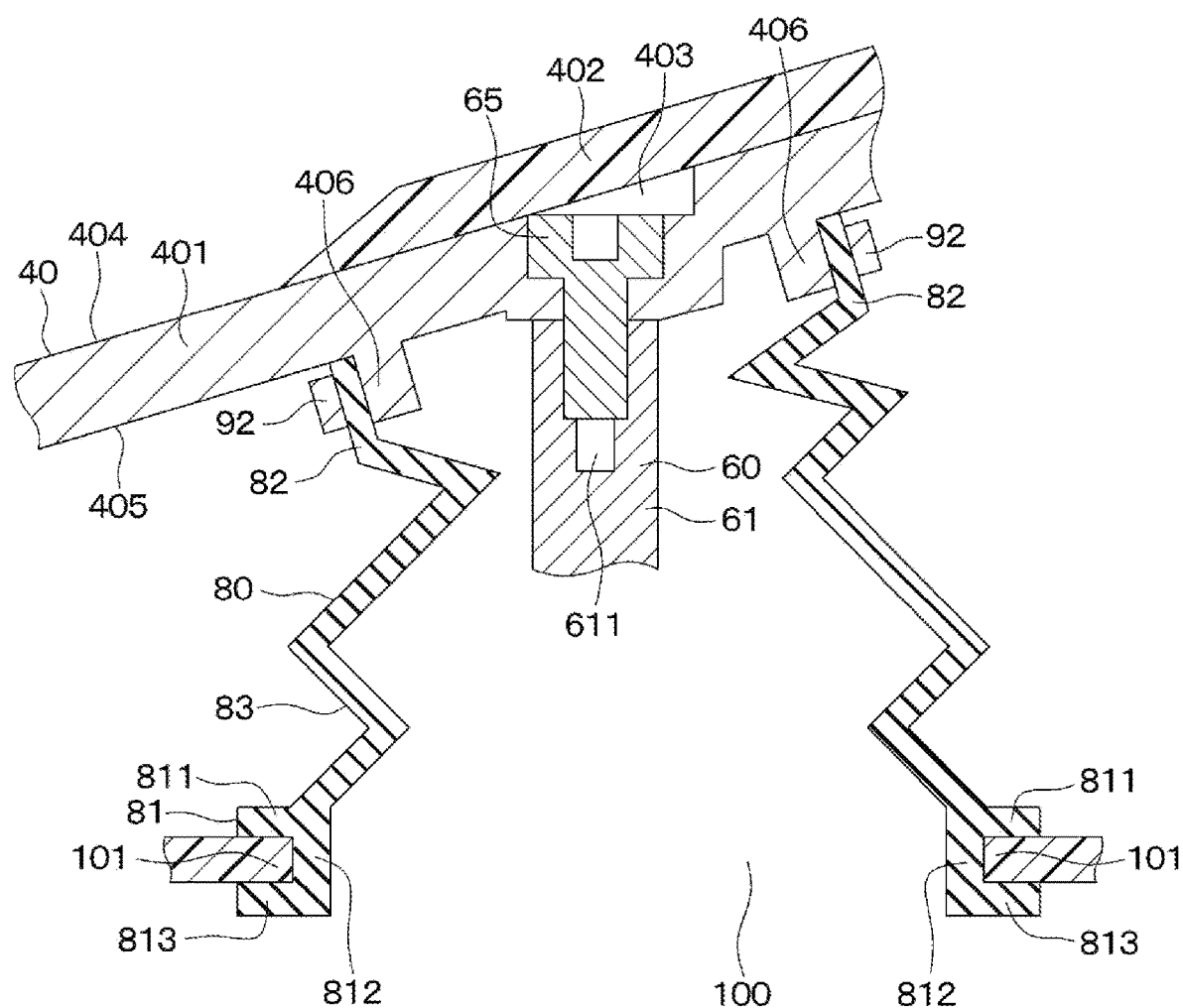
FIG. 44 is a cross-sectional view of a pedal, a connecting rod, a cover member, and a housing end portion of a pedal device of an another embodiment.

In the second embodiment, the second connecting portion 82 is connected to the pedal back surface 405 by welding, adhesion, two-color molding, or the like. On the other hand, a second connecting portion 82 is not limited to be connected to a pedal back surface 405 by welding, adhesion, two-color molding, or the like. For example, as shown in FIG. 41, a second connecting portion 82 may also be connected to a pedal back surface 405 by partially inserting the second connecting portion 82 into a space recessed from the pedal back surface 405. Further, as shown in FIG. 42, a second connecting portion 82 may also be connected to a pedal back surface 405 by inserting a pedal protrusion 406 protruding from the pedal back surface 405 into a space formed by a bottom portion 883, a first side portion 881 and a second side portion 882 of the second connecting portion 82. Further, as shown in FIG. 43, a second connecting portion 82 may also be connected to a pedal back surface 405 by inserting a second fixing member 92 such as a screw, a pin, or a snap fit into a second connecting portion hole 862 of the second connecting portion 82 and a hole formed in a pedal back surface 405. Further, as shown in FIG. 44, a pedal back surface 405 and a second connecting portion 82 may be connected by a sandwich structure that sandwiches the second connecting portion 82 in between (a) a second fixing member 92 such as a binding band, a retaining ring or the like and (b) a pedal protrusion 406.

In the twenty-ninth and thirtieth embodiments, a part of the protection plate 515 and a part of the side surface of the housing 5 overlap in the direction of the rotation axis CL in a state in which the pedal 40 is not stepped on, but the present disclosure is not limited to such a structure. For example, by increasing the rigidity of a protection plate 515 by, for example, providing an increased thickness for the protection plate 515, a part of the protection plate 515 and a part of the side surface of a housing 5 do not have to overlap in the direction of a rotation axis CL.

The embodiments described above may also be combined with each other when appropriate.

What is claimed is:

1. A pedal device comprising:
   a pedal configured to rotate about a rotation axis when stepped on by an operator;
   a connecting rod connected to a back surface of the pedal, opposite to a stepping surface stepped on by the operator, to rotate with the pedal about the rotation axis;
   a reaction force generating mechanism configured to generate a reaction force against a stepping force of the operator applied to the pedal by receiving a force from the pedal through the connecting rod and by an elastic deformation when the pedal is stepped on by the operator;
   a housing having a housing hole through which the connecting rod passes when the pedal is stepped on by the operator, and accommodating the reaction force generating mechanism; and
   a cover member including
      a housing connection portion connected to a housing end portion which is an end portion defining the housing hole in the housing, and
      a covering portion that is arranged at a position between the housing connection portion and the back surface of the pedal, and is connected to the housing connection portion, to cover the housing holes,
   the housing includes a first housing including the housing end portion, and a second housing,
   the first housing is provided with an opening at a position different from the housing hole, and a housing space communicating with the housing hole and the opening,
   the second housing is configured to close the opening of the first housing,
   a breathing hole is provided as a space between an opening-side end of the first housing and the second housing,
   the breathing hole is configured to discharge air in the housing space to an outside of the housing space after passing through the breathing hole, when the air in the housing space is compressed by receiving force from the pedal due to a stepping on of the pedal by the operator, and
   the breathing hole is configured to introduce air outside the housing space into the housing space through the breathing hole, when a force from the pedal is released due to stop of stepping on of the pedal subsequent to stepping on of the pedal by the operator to cause air in the housing space to expand.

2. The pedal device according to claim 1, wherein
   the covering portion has a bellows shape, and is configured to be elastically deformable and to generate a reaction force when the pedal is stepped on by the operator.

3. The pedal device according to claim 1, wherein
   the cover member further includes a pedal connecting portion connected to the covering portion and connected to the back surface of the pedal.

4. The pedal device according to claim 1, wherein
   the cover member further includes a mechanism connecting portion connected to a surface that contacts the connecting rod of the reaction force generating mechanism and connected to the covering portion.

5. The pedal device according to claim 1, wherein
   the cover member further includes a rod connecting portion connected to the covering portion and connected to the connecting rod.

6. The pedal device according to claim 5, wherein
   the connecting rod includes a rod recess recessed in a direction orthogonal to the axial direction of the connecting rod, the rod recess includes a rod bottom surface and a rod side surface connected to the rod bottom surface, and
the rod connecting portion includes
an insertion portion inserted into a space defined by the rod bottom surface and the rod side surface, and
a protruding portion protruding from the insertion portion in a direction orthogonal to the axial direction of the connecting rod.

7. The pedal device according to claim 5, wherein
the connecting rod includes a rod protrusion protruding from the side surface of the connecting rod in a direction orthogonal to the axial direction of the connecting rod,
the rod connecting portion includes
a bottom portion extending in an extending direction,
a first side portion extending from the bottom portion in a direction crossing the extending direction of the bottom portion, and
a second side portion extending from the bottom portion on a side opposite to the first side portion, in a direction crossing the extending direction of the bottom portion, and
the rod protrusion is inserted into a space defined by the bottom portion, the first side portion and the second side portion.

8. The pedal device according to claim 7, wherein
a length of the second side portion is shorter than a length of the first side portion,
the second side portion includes a rod slope formed on an opposite side of the rod protrusion, and
the rod slope is inclined with respect to an extending direction of the second side portion to guide the rod protrusion into a space defined by the bottom portion, the first side portion, and the second side portion.

9. The pedal device according to claim 1, wherein
the housing connection portion includes
a first extension portion extending in one direction,
a second extension portion extending from the first extension portion in an extending direction crossing the one direction of the first extension portion, and
a third extension portion extending, from one side of the second extension portion opposite to the first extension portion, in a direction crossing the extending direction of the second extension portion, and
the housing end portion is inserted into a space defined by the first extension portion, the second extension portion and the third extension portion.

10. The pedal device according to claim 9, wherein
a length of the third extension portion is shorter than a length of the first extension portion,
the third extension portion includes a housing slope provided at a side opposite the housing end, and
the housing slope is inclined with respect to an extending direction of the third extension portion to guide the housing end portion into a space that is defined by the first extension portion, the second extension portion and the third extension portion.

11. The pedal device according to claim 1, wherein
the housing end portion includes an end recess recessed therefrom,
the end recess includes an end bottom surface and an end side surface connected to the end bottom surface, and
the housing connection portion is inserted into a space defined by the end bottom surface and the end side surface.

12. The pedal device according to claim 1, wherein the housing connection portion includes a low-strength portion inserted into the housing hole and connected to the housing end portion, and
a high-strength portion covered by the low-strength portion and having a Young's modulus higher than that of the low strength portion.

13. The pedal device according to claim 1, wherein the opening of the first housing is provided at a position opposite to the housing hole.

14. The pedal device according to claim 1, wherein
the housing is provided with a housing space communicating with the housing hole, and a filter hole communicating with an outside of the housing and the housing space,
the pedal device further comprising
a filter configured to allow air to pass therethrough without passing foreign matter flowing from the outside of the housing through the filter hole toward the space inside the housing,
when the pedal is stepped on by the operator to cause compression of air in the housing space by force received from the pedal, air in the housing space passes through the filter hole and the filter to discharge to the outside of the housing, and
when the operator stops step-on operation of the pedal in a step-on state of the pedal to release force from the pedal and to cause expansion of air in the housing space, air from the outside of the housing space is introduced into the housing space through the filter hole and the filter.

15. A pedal device comprising:
a pedal configured to rotate about a rotation axis when stepped on by an operator;
a connecting rod connected to a back surface of the pedal, opposite to a stepping surface stepped on by the operator, to rotate with the pedal about the rotation axis;
a reaction force generating mechanism configured to generate a reaction force against a stepping force of the operator applied to the pedal by receiving a force from the pedal through the connecting rod and by an elastic deformation when the pedal is stepped on by the operator;
a housing having a housing hole through which the connecting rod passes when the pedal is stepped on by the operator, and accommodating the reaction force generating mechanism;
a cover member including
a housing connection portion connected to a housing end portion which is an end portion defining the housing hole in the housing, and
a covering portion that is arranged at a position between the housing connection portion and the back surface of the pedal, and is connected to the housing connection portion, to cover the housing hole; and
a protection portion extending from the back surface of the pedal toward the housing to partially overlap with at least a part of the connecting rod and the cover member in an extending direction of the rotation axis, wherein
a first region and a second region are provided at a position between the back surface of the pedal and the housing when the pedal is rotated to a farthest by the step-on operation of the operator,
in a direction orthogonal to the pedal back surface, a distance from the back surface of the pedal to the housing in the second region is longer than a distance from the back surface of the pedal to the housing in the first region, and the protection portion is configured without covering the second region, to open the second region toward at least one direction of an extension line of the rotation axis, on which the protection portion is arranged.

16. The pedal device according to claim 15, wherein a part of the protection portion overlaps with a part of the housing in an extending direction of the rotation axis when the pedal is not stepped on by the operator.

* * * * *